(12) United States Patent
Gulick et al.

(10) Patent No.: US 6,823,451 B1
(45) Date of Patent: Nov. 23, 2004

(54) INTEGRATED CIRCUIT FOR SECURITY AND MANAGEABILITY

(75) Inventors: Dale E. Gulick, Austin, TX (US); Geoffrey S. Strongin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 774 days.

(21) Appl. No.: 09/853,447

(22) Filed: May 11, 2001

Related U.S. Application Data

(63) Continuation-in-part of application No. 09/852,372, filed on May 10, 2001, and a continuation-in-part of application No. 09/852,942, filed on May 10, 2001.

(51) Int. Cl.[7] ............................................. G06F 11/30
(52) U.S. Cl. ...................... 713/153; 713/164; 713/168; 713/200; 713/201
(58) Field of Search ................................ 713/153, 164, 713/168, 200, 201

(56) References Cited

PUBLICATIONS

Intel, "Low Pin Count (LPC) Interface Specification Revision 1.0," pp. 1–31 (Sep. 29, 1997).

Standard Microsystems Corporation, "100 Pin Enhanced Super I/O for LPC Bus with SMBus Controller for Commerical Application," Part No. LPC47B37x, pp. 1–254 (Jun. 17, 1999).

FIPS Pub 140–1 Federal Information Processing Standards Publication, "Security Requirements for Cryptographic Modules" (Jan. 11, 1994).

Intel, "Communication and Networking Riser Specification," Revision 1.0 (Feb. 7, 2000).

"Handbook of Applied Cryptography" CRC Press 1997 pp. 154–157, 160–161, 191–198, 203–212.

*Primary Examiner*—Thomas R. Peeso
(74) *Attorney, Agent, or Firm*—Williams, Morgan & Amerson

(57) ABSTRACT

A device for security and manageability. The device includes a port, one or more secured assets; and security hardware. The port is configured to receive at least one operating mode signal. The at least one operating mode signal is indicative of a first operating mode. The security hardware is coupled to receive the at least one operating mode signal. The security hardware is further coupled to control access to the secured assets dependant upon the at least one operating mode signal. Another device includes first bus interface logic for coupling to a first external bus, a port, one or more secured assets, and security hardware coupled to control the one or more secured assets. The port is configured to receive at least one operating mode signal, indicative of a first operating mode. The secured assets are coupled to the first bus interface logic. The security hardware includes an initiation register, control logic coupled to the initiation register, a kick-out timer coupled to receive the at least one operating mode signal, a re-initiation timer, and access filters.

56 Claims, 73 Drawing Sheets

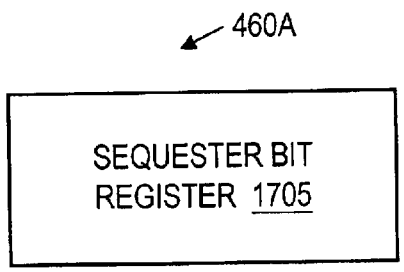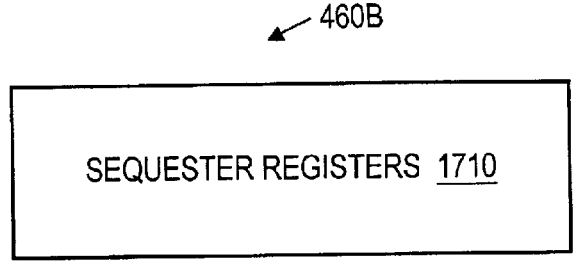
Fig. 17A    Fig. 17B
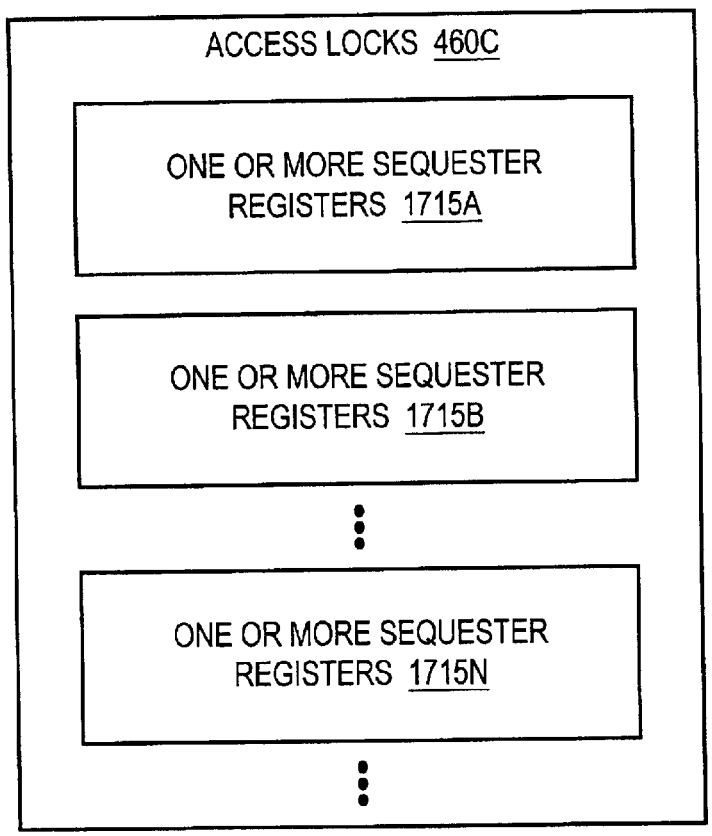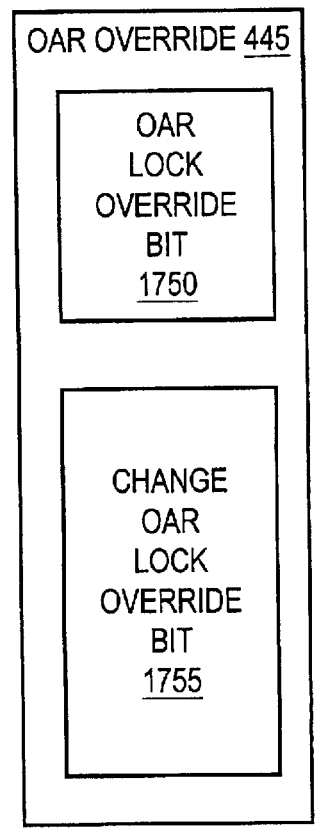
Fig. 17C    Fig. 17D

INTEGRATED CIRCUIT FOR SECURITY AND MANAGEABILITY

This Application is a continuation-in-part of co-pending U.S. patent application Ser. No. 09/852,372, entitled, "Secure Execution Box and Method," filed on May 10, 2001, whose inventors are Dale E. Gulick and Geoffrey S. Strongin. This Application is also a continuation-in-part of co-pending U.S. patent application Ser. No. 09/852,942 entitled, "Computer System Architecture for Enhanced Security and Manageability," filed on May 10, 2001, whose inventors are Geoffrey S. Strongin and Dale E. Gulick.

BACKGROUND OF THE INVENTION

1. Field of the Invention

This invention relates generally to computing systems, and, more particularly, to an apparatus for increasing security and manageability.

2. Description of the Related Art

FIG. 1A illustrates an exemplary computer system 100. The computer system 100 includes a processor 102, a north bridge 104, memory 106, Advanced Graphics Port (AGP) memory 108, a Peripheral Component Interconnect (PCI) bus 110, a south bridge 112, a battery, an AT Attachment (ATA) interface 114 (more commonly known as an Integrated Drive Electronics (IDE) interface), a universal serial bus (USB) interface 116, a Low Pin Count (LPC) bus 118, an input/output controller chip (SuperI/O™) 120, and BIOS memory 122. It is noted that the north bridge 104 and the south bridge 112 may include only a single chip or a plurality of chips, leading to the collective term "chipset." It is also noted that other buses, devices, and/or subsystems may be included in the computer system 100 as desired, e.g. caches, modems, parallel or serial interfaces, SCSI interfaces, network interface cards, etc. ["SuperI/O" is a trademark of National Semiconductor Corporation of Santa Clara, Calif.]

The processor 102 is coupled to the north bridge 104. The north bridge 104 provides an interface between the processor 102, the memory 106, the AGP memory 108, and the PCI bus 110. The south bridge 112 provides an interface between the PCI bus 110 and the peripherals, devices, and subsystems coupled to the IDE interface 114, the USB interface 116, and the LPC bus 118. The battery 113 is shown coupled to the south bridge 112. The Super I/O™ chip 120 is coupled to the LPC bus 118.

The north bridge 104 provides communications access between and/or among the processor 102, memory 106, the AGP memory 108, devices coupled to the PCI bus 10, and devices and subsystems coupled to the south bridge 112. Typically, removable peripheral devices are inserted into PCI "slots" (not shown) that connect to the PCI bus 110 to couple to the computer system 100. Alternatively, devices located on a motherboard may be directly connected to the PCI bus 110.

The south bridge 112 provides an interface between the PCI bus 110 and various devices and subsystems, such as a modem, a printer, keyboard, mouse, etc., which are generally coupled to the computer system 100 through the LPC bus 118 (or its predecessors, such as an X-bus or an ISA bus). The south bridge 112 includes the logic used to interface the devices to the rest of computer system 100 through the IDE interface 114, the USB interface 116, and the LPC bus 118.

FIG. 1B illustrates certain aspects of the prior art south bridge 112, including those provided reserve power by the battery 113, so-called "being inside the RTC battery well" 125. The south bridge 112 includes south bridge (SB) RAM 126 and a clock circuit 128, both inside the RTC battery well 125. The SB RAM 126 includes CMOS RAM 126A and RTC RAM 126B. The RTC RAM 126B includes clock data 129 and checksum data 127. The south bridge 112 also includes, outside the RTC battery well 125, a CPU interface 132, power and system management units 133, PCI bus interface logic 134A, USB interface logic 134C, IDE interface logic 134B, and LPC bus interface logic 134D.

Time and date data from the clock circuit 128 are stored as the clock data 129 in the RTC RAM 126B. The checksum data 127 in the RTC RAM 126B may be calculated based on the CMOS RAM 126A data and stored by BIOS during the boot process, such as is described below, e.g. block 148, with respect to FIG. 2A. The CPU interface 132 may include interrupt signal controllers and processor signal controllers. The power and system management units 133 may include an ACPI (Advanced Configuration and Power Interface) controller.

From a hardware point of view, an x86 operating environment provides little for protecting user privacy, providing security for corporate secrets and assets, or protecting the ownership rights of content providers. All of these goals, privacy, security, and ownership (collectively, PSO) are becoming critical in an age of Internet-connected computers. The original personal computers were not designed in anticipation of PSO needs.

From a software point of view, the x86 operating environment is equally poor for PSO. The ease of direct access to the hardware through software or simply by opening the cover of the personal computer allows an intruder or thief to compromise most security software and devices. The personal computer's exemplary ease of use only adds to the problems for PSO.

SUMMARY OF THE INVENTION

In one aspect of the present invention, a device is disclosed. The device includes a port, one or more secured assets; and security hardware. The port is configured to receive at least one operating mode signal. The at least one operating mode signal is indicative of a first operating mode. The security hardware is coupled to receive the at least one operating mode signal. The security hardware is further coupled to control access to the secured assets dependant upon the at least one operating mode signal.

In various embodiments of the device, the one or more secured assets may be a random number generator, a secure management register, a monotonic counter, and/or a secure memory. The first operating mode may be system management mode. In various embodiments, the security hardware may include an initiation register coupled to receive a request to change to the first operating mode and control logic coupled to the initiation register. The control logic is configured to assert a control signal indicative of the request to change to the first operating mode. The control signal initiates the change to the first operating mode. The control signal indicative of the request to change to the first operating mode may be a system management interrupt.

In another aspect of the present invention, another device is disclosed. This device includes first bus interface logic for coupling to a first external bus, a port, one or more secured assets, and security hardware coupled to control the one or more secured assets. The port is configured to receive at least one operating mode signal, indicative of a first operating mode. The one or more secured assets are coupled to the first bus interface logic. The security hardware includes an initiation register, control logic coupled to the initiation register, a kick-out timer coupled to receive the at least one operating mode signal, a re-initiation timer, and access filters. The initiation register is coupled to receive a request to change to the first operating mode. The control logic is configured to assert a control signal indicative of the request to change to the first operating mode. The control signal initiates the change to the first operating mode. The kick-out timer is coupled to receive the at least one operating mode signal. The kick-out timer is configured to output a signal indicating when the at least one operating mode signal is continuously active for at least a predetermined period. The re-initiation timer is coupled to receive the signal indicating when the at least one operating mode signal is active for a predetermined period. The re-initiation timer is configured to output a signal indicating that another predetermined period of time has elapsed since the kick-out timer output the signal indicating when the at least one operating mode signal is continuously active for at least the predetermined period of time. The access filters are coupled to receive an indication when the at least one operating mode signal is active. The access filters are configured to provide access requests to each of the one or more secured assets when the at least one operating mode signal is active. The access filters are further configured to provide a predetermined response in lieu of data when the at least one operating mode signal is not active.

BRIEF DESCRIPTION OF THE DRAWINGS

The invention may be understood by reference to the following description taken in conjunction with the accompanying drawings, in which like reference numerals identify similar elements, and in which:

FIG. 1A illustrates a block diagram of a prior art computer system, while

FIG. 10A illustrates a flowchart of an embodiment of a method for forcing a processor out of SMM, according to one aspect of the present invention, while

FIGS. 11A and 111B illustrate flowcharts of embodiments of methods for updating a monotonic counter stored in the SMM ROM, according to various aspects of the present invention;

FIGS. 17A, 17B, and 17C illustrate block diagrams of embodiments of the access locks 460 shown in FIG. 6, while FIG. 17D illustrates a block diagram of an embodiment of the override register, all according to various aspects of the present invention;

FIG. 18A illustrates a prior art flowchart of an SMM program, while

FIG. 38A illustrates a flowchart of an embodiment of a method for booting a computer system including authentication via the crypto-processor using master mode logic, while

Figure 1A:
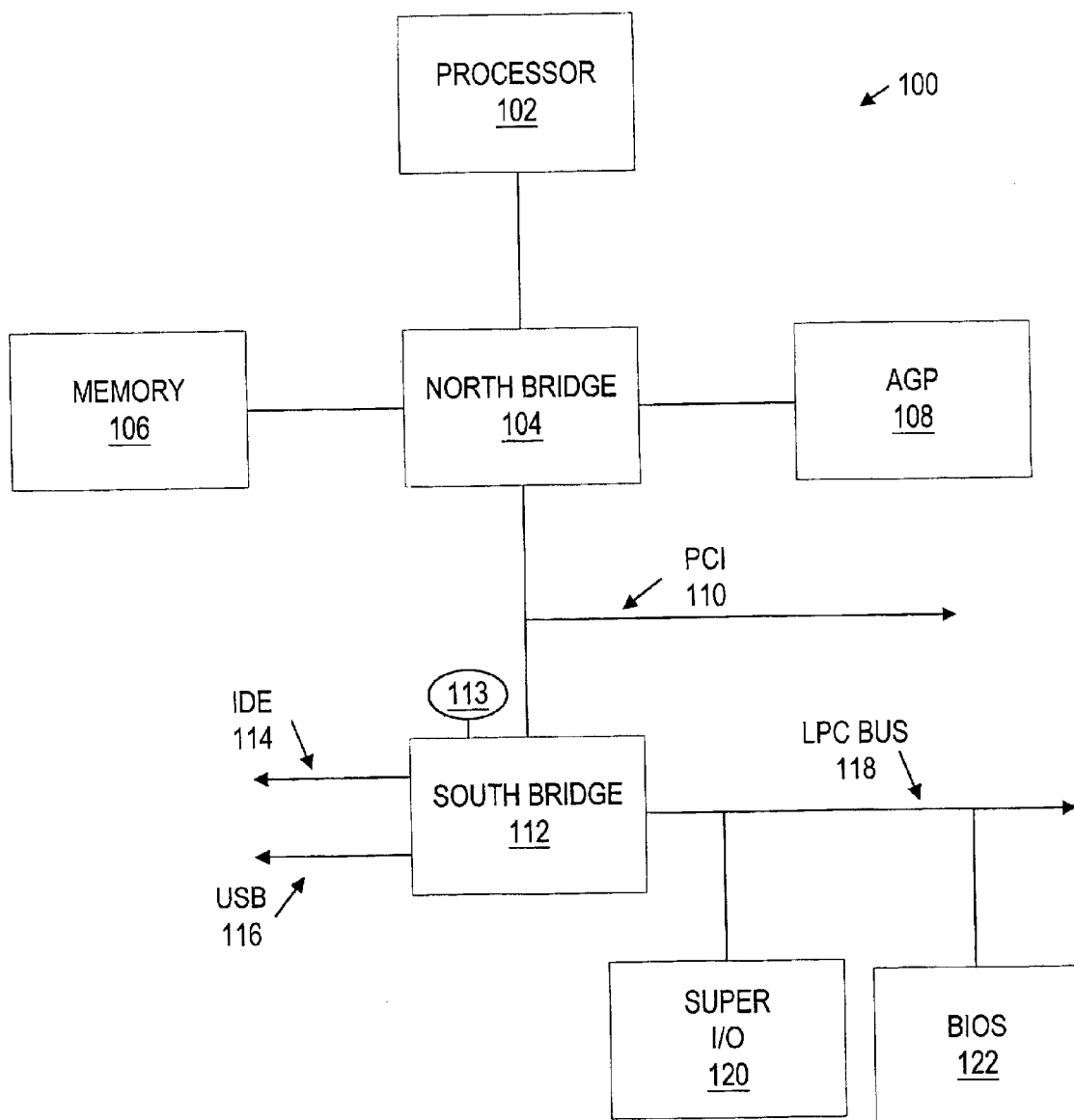
Figure 1B:
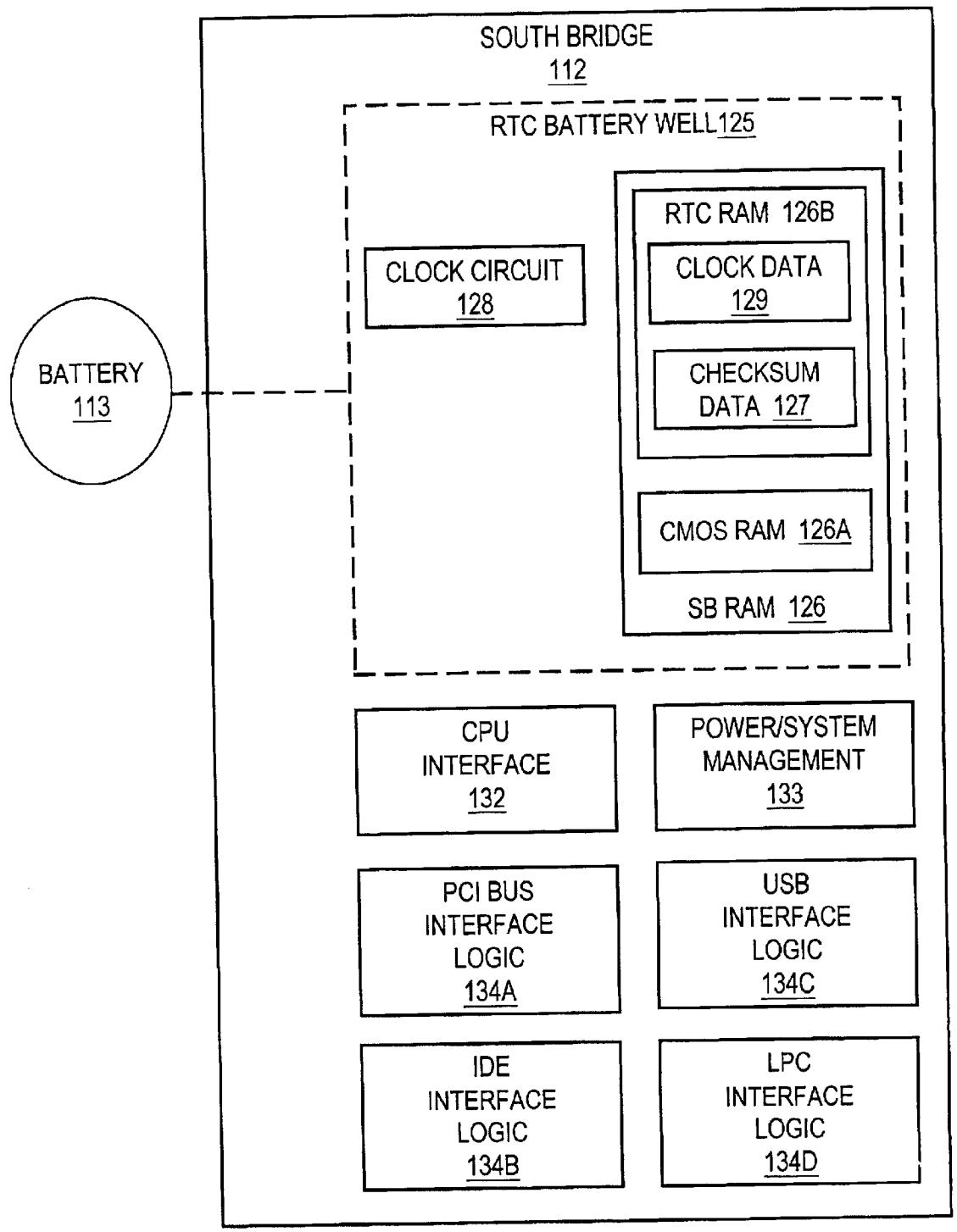
FIG. 1B illustrates a block diagram of a prior art south bridge.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The use of a letter in association with a reference number is intended to show alternative embodiments or examples of the item to which the reference number is connected.

System Management Mode (SMM) is a mode of operation in the computer system that was implemented to conserve power. The SMM was created for the fourth generation x86 processors. As newer x86 generation processors have appeared, the SMM has become relatively transparent to the operating system. That is, computer systems enter and leave the SMM with little or no impact on the operating system.

Figure 2A:
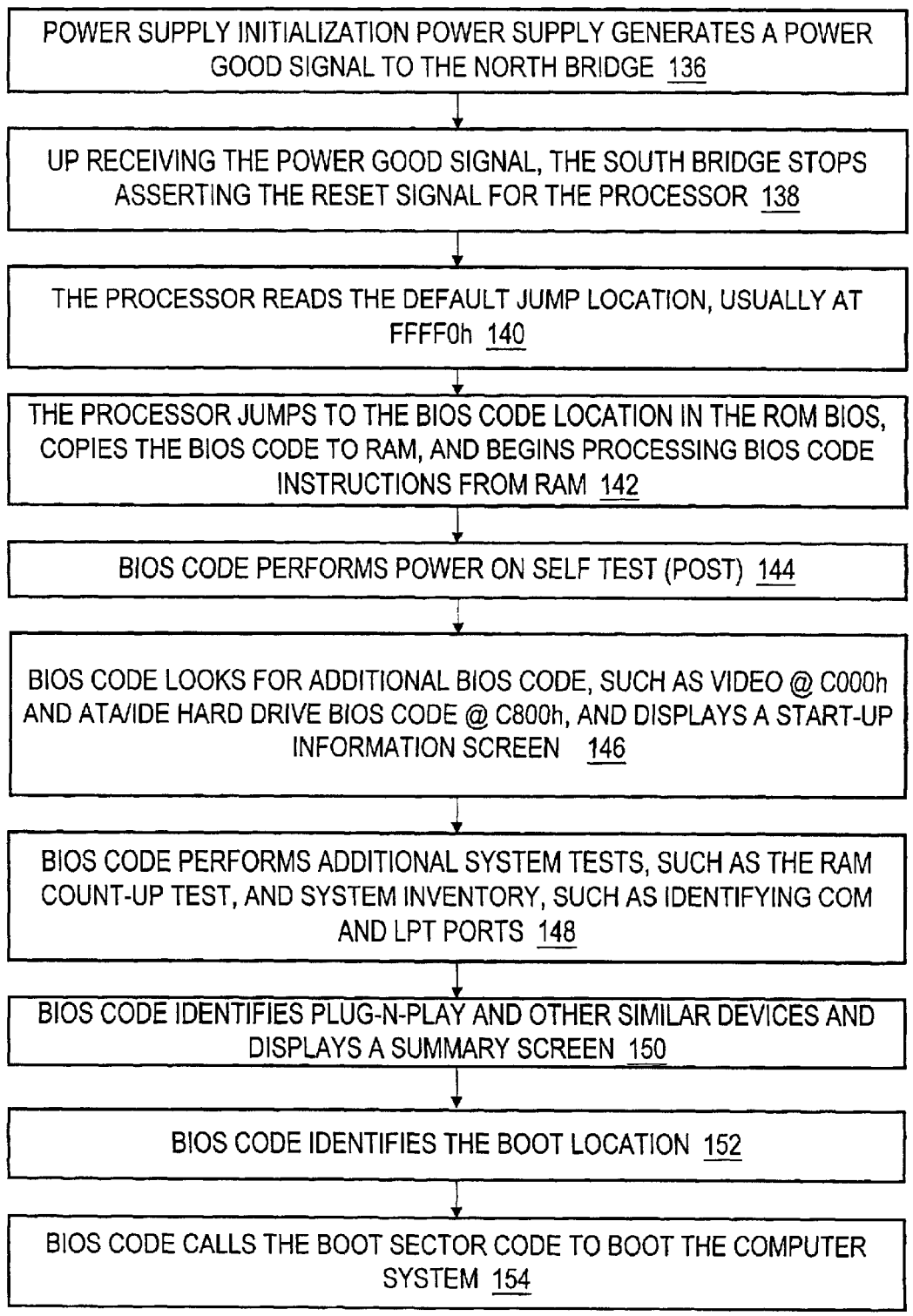
FIGS. 2A and 2B illustrate flowcharts of prior art methods for operating a computer D system using code stored in ROM.

Referring now to the drawings, and in particular to FIG. 2A, a flowchart of a prior art method of initializing a computer system using code stored in the BIOS 122 is shown. During initialization of the power supply, the power supply generates a power good signal to the north bridge, in block 136. Upon receiving the power good signal from the power supply, the south bridge (or north bridge) stops asserting the reset signal for the processor, in block 138.

During initialization, the processor reads the default jump location, in block 140. The default jump location in memory is usually at a location such as FFFF0h. The processor performs a jump to the appropriate BIOS code location (e.g. FFFF0h) in the ROM BIOS, copies the BIOS code to the RAM memory, and begins possessing the BIOS code instructions from the RAM memory, in block 142. The BIOS code, processed by the processor, performs a power-on self test (POST), in block 144.

The BIOS code next looks for additional BIOS code, such as from a video controller, IDE controller, SCSI controller, etc. and displays a start-up information screen, in block 146. As examples, the video controller BIOS is often found at C000h, while the IDE controller BIOS code is often found at C800h. The BIOS code may perform additional system tests, such as a RAM memory count-up test, and a system inventory, including identifying COM (serial) and LPT (parallel) ports, in block 148. The BIOS code also identifies plug-and-play devices and other similar devices and then displays a summary screen of devices identified, in block 150.

The BIOS code identifies the boot location, and the corresponding boot sector, in block 152. The boot location may be on a floppy drive, a hard drive, a CDROM, a remote location, etc. The BIOS code next calls the boot sector code at the boot location to boot the computer system, such as with an operating system, in block 154.

It is noted that for a cold boot or a hard (re)boot, all or most of the descriptions given in blocks 136–154 may occur. During a warm boot or a soft (re)boot the BIOS code usually jumps from block 142 into block 148, skipping the POST, memory tests, etc.

Figure 2B:
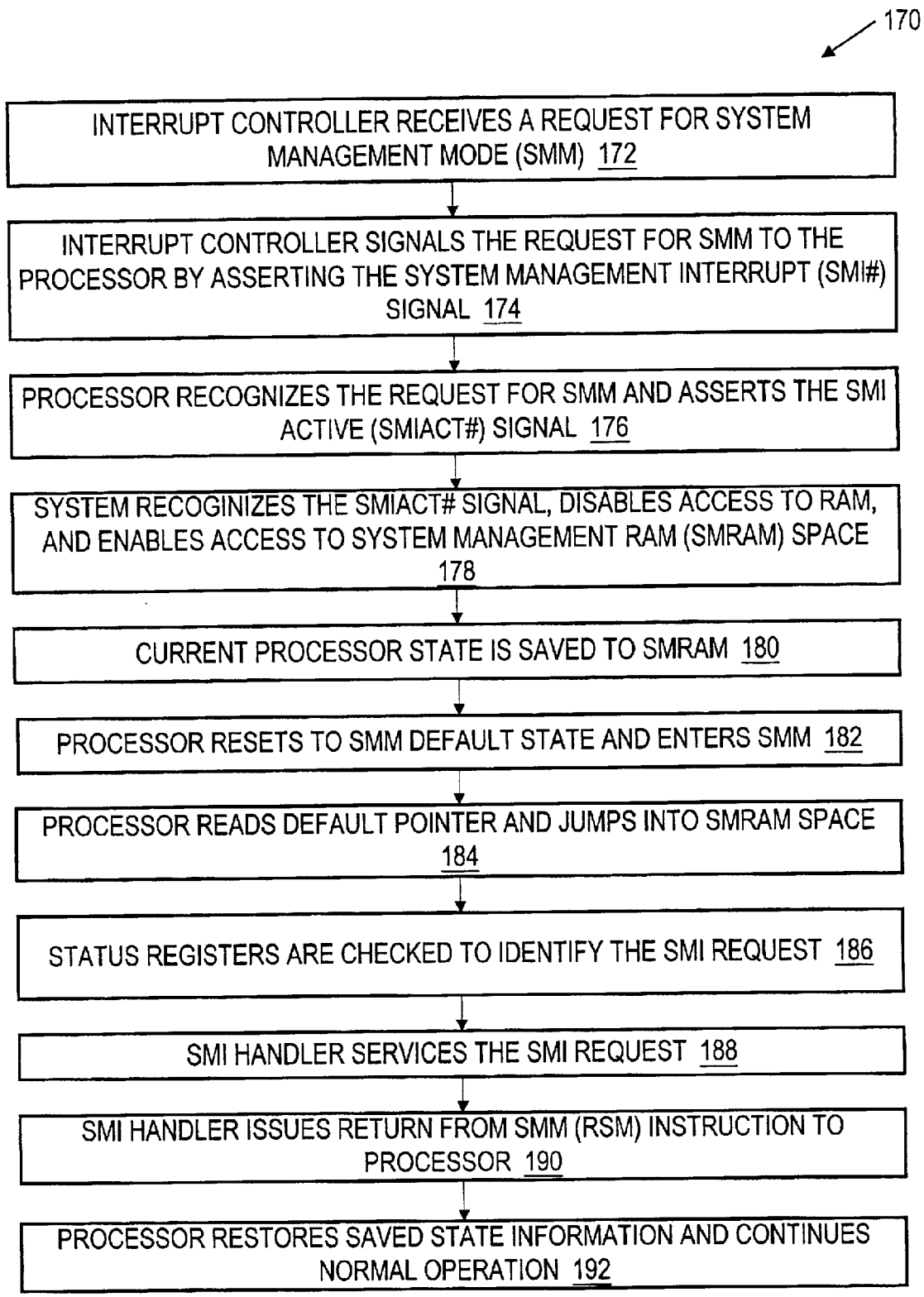

In FIG. 2B, a flowchart of a prior art method of operating a computer system in SMM using code stored in the BIOS 122 is shown. An interrupt controller receives a request for SMM, in block 172. The interrupt controller signals the request for SMM to the processor by asserting a system management interrupt (SMI#) signal, in block 174.

The processor recognizes the request for SMM and asserts an SMI ACTive (SMIACT#) signal, in block 176. The system recognizes the SMIACT# signal, disables access to the system RAM, and enables access to system management RAM (SMRAM) space, in block 178.

The current processor state is saved to SMRAM, in block 180. The processor resets to the SMM default state and enters SMM, in block 182. The processor next reads the default pointer and jumps to the appropriate place in SMRAM space, in block 184. In block 186, the source and/or nature of the SMI request is identified.

An SMI handler services the SMI request, in block 188. After servicing the SMI request, the SMI handler issues a return from SMM (RSM) instruction to the processor, in block 190. Upon operating on the RSM instruction, the processor restores the saved state information and continues normal operation, in block 192.

Figure 3:
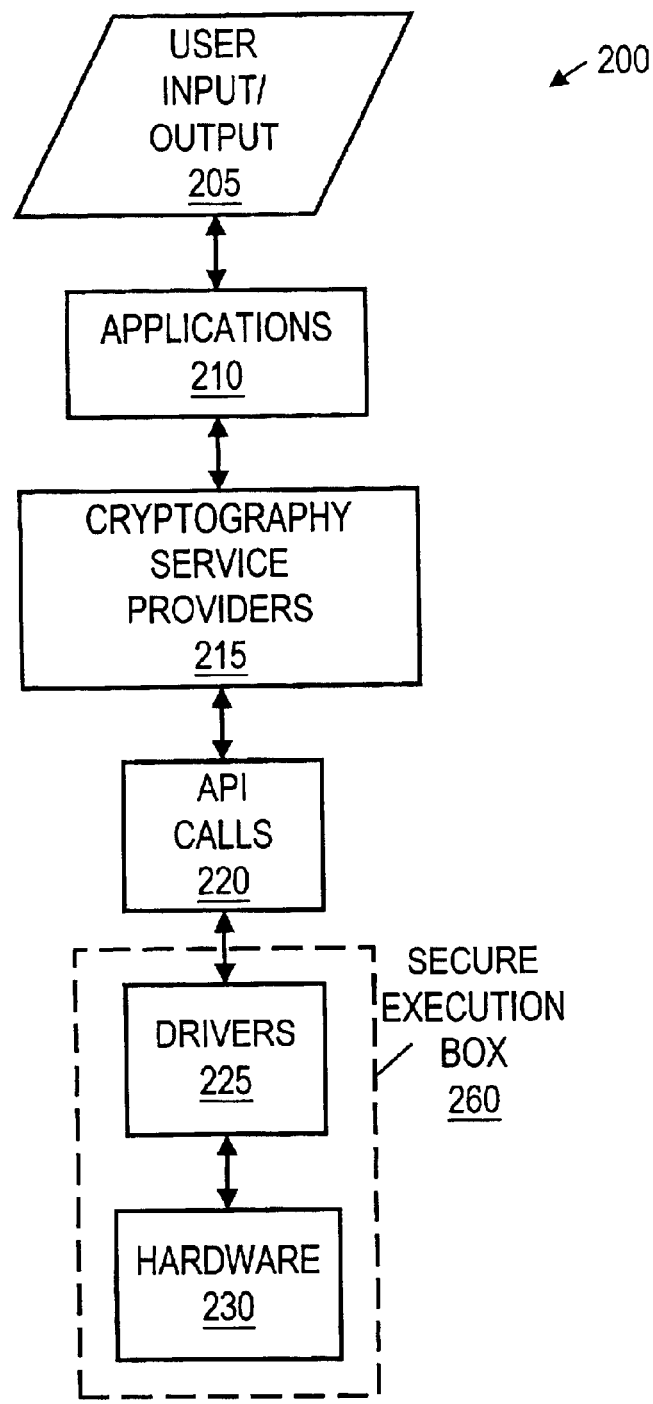
FIG. 3 illustrates a flowchart of an embodiment of data and command flow in a computer system having a secure execution box, according to one aspect of the present invention.

FIG. 3 illustrates a block diagram of an embodiment of a flowchart showing data and command flow in a computer system having a secure execution box 260, according to one aspect of the present invention. User input and output (I/O) data and/or commands 205 are provided to and received from one or more applications 210. The applications 210 exchange data and commands with cryptography service providers 215 within the computer system, such as the computer system 100 or any other computer system. The cryptography service providers 215 may use API (Application Programming Interface) calls 220 to interact with drivers 225 that provide access to hardware 230.

According to one aspect of the present invention, the drivers 225 and the hardware 230 are part of a secure execution box configured to operate in a secure execution mode (SEM) 260. Trusted privacy, security and ownership (PSO) operations, also referred to simply as security operations, may take place while the computer system is in SEM 260. Software calls propagated from the user I/O 205 and/or the applications 210 may be placed into the secure execution box in SMM 260 via an SMM initiation register 425B (or SMM initiator 425A) discussed below with respect to FIG. 5B (or FIG. 5A). Parameters may be passed into and out of the secure execution box in SEM 260 via an access-protected mailbox RAM 415, also discussed below with FIGS. 5A and 5B. The software calls have access to the secure execution box in SEM 260 to various security hardware resources, such as described in detail below.

In various embodiments of the present invention, power management functions may be performed inside SEM 260. One current standard for power management and configuration is the Advanced Configuration and Power Interface (ACPI) Specification. The most recent version is Revision 2.0, dated Jul. 27, 2000, and available from the ACPI website currently run by Teleport Internet Services, hereby incorporated herein by reference in its entirety. According to the ACPI specification, control methods, a type of instruction, tell the system to go do something. The ACPI specification does not know how to carry out any of the instructions. The ACPI specification only defines the calls, and the software must be written to carry out the calls in a proscribed manner. The proscribed manner of the ACPI specification is very restrictive. One cannot access some registers in your hardware. To access those registers, various aspects of the present invention generate an SMI# to enter SMM and read these registers. As power management has the potential to be abused e.g. change the processor voltage and frequency, raised above operating limits to destroy the processor, or lowered below operating limits leading to a denial of service, ACPI calls should be carried out in a secure manner, such as inside SEM 260.

Inside SEM 260, each ACPI request can be checked against some internal rules for safe behavior. Using terminology more completely described below, the ACPI request would be placed in the inbox of the mailbox, parameter values read from the inbox, the ACPI request evaluated using the inbox parameters for acceptability, and then either carryout the request or not, based on the evaluation results. For additional details of various embodiments, see FIGS. 6, 42A, and 42B below.

Figure 4:
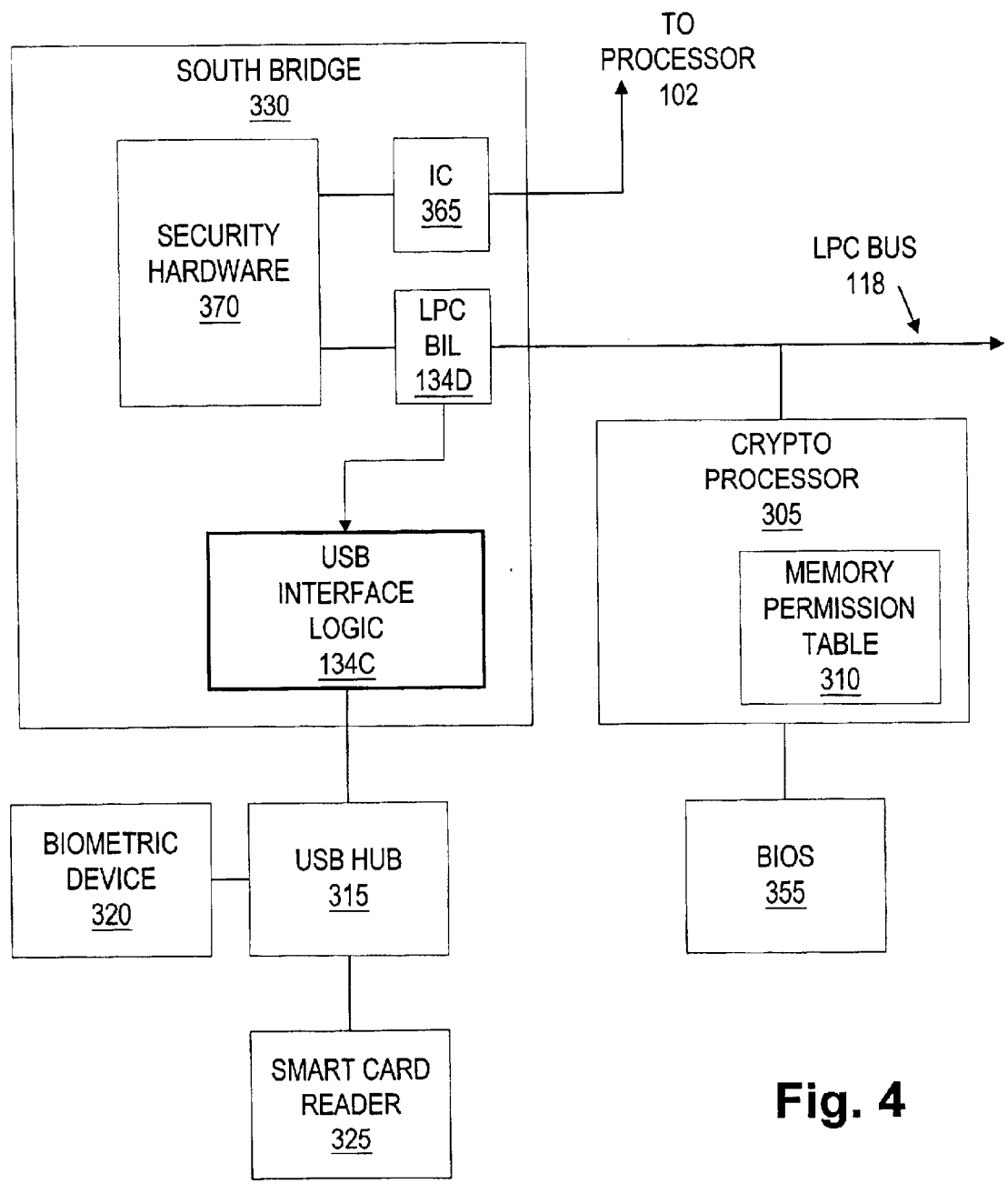
FIG. 4 illustrates a block diagram of an embodiment of a computer system including security hardware in the south bridge as well as a crypto-processor, according to one aspect of the present invention.

FIG. 4 illustrates a block diagram of an embodiment of a portion of an improved version of computer system 100 including security hardware 370 in a south bridge 330, as well as a crypto-processor 305, according to one aspect of the present invention. The south bridge 330 includes the security hardware 370, an interrupt controller (IC) 365, USB interface logic 134C, and the LPC bus interface logic (LPC BIL) 134D. The IC 365 is coupled to the processor 102. The USB interface logic 134C is coupled through an optional USB hub 315 to a biometric device 320 and a smart card reader 325. The LPC bus 118 is coupled to the south bridge 330 through the LPC BIL 134D. The crypto-processor 305 is also coupled to the LPC bus 118. A memory permission table 310 within the Crypto-processor 305 provides address mappings and/or memory range permission information. The memory permission table 310 may be comprised in a non-volatile memory. A BIOS 355, i.e. some memory, preferably read-only memory or flash memory, is coupled to the crypto-processor 305. The security hardware 370 may include both security hardware and secure assets protected by the security hardware.

The security hardware 370 in the south bridge 330 may be operable to provide an SMI interrupt request to the IC 365 for the processor 102. The security hardware 370 may also interact with the crypto-processor 305. Access to the BIOS 355 is routed through the crypto-processor 305. The crypto-processor 305 is configured to accept and transfer access requests to the BIOS 355. The crypto-processor 305 therefore may understand the address mappings of the BIOS 305. According to one aspect of the present invention, the security hardware 370 allows the computer system 100 to become an embodiment of the secure execution box 260 shown in FIG. 3.

In one embodiment, the crypto-processor 305 is configured to accept an input from the biometric device 320 and/or the smart card reader 325 over the USB interface, i.e. through the optional USB hub 315 and the USB interface logic 134C, and over the LPC bus 118. Other interfaces, such as IDE or PCI, may be substituted. The crypto-processor 305 may request one or more inputs from the biometric device 320 and/or the smart card reader 325 to authenticate accesses to the BIOS 355, other storage devices, and/or another device or subsystem in the computer system 100.

It is noted that the IC 365 may be included in the processor instead of the south bridge 330. The IC 365 is also contemplated as a separate unit or associated with another component of the computer system 100. It is also noted that the operations of the LPC bus 118 may correspond to the prior art Low Pin Count Interface Specification Revision 1.0 of Sep. 29, 1997. The operations of the LPC bus 118 may also correspond to the extended LPC bus disclosed in co-pending U.S. patent application Ser. No. 09/544,858, filed Apr. 7, 2000, entitled "Method and Apparatus For Extending Legacy Computer Systems", whose inventor is Dale E. Gulick, which is hereby incorporated by reference in its entirety. It is further noted that the USB interface logic 134C may couple to the LPC BIL 134D is any of a variety of ways, as is well known in the art for coupling different bus interface logics in a bridge.

Figure 5A:
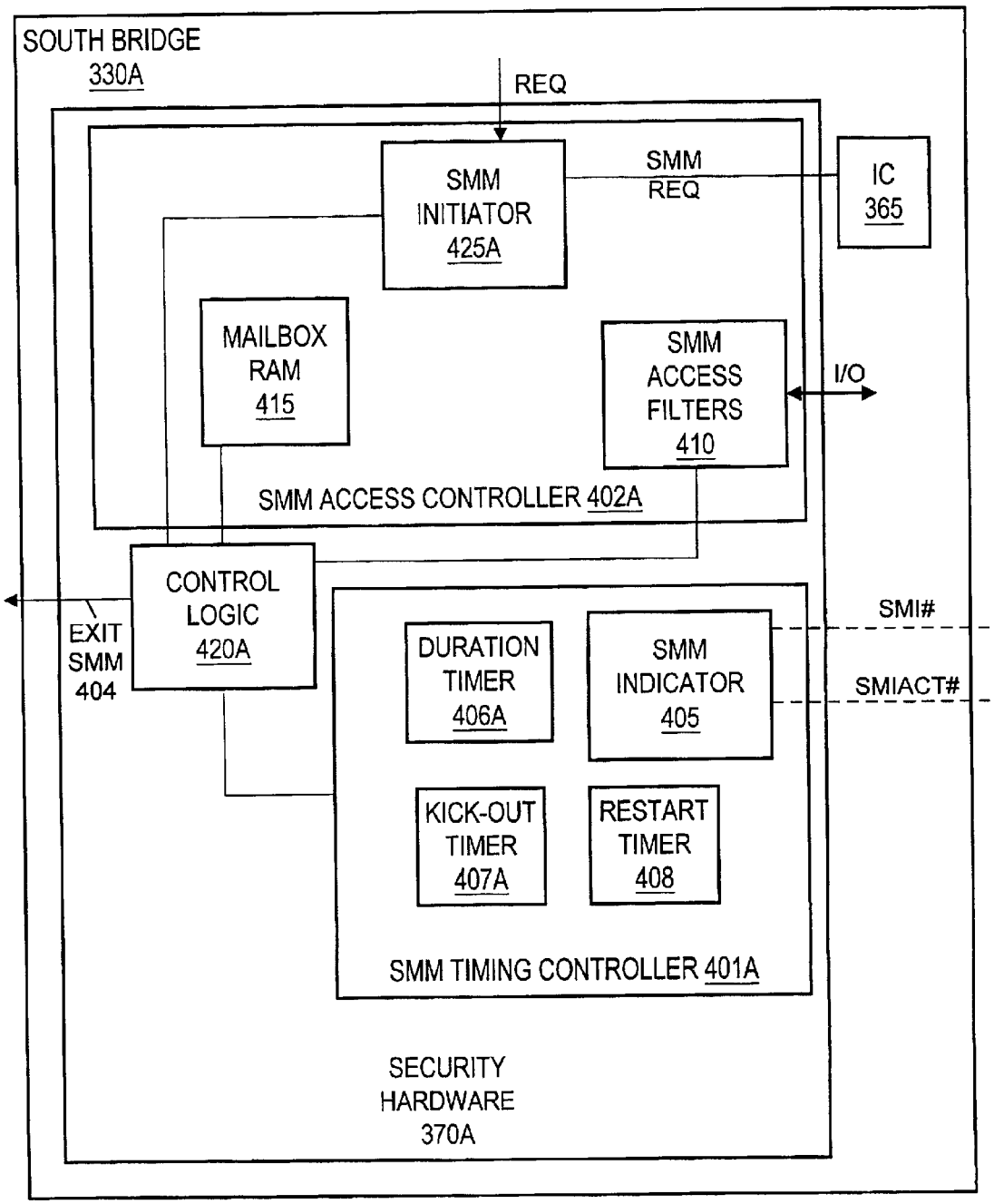
FIGS. 5A and 5B illustrate block diagrams of embodiments of a south bridge including security hardware for controlling SMM, according to various aspect of the present invention.
Figure 5B:
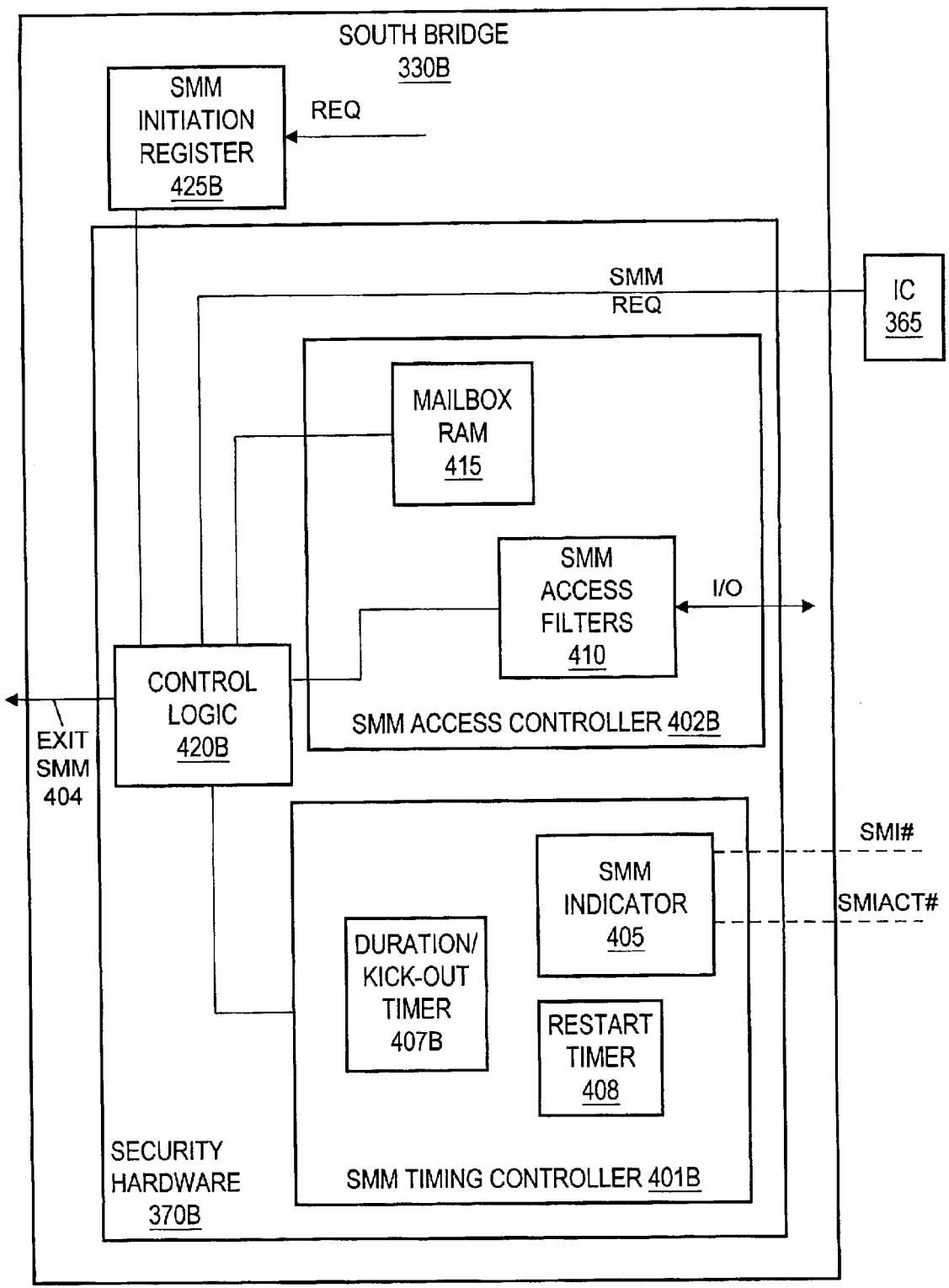

FIGS. 5A and 5B illustrate block diagrams of embodiments of the south bridge 330, including the security hardware 370, according to various aspects of the present invention. In FIG. 5A, the south bridge 330A includes the security hardware 370A and IC 365. The security hardware 370A includes sub-devices such as an SMM timing controller 401A, an SMM access controller 402A, and control logic 420A. The sub-devices may be referred to as security hardware or secure assets of the computer system 100. The SMM timing controller 401A includes an SMM indicator 405, a duration timer 406A, a kick-out timer 407A, and a restart timer 408. The SMM access controller 402A includes SMM access filters 410, mailbox RAM 415, and an SMM initiator 425A.

As shown in FIG. 5A, the control logic 420 is coupled to control operation of the SMM timing controller 401A, the SMM access controller 402A, and the SMM initiator 425A. Input and output (I/O) to the security hardware 370A pass through the SMM access filters 410 and are routed through the control logic 420A.

The SMM timing controller 401A includes the duration timer 406A, which measures how long the computer system 100 is in SMM. The kick-out timer 407A, also included in the SMM timing controller 401A, counts down from a predetermined value while the computer system 100 is in SMM. The control logic 420A is configured to assert a control signal (EXIT SMM 404) for the processor to exit SMM, such as in response to the expiration of the kick-out timer 407A. The restart timer 408, included in the SMM timing controller 401A, starts counting down from a predetermined value after the kick-out timer 407A reaches zero. The SMM indicator 405, also included in the SMM timing controller 401A, is operable to monitor the status of one or more signals in the computer system, such as the SMI# (System Management Interrupt) signal and/or the SMIACT# (SMI ACTive) signal to determine if the computer system is in SMM.

The SMM access controller 402A includes the SMM access filters 410, which are configured to accept input requests for the sub-devices within the security hardware 370A. When the computer system 100 is in SMM, the SMM access filters are configured to pass access requests (e.g. reads and writes) to the control logic 420A and/or the target sub-device. When the computer system 100 is not in SMM, the SMM access filters are configured to respond to all access requests with a predetermined value, such as all '1's. The SMM access controller 402A also includes the mailbox RAM 415. In one embodiment, the mailbox RAM 415 includes two banks of RAM, such as 512 bytes each, for passing parameters into and out of the secure execution box 260. Parameters passed to or from the sub-devices included within the security hardware 370 are exchanged at the mailbox RAM 415. One bank of RAM 415, an inbox, is write-only to most of all of the computer system in most operating modes. Thus, parameters to be passed to the sub-devices included within the security hardware 370 may be written into the inbox. During selected operating modes, such as SMM, both read and write accesses are allowed to the inbox. Another bank of RAM 415, an outbox, is read-only to most of all of the computer system in most operating modes. Thus, parameters to be received from the sub-devices included within the security hardware 370 may be read from the outbox. During selected operating modes, preferably secure modes, such as SMM, both read and write accesses are allowed to the outbox.

The SMM initiator 425A may advantageously provide for a convenient way to request that the computer system 100 enter SMM. A signal may be provided to the SMM initiator 425A over the request (REQ) line. The signal should provide an indication of the jump location in SMM memory. The SMM initiator 425A is configured to make a request for SMM over the SMM request (SMM REQ) line, for example, by submitting an SMI# to the interrupt controller 365. The SMM initiator 425A is also configured to notify the control logic 420A that the request for SMM has been received and passed to the interrupt controller 365.

In FIG. 5B, the south bridge 330B includes the security hardware 370B. The IC 365 is shown external to the south bridge 330B. The security hardware 370B includes an SMM timing controller 401B, an SMM access controller 402B, and control logic 420B. The SMM timing controller 401B includes an SMM indicator 405, a duration/kick-out timer 407B, and a restart timer 408. The SMM access controller 402B includes SMM access filters 410 and mailbox RAM 415. An SMM initiation register 425B is shown external to the south bridge 330B.

As shown in FIG. 5B, the control logic 420B is coupled to control operation of the SMM timing controller 401B and the SMM access controller 402B. Input and output (I/O) signals to the security hardware 370B pass through the SMM access filters 410 and are routed through the control logic 420B. The control logic 420B is also coupled to receive an indication of a request for SMM from the SMM initiation register 425B.

The SMM timing controller 401B includes the duration/kick-out timer 407B measures how long the computer system 100 is in SMM, counting up to a predetermined value while the computer system 100 is in SMM. The control logic 420B is configured to assert a control signal for the processor to exit SMM in response to the duration/kick-out timer 407B reaching the predetermined value. The restart timer 408 starts counting down from a predetermined value after the duration/kick-out timer 407B reaches the predetermined value. The SMM indicator 405 is operable to monitor the status of one or more signals in the computer system, such as the SMI# (System Management Interrupt) signal and/or the SMIACT# (SMI ACTive) signal, to determine if the computer system is in SMM.

The SMM access controller 402B includes the SMM access filters 410, which are configured to accept input requests for the sub-devices within the security hardware 370B. When the computer system 100 is in SMM, the SMM access filters are configured to pass access requests (e.g. reads and writes) to the control logic 420B and/or the target sub-device. When the computer system 100 is not in SMM, the SMM access filters may be configured to respond to all access requests with a predetermined value, such as all '1's. The SMM access controller 402B also includes the mailbox RAM 415, described above with respect to FIG. 5A.

The SMM initiation register 425B may advantageously provide for a convenient way to request that the computer system 100 enter SMM. A signal may be provided to the SMM initiation register 425B over the request (REQ) line. The signal should provide an indication of the jump location in SMM memory. The SMM initiation register 425B is configured to provide the indication to the control logic 420B. The control logic 420B is configured to make a request for SMM over the SMM request (SMM REQ) line, for example, by submitting an SMI# to the interrupt controller 365.

It is noted that in the embodiment illustrated in FIG. 5A, the SMM initiator 425A includes internal logic for handling the SMM request. In the embodiment illustrated in FIG. 5B, the SMM initiation register 425B relies on the control logic 420B to handle the SMM request. It is also noted that the SMM initiator 425A is part of the security hardware 370A, while the SMM initiation register 425B is not part of the security hardware 370B.

Figure 6:
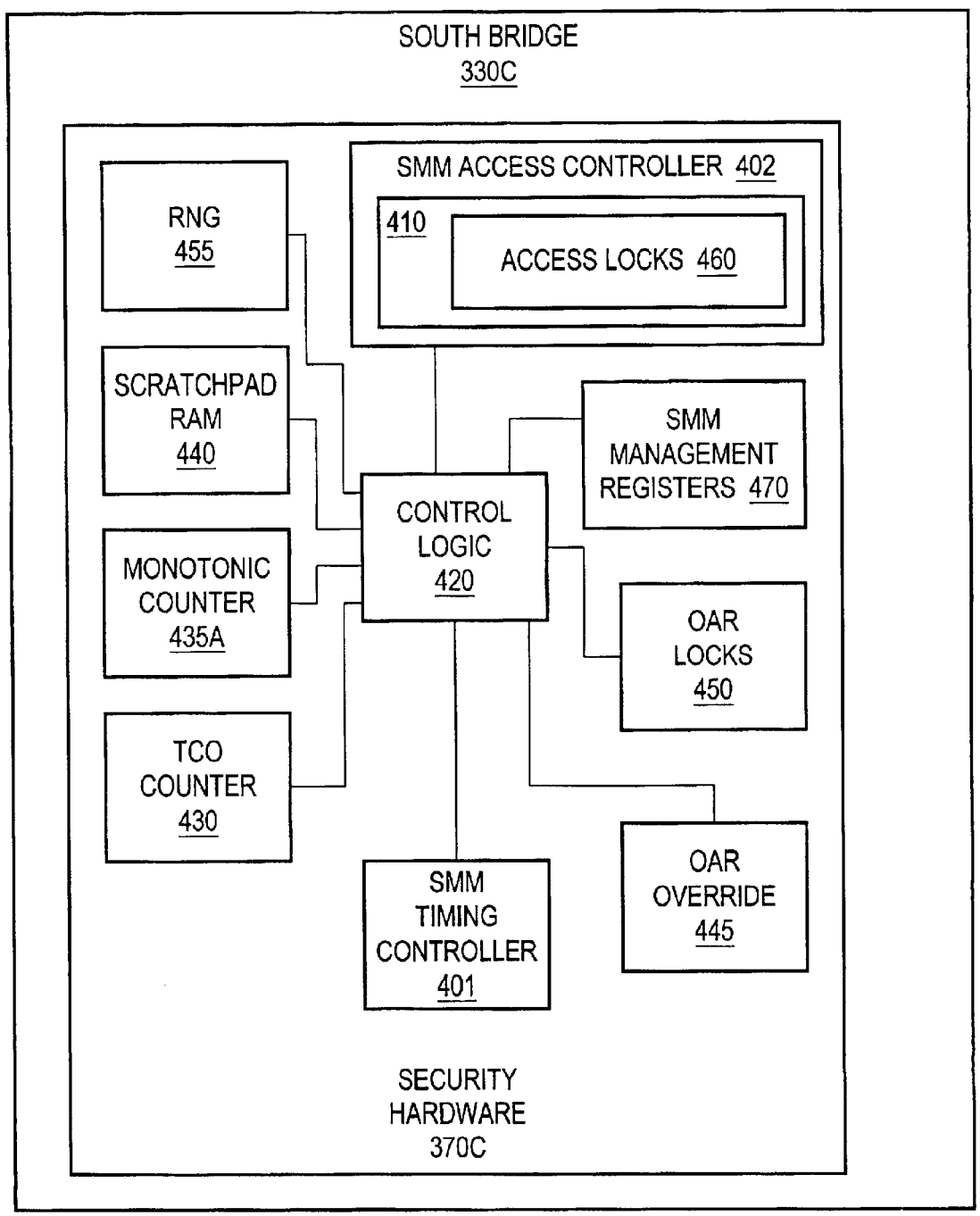
FIG. 6 illustrates a block diagram of an embodiment of a south bridge including security hardware for secure SMM operations, according to one aspect of the present invention.

FIG. 6 illustrates a block diagram of an embodiment of the south bridge 330C including security hardware 370C, according to one aspect of the present invention. As shown, the security hardware 370C includes subdevices, such as the SMM timing controller 401, the SMM access controller 402, the control logic 420, a TCO counter 430, a monotonic counter 435A, the scratchpad RAM 440, a random number generator 455, secure system (or SMM) management registers 470, OAR—(Open At Reset) locks 450, and an OAR override register 445. The SMM access controller 402 includes one or more access locks 460 within the SMM access filters 410. Some aspects of embodiments of the SMM timing controller 401, the SMM access controller 402, and the control logic 420 are described herein with respect to FIGS. 5A and 5B, above.

The embodiment of the SMM access controller 402 illustrated in FIG. 6 includes the one or more access locks 460 within the SMM access filters 410. The access locks 460 provide a means of preventing (or locking) and allowing (or unlocking) access to one or more of the devices within the security hardware 370C. Various embodiments for the one or more access locks 460 are shown in FIGS. 17A–17C and described with reference thereto.

In one embodiment, the access locks 460 are open at reset (OAR), allowing the BIOS software access to the security hardware 370. The BIOS software then closes the access locks 460 prior to calling the boot sector code, shown in block 154 in FIG. 2A. In various embodiments, the access locks 460 may be opened by software or hardware to allow for access to the security hardware 370. For example, the access locks 460 may be opened by a signal from the IC 365 or the processor 102 (or 805A or 805B from FIGS. 9A and 9B) or the control logic 420. The access locks 460 may be opened in response to an SMI# or in response to the processor 102 or 805 entering SMM. Additional information on the access locks 460 may be obtained from one or more of the methods 1600A–1600C described below with respect to FIGS. 16A–16C.

The TCO counter (or timer) 430 may include a programmable timer, such as a count-down timer, that is used to detect a lock-up of the computer system 100. Lock-up may be defined as a condition of the computer system 100 where one or more subsystems or components do not respond to input signals for more than a predetermined period of time. The input signals may include internal signals from inside the computer system 100 or signals from outside the computer system 100, such as from a user input device (e.g. keyboard, mouse, trackball, biometric device, etc.). It is also noted that the lock-ups may be software or hardware in nature. According to various aspects of the present invention, the TCO counter 430 may be programmed and read from inside SMM. The TCO counter 430 is preferably programmed with value less than a default duration for the kick-out timer 407. In one embodiment, the TCO timer 430 generates an SMI# upon a first expiration of the TCO timer 430, and the TCO timer 430 generates a reset signal for the computer system upon a second, subsequent expiration of the TCO timer 430.

In one embodiment, the TCO timer 430 may be accessed by the computer system 100 or software running in the computer system 100 for the computer system 100 to recover from lock-ups when the computer system is not in SMM. In another embodiment, the TCO timer 430 may be accessed by the computer system 100 both in and out of SMM.

The monotonic counter 435A comprises a counter, preferably at least 32 bits and inside the RTC battery well 125, which updates when the value stored in the monotonic counter 435A is read. The monotonic counter 435A is configured to update the value stored to a new value that is larger than the value previously stored. Preferably, the new value is only larger by the smallest incremental amount possible, although other amounts are also contemplated. Thus, the monotonic counter 435A may advantageously provide a value that is always increasing up to a maximum or rollover value. Additional details may be found below with respect to FIGS. 8, 12, and 13.

The scratchpad RAM 440 includes one or more blocks of memory that are available only while the computer system 100 is in certain operating modes, such as SMM. It is also contemplated that other sub-devices of the security hardware 370 may use the scratchpad RAM 440 as a private memory. One embodiment of the scratchpad RAM 440 includes 1 kB of memory, although other amounts of memory are also contemplated. In one embodiment, the scratchpad RAM is open at reset to all or most of the computer system 100, while in another embodiment, the scratchpad RAM is inaccessible while the computer system is booting.

The random number generator (RNG) 455 is configured to provide a random number with a number of bits within a predetermined range. In one embodiment, a new random number with from 1 to 32 bits in length is provided in response to a request for a random number. It is noted that restricting access to the RNG, such as only in SMM, may advantageously force software to access the RNG through a standard API (application programming interface), allowing for increased security and easing hardware design constraints. Additional details may be found below with respect to FIGS. 14 and 15.

The OAR locks 450 may include a plurality of memory units (e.g. registers), which include associated programming bit (or lock bits) that lock the memory (or memories) used to store BIOS information or other data, for example, BIOS ROM 355 and SMM ROM 550 in FIGS. 7A and 7B below. Each memory unit may have, by way of example, three lock bits associated with it. In one embodiment, four 8-bit registers may store the lock bits for each 512 kB ROM-page, one register for every two 64-kB segment. With sixteen blocks of four registers, a maximum of 8 MB of ROM may be locked. Addressing may be as follows:

| 64-kB segment | Register | ADDRESS |
| --- | --- | --- |
| 0, 1 | Register 0 | FFBx,E000h |
| 2, 3 | Register 1 | FFBx,E001h |
| 4, 5 | Register 2 | FFBx,E002h |
| 6, 7 | Register 3 | FFBx,E003h |

Each physical ROM chip may include four identification pins (ID[3:0]), known as strapping pins. The strapping pins may be used to construct sixteen spaces of 64 kB each. The 'x' in the address may represent the decode of the strapping pins, or the inverse.

The lock registers from the OAR locks 450 may include:

| Register\Bits | 7 | OAR Lock 6:4 | 3 | OAR Lock 2:0 |
|---|---|---|---|---|
| Register 0 | Reserved | Segment 1 | Reserved | Segment 0 |
| Register 1 | Reserved | Segment 3 | Reserved | Segment 2 |
| Register 2 | Reserved | Segment 5 | Reserved | Segment 4 |
| Register 3 | Reserved | Segment 7 | Reserved | Segment 6 |

In one embodiment, one bit controls write access, one bit controls read access, and one bit prevents the other two bits from being changed. In one embodiment, once the locking bit is set (also described as the state being locked down), the write access bit and read access bit cannot be reprogrammed until the memory receives a reset signal. The layout of each register may include:

| Bit | 7 | 6 | 5 | 4 | 3 | 2 | 1 | 0 |
|---|---|---|---|---|---|---|---|---|
| Value | Rsvrd | Lock 2 | Lock 1 | Lock 0 | Rsvrd | Lock 2 | Lock 1 | Lock 0 |

With a decode of the three lock bits including:

| Decode | Read Lock Data 2 | Lock-Down Data 1 | Write Lock Data 0 | Resulting block state |
|---|---|---|---|---|
| 0x00 | 0 | 0 | 0 | Full access |
| 0x01 | 0 | 0 | 1 | Write locked (default state) |
| 0x02 | 0 | 1 | 0 | Lock open (full access locked down) |
| 0x03 | 0 | 1 | 1 | Write locked down |
| 0x04 | 1 | 0 | 0 | Read locked |
| 0x05 | 1 | 0 | 1 | Read and write locked |
| 0x06 | 1 | 1 | 0 | Read locked down |
| 0x07 | 1 | 1 | 1 | Read and write locked down |

The embodiment of the security hardware 370C illustrated in FIG. 6 also includes the OAR override register 445. The OAR override register 445 provides a mechanism for allowing (or unlocking) and preventing (or locking) access to one or more of the devices within the security hardware 370C. The OAR override register 445 also provides a mechanism to override the access locks 460. In one embodiment, the OAR override register 445 includes a first indicator that the access locks 460 are to be ignored, with access to the security hardware locked by the access locks 460 either always available or never available, as implemented. The OAR override register 445 may also include a second indicator that the status of the first indicator may be changed, or not. If the second indicator shows that the first indicator may not be changed, then the device including the OAR override register 445 preferably needs reset for the second indicator to be changed. In other words, the second indicator is preferably OAR, similar to one embodiment of the access locks 460.

Methods that include using the access locks 460 and/or the OAR override indicators are described below with respect to FIGS. 16A–16F. Various embodiments for the one or more access locks 460 are shown in FIGS. 17A–17C and described with reference thereto, and an embodiment of the OAR override register 445 is shown in FIG. 17D and described with reference thereto.

Example embodiments of the secure system management registers 470 are shown below in FIGS. 98A and 98B and described therewith. Briefly, in one embodiment, the secure system management registers 470 include one or more ACPI lock bits 9810 to secure various ACPI or related functions against unauthorized changes. The ACPI lock bits 9810, once set, prevent changes to the ACPI or related functions. A request to change one of the ACPI or related functions requires that a respective ACPI lock bit 9810N be released before the respective one of the ACPI or related functions is changed. In another embodiment, the secure system management registers 470 include one or more ACPI range registers 9820 and/or one or more ACPI rule registers 9830. Each ACPI range register 9820 may be configured to store a value or values that define allowable or preferred values for a specific ACPI or related function. Each ACPI rule register 9830 may be configured to store part or all of a rule for determining if a change to one of the ACPI or related functions should be allowed. Examples of ACPI or related functions include changing a voltage, changing a frequency, turning on or off a cooling fan, and a remote reset of the computer system.

In one embodiment, the access locks 460 are open at reset (OAR), allowing the BIOS software access to the security hardware 370. The BIOS software then closes the access locks 460 prior to calling the boot sector code, shown in block 154 in FIG. 2A. In various embodiments, the access locks 460 may be opened by software or hardware to allow for access to the security hardware 370. For example, the access locks 460 may be opened by a signal from the IC 365 or the processor 102 (or 805A or 805B from FIGS. 9A and 9B) or the control logic 420. The access locks 460 may be opened in response to an SMI# or in response to the processor 102 or 805 entering SMM. Additional information on the access locks 460 may be obtained from one or more of the methods 1600A–1600C described below with respect to FIGS. 16A–16C.

It is noted that in one embodiment, all of the security hardware 370 (and the SMM initiation register 425B are inside the RTC battery well 125. In other embodiments, selected sub-devices of the security hardware 370 are excluded from the RTC battery well 125. In one embodiment, only a portion of the scratchpad RAM 440 is inside the RTC battery well 125 with the remaining portion outside the RTC battery well 125. For example, in one embodiment, the mailbox RAM 415 is outside the RTC battery well 125.

Figure 7A:
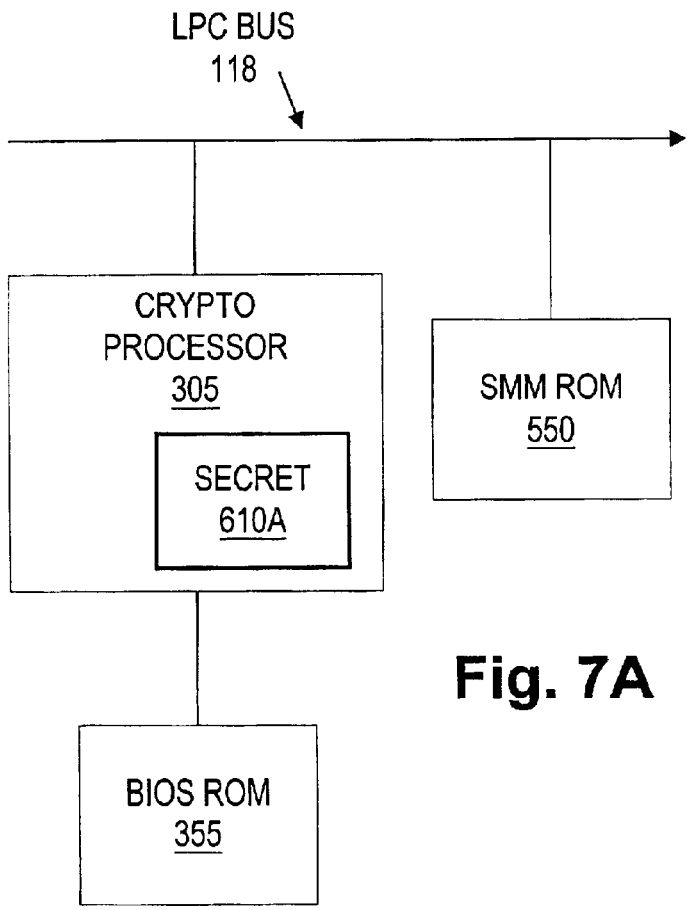
FIGS. 7A, 7B, 7C, and 7D illustrate embodiments of secure storage, according to various aspects of the present invention.
Figure 7B:
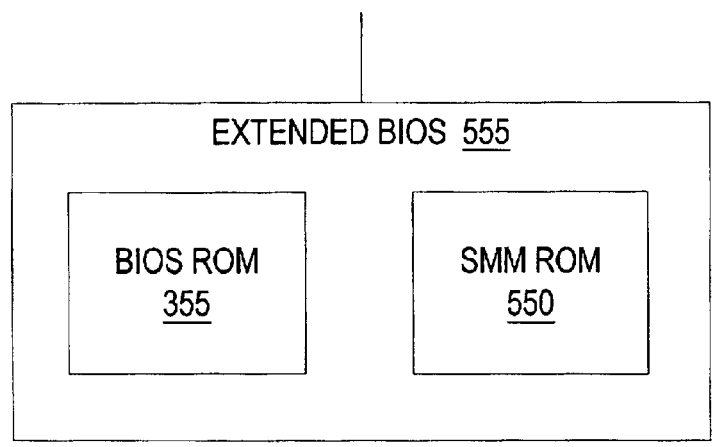

FIGS. 7A and 7B illustrate embodiments of extended BIOS security, according to various aspects of the present invention. In FIG. 7A, the BIOS ROM 355 and the SMM ROM 550 are coupled to the LPC bus 118. As shown, a crypto processor 305, including a secret 610A, is coupled between the BIOS ROM 355 and the LPC bus 118. In FIG. 7B, an extended BIOS ROM 555 is shown coupled to the LPC bus 118. The extended BIOS ROM 555 includes the BIOS ROM 355 and the SMM ROM 550.

BIOS ROM 355 memory space in the computer system 100 may include anywhere from 128 kB to 4 MB, divided into 64 kB segments. An additional one or more 4 MB of SMM ROM 550 memory space may be addressed via a paging mechanism, for example, where the second page of ROM memory space is within separate chips and selected by an additional set of identification select (IDSEL) pins. Each segment of the BIOS ROM 355 memory space and the SMM ROM 550 memory space may be lockable, and open at reset. In one embodiment, the access protection mechanism (i.e. the lock) is not implemented in the BIOS ROM 355 or SMM ROM 550, but, for example, in the south bridge 330C in the security hardware 370C, as previously described with respect to FIG. 6.

In one embodiment, the BIOS ROM 355 includes 4 MB of memory space. Read access to the BIOS ROM 355 memory space may be unrestricted at any time. Write locks on the BIOS ROM 355 memory space may be OAR and cover the memory space from FFFF,FFFFh to FFC0,0000h, in 32-bit address space on the LPC bus 145.

In one embodiment, the crypto processor 305 is a specialized processor that includes specialized cryptographic hardware. In another embodiment, the crypto processor 305 includes a general-purpose processor programmed with cryptographic firmware or software. In still another embodiment, the crypto processor 305 includes a general-purpose processor modified with specialized cryptographic hardware. Selected methods that may use or include the crypto processor 305 are described with respect to FIGS. 25A–26, with an example of a prior art challenge-response authentication (or verification) method shown in FIG. 28.

Other embodiments are also contemplated. For example, the BIOS ROM 355 may be coupled to the LPC bus 118, and the crypto processor 305 may be coupled between the SMM ROM 550 and the LPC bus 118. Also, the crypto processor 305 may be coupled between the extended BIOS ROM 555 and the LPC bus 118.

Figure 7C:
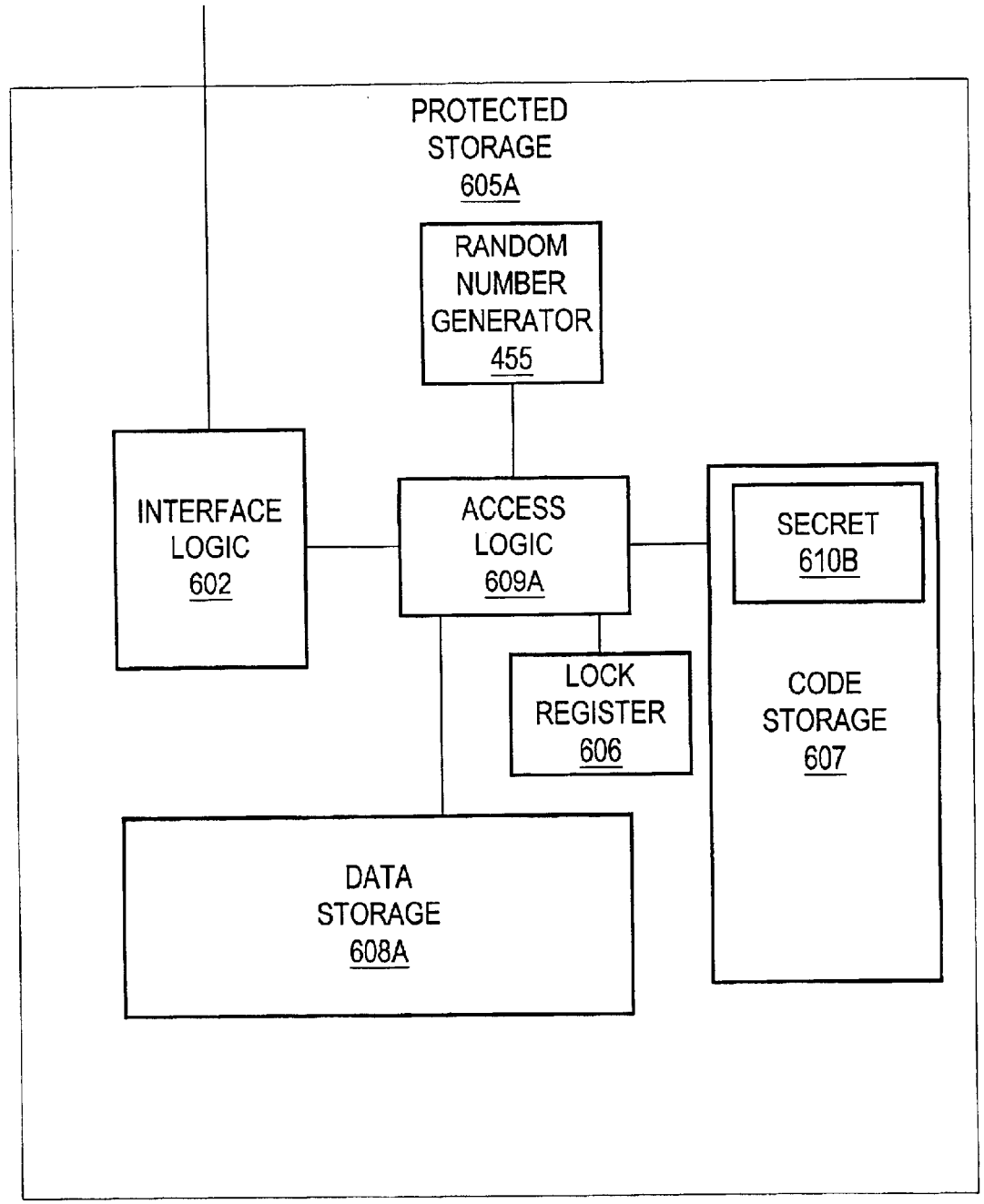
Figure 7D:
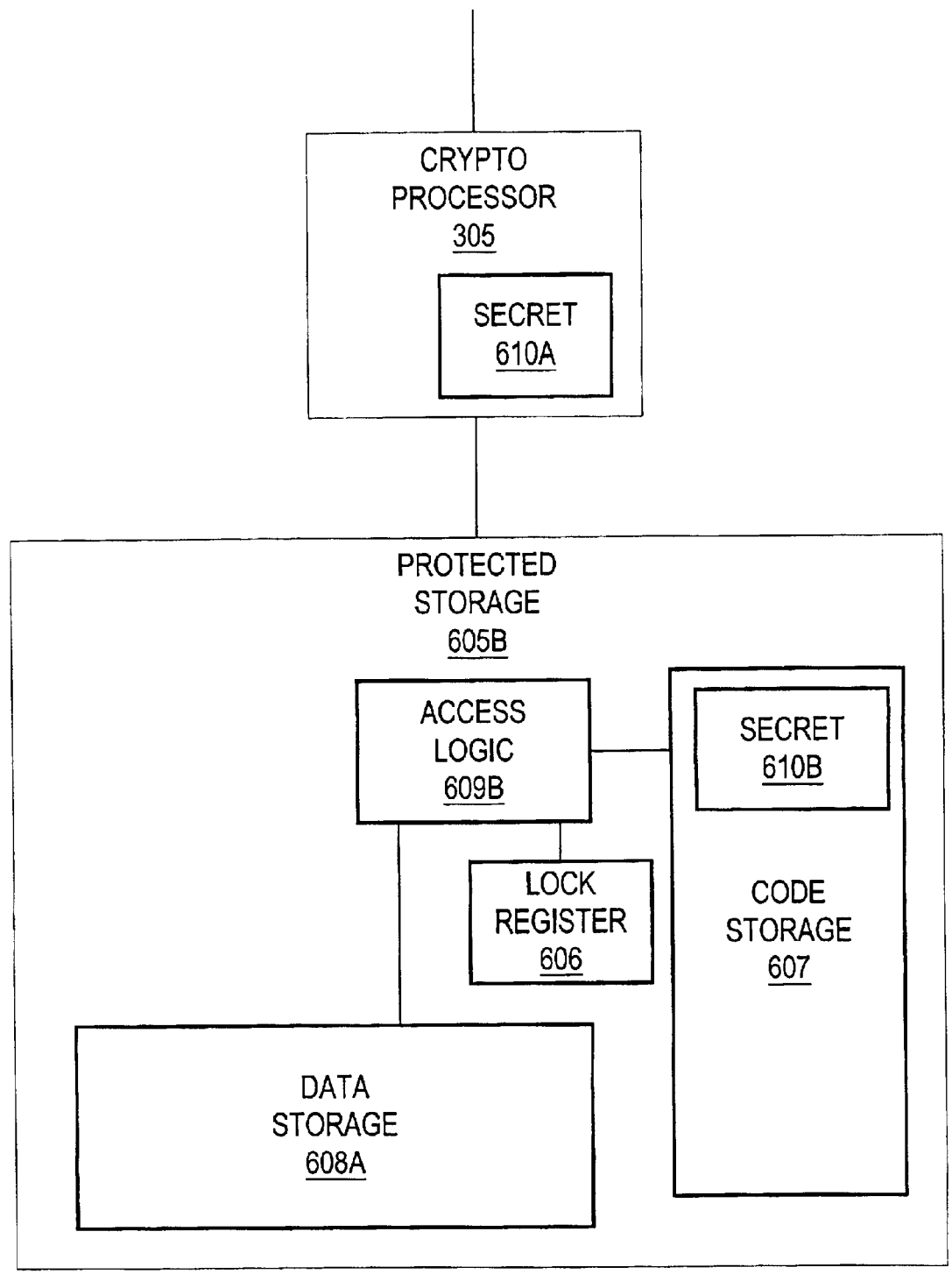

FIG. 7C illustrates an embodiment of protected storage 605, according to one aspect of the present invention. As shown, protected storage 605 is coupled to the LPC bus 118 and includes logic 609 and secret 610B, in addition to its storage locations. The protected storage 605 may include memory, such as RAM, ROM, flash memory, etc., or other storage media, such as hard drives, CDROM storage, etc. Although shown as a single unit, the protected storage is also contemplated as a subsystem that includes separate components for storage and logic, such as shown in FIG. 7D. According to FIG. 7D, a crypto-processor 305, including a secret 610A, is coupled in front of a protected storage 605B. Access to the protected storage 605B is through the crypto-processor 305. The protected storage 605B includes data storage 608A, access logic 609B, a lock register 606, and code storage 607, including a secret 610B.

Figure 8A:
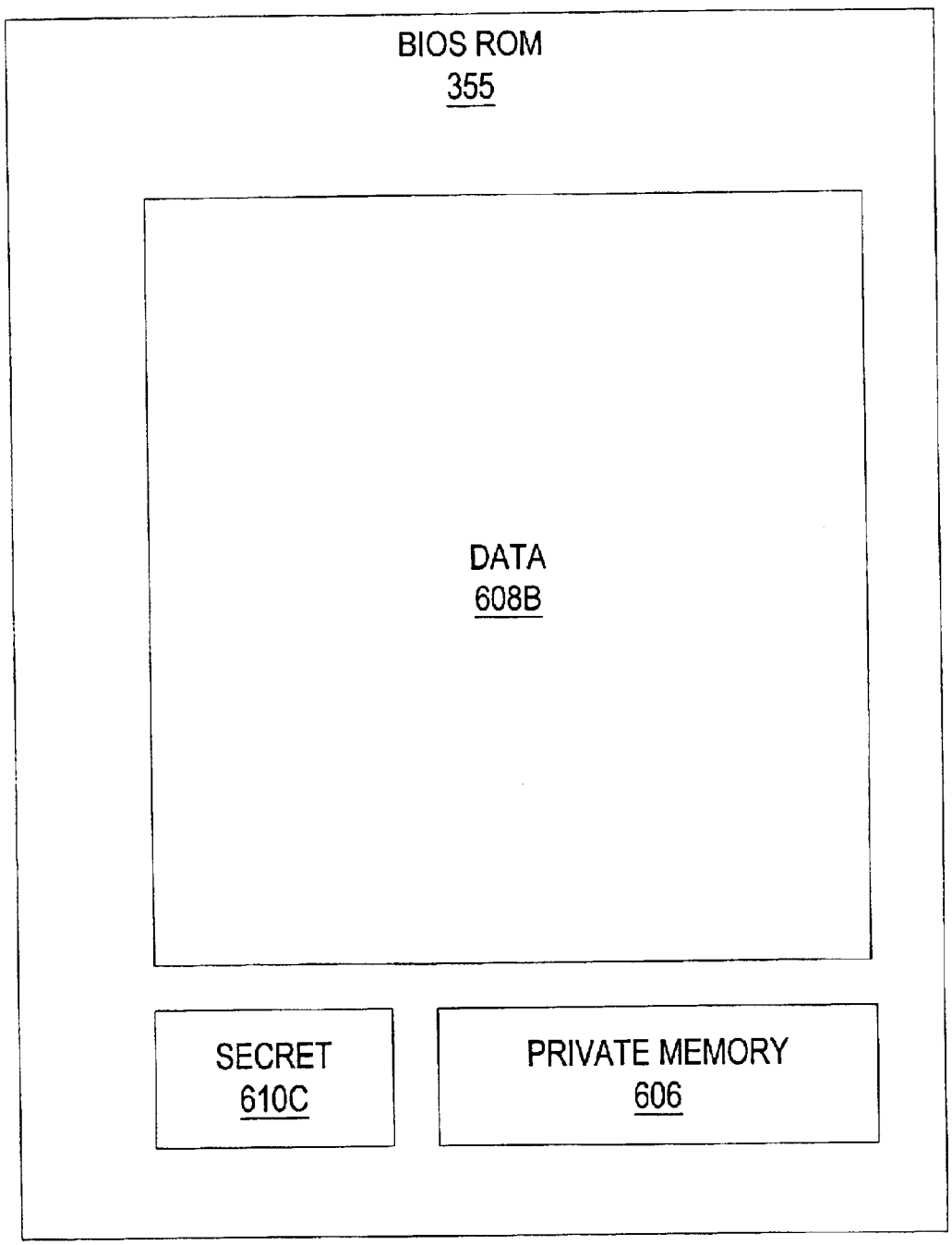
FIGS. 8A and 8B illustrate block diagrams of embodiments of a BIOS ROM and an SMM ROM for secure SMM operations, respectively, according to various aspects of the present invention.
Figure 8B:
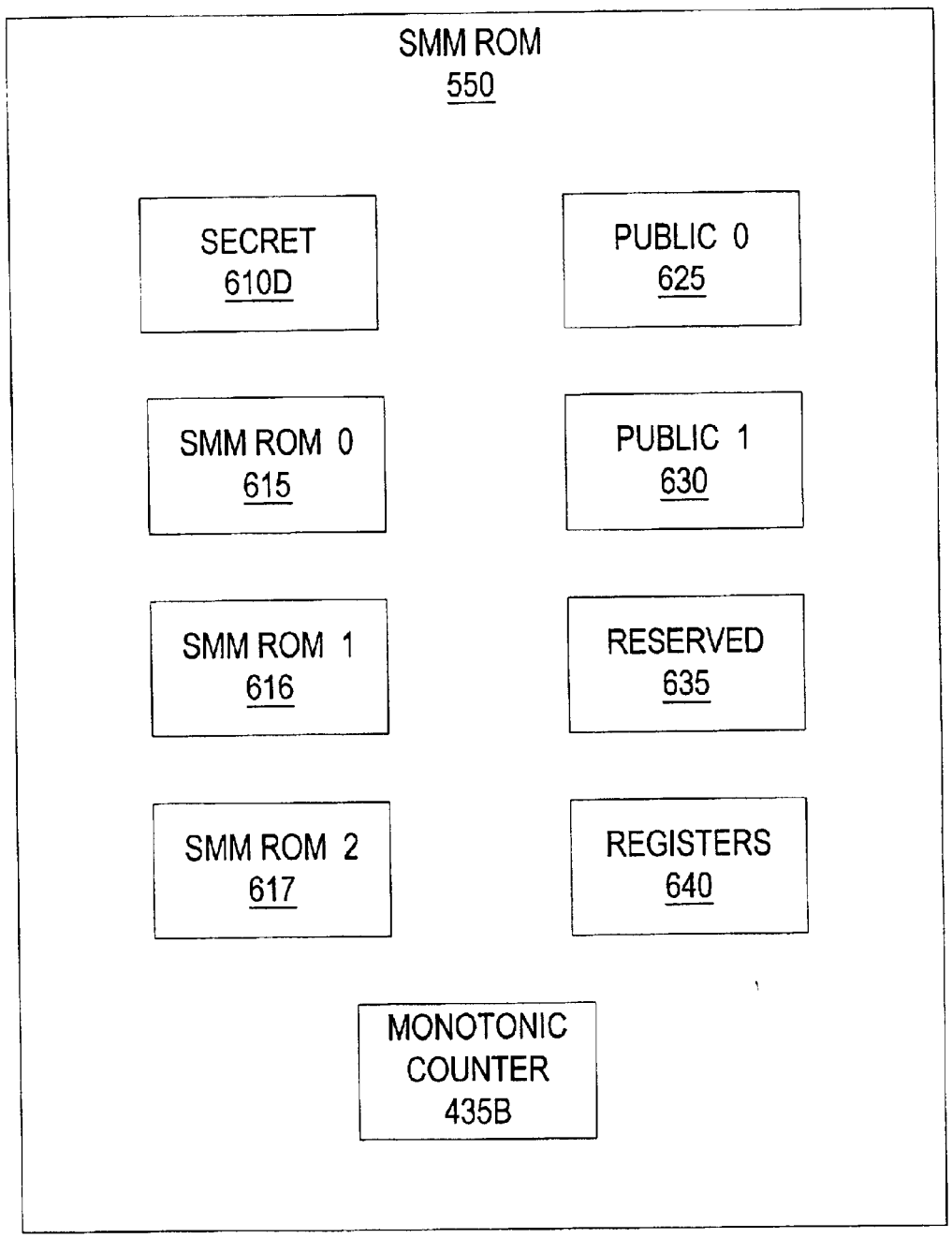

FIGS. 8A and 8B illustrates block diagrams of embodiments of a BIOS ROM 355 and an SMM ROM 550 for secure SMM operations, respectively, according to various aspects of the present invention. As shown in FIG. 8A, the BIOS ROM 355 may include data storage 608B, a secret 610C, and private memory 606.

As shown in FIG. 8B, the SMM ROM 550 may be divided into a plurality of SMM ROM blocks 605–615, a stored secret 620, a plurality of public ROM blocks 625–630, one or more reserved ROM blocks 635, one or more registers 640, and a monotonic counter 435B.

The plurality of SMM ROM blocks 605–615 may include an SMM ROM 0 block 605, an SMM ROM 1 block 610, and an SMM ROM 2 block 615. The plurality of public ROM blocks 625–630 may include a public ROM block 0 625 and a public ROM block 1 630. One embodiment of access rights, lock status, and 32-bit address ranges in the LPC bus 118 space are given here in table form.

| ROM BLOCK | READ ACCESS | WRITE LOCK | ADDRESS RANGE |
|---|---|---|---|
| SMM ROM 0 605 | SMM Only | Write Once | FFBx,1FFFh : FFBx,0000h |
| SMM ROM 1 610 | SMM Only | Never Erase | FFBx,3FFFh : FFBx,2000h |
| SMM ROM 2 615 | SMM Only | None | FFBx,5FFFh : FFBx,4000h |
| SMM Counter 620 | SMM Only | None | FFBx,7FFFh : FFBx,6000h |
| Public 0 625 | Unrestricted | Write Once In SMM | FFBx,9FFFh : FFBx,8000h |
| Public 1 630 | Unrestricted | Never Erase, Write in SMM | FFBx,BFFFh : FFBx,A000h |
| Reserved 635 | N/A | N/A | FFBx,DFFFh : FFBx,C000h |
| Registers 640 | N/A | N/A | FFBx,FFFFh : FFBx,E000h |

The 'x' in the address ranges given in the table may denote the strapping pin decode or their inverse. In one embodiment, the ROM blocks 605–615 and 625–630 in the table are each 64 kB in size. In one embodiment, the computer system may support up to 8 MB of extended BIOS ROM 555 storage, divided into sixteen pages of 512 kB each. In another embodiment, the memory address range from FFBx,FFFFh down to FFBx,0000h includes the plurality of SMM ROM blocks 605–615, the SMM counter 620, the plurality of public ROM blocks 625–630, the one or more registers 640, and the monotonic counter 435B.

The one or more reserved ROM blocks 635 may be used for future expansion. The one or more registers 640 may store additional data, as needed.

In one embodiment, the monotonic counter 435B is stored flat, such as a chain of 8-bit values in an 8K-byte ROM. This embodiment provides 8K bits that counted by noting the number of changed bits (or the most significant bit that is the different). It is noted that 8K bits stored flat translates into 13 bits binary (i.e. $8 \times 1024 = 8192 = 2^{13}$) The monotonic counter 435B is initially in the erased state, such as with all bits set to one. Any time the computer system is reset as a result of a power failure and there is an invalid RTC checksum, such as when the RTC battery 113 is not present, boot software inspects the monotonic counter 435B and updates it. The boot software may look for the most significant byte including at least one changed bit, such as zero. Initially, byte 0 (zero) is chosen when the monotonic counter 435B is in the erased state. Typically, the RTC checksum 127 is typically calculated by boot code from the BIOS whenever it updates the CMOS RAM 126A in the RTC battery well 125. The RTC checksum 127 is then stored in the RTC RAM 126B, also in the RTC battery well 125, which also holds date and time data. Typically, the RTC RAM 126B may be 256 bytes in size.

Flat encoding of the monotonic counter 435B is preferred to other methods of encoding primarily when the monotonic counter 435B is stored in flash memory. Other methods of encoding may be preferred when other memory types are used to store the values for the monotonic counter 435B. One consideration in choosing the method of encoding is which method of encoding provides for a maximum use.

Continuing with the above embodiment for updating the monotonic counter 435B, the next most significant bit, in the most significant byte including at least one zero, is set to zero. For example, if byte five of the monotonic counter 435B returns 0000,0000b and byte six of the monotonic counter 435B returns 1111,1000b, then the boot software will write byte six of the monotonic counter 435B as 1111,0000b. If byte five of the monotonic counter 435B returns 0000,0000b and byte six of the monotonic counter 435B returns 1111,1111b, then the boot software would write byte six of the monotonic counter 4355B as 1111, 1110b.

Reading the monotonic counter 435B as the most significant bits and the monotonic counter 435A shown in FIG. 6 as the least significant bits, a 45-bit monotonic counter 435 may be read to obtain an always-increasing 48-bit value, when monotonic counter 435B provides 13 bits and monotonic counter 435A provides 32 bits. In this embodiment, the monotonic counter 435A provides bytes zero, one, two, and three, while the monotonic, counter 435B provides bytes four and five of the six byte value. Numbers of bits other than 45 are likewise contemplated.

Two special conditions are contemplated. If the monotonic counter 435A is read when storing the default or erased value, such as all ones, then the monotonic counter 435B in the SMM ROM 550 is updated. If the monotonic counter 43513 in the SMM ROM 550 is updated a predetermined number of times, such as 65,536 times, then the boot software must erase the monotonic counter 435B in the SMM ROM 550 and start over with the default value, e.g. all ones.

By way of example and not limitation, consider the monotonic counter 435A and the monotonic counter 435B each storing one byte of eight bits. For this example, the monotonic counter 435A, in the south bridge 330, returns with '00001111', while the monotonic counter 435B, in the SMM ROM 550, returns '11110000'. The value from the flat encoded monotonic counter 435B is converted to standard binary as '00000100b'. The 16-bit monotonic value becomes '0000010000000111b' when the binary value from monotonic counter 435B is combined with the binary value from monotonic counter 435A.

A flat encoding may advantageously allow for increased reliability if the monotonic counter 435B is stored in flash memory. Updating the monotonic counter 435B has no cost, while erasing the flash memory does have a cost in long-term reliability. The monotonic counter 435B should be stored in non-volatile memory. Other memory types contemplated include encapsulated RAM with an included power supply.

One use of the monotonic counters 435A and 435B is as a source for a nonce. Each nonce must be different. Differences may be predictable or unpredictable. Nonces may be used to help prevent replay attacks. When a message is encrypted, changing even one bit changes the encrypted message. Any strong encryption method distributes even a one-bit change extensively. A nonce may be used in a challenge-response method, such as described below.

Providing the monotonic counters 435A and 435B as two counters, instead of one, may advantageously allow for larger values while minimizing the number of bits stored in the non-volatile memory. Access to the monotonic counter 435A is typically faster than access to the monotonic counters 435B, so monotonic counter 435A may be used independently when a fast access time is important, so long as the length of the monotonic value stored in the monotonic counter 435A is adequate for the desired purpose.

Figure 9A:
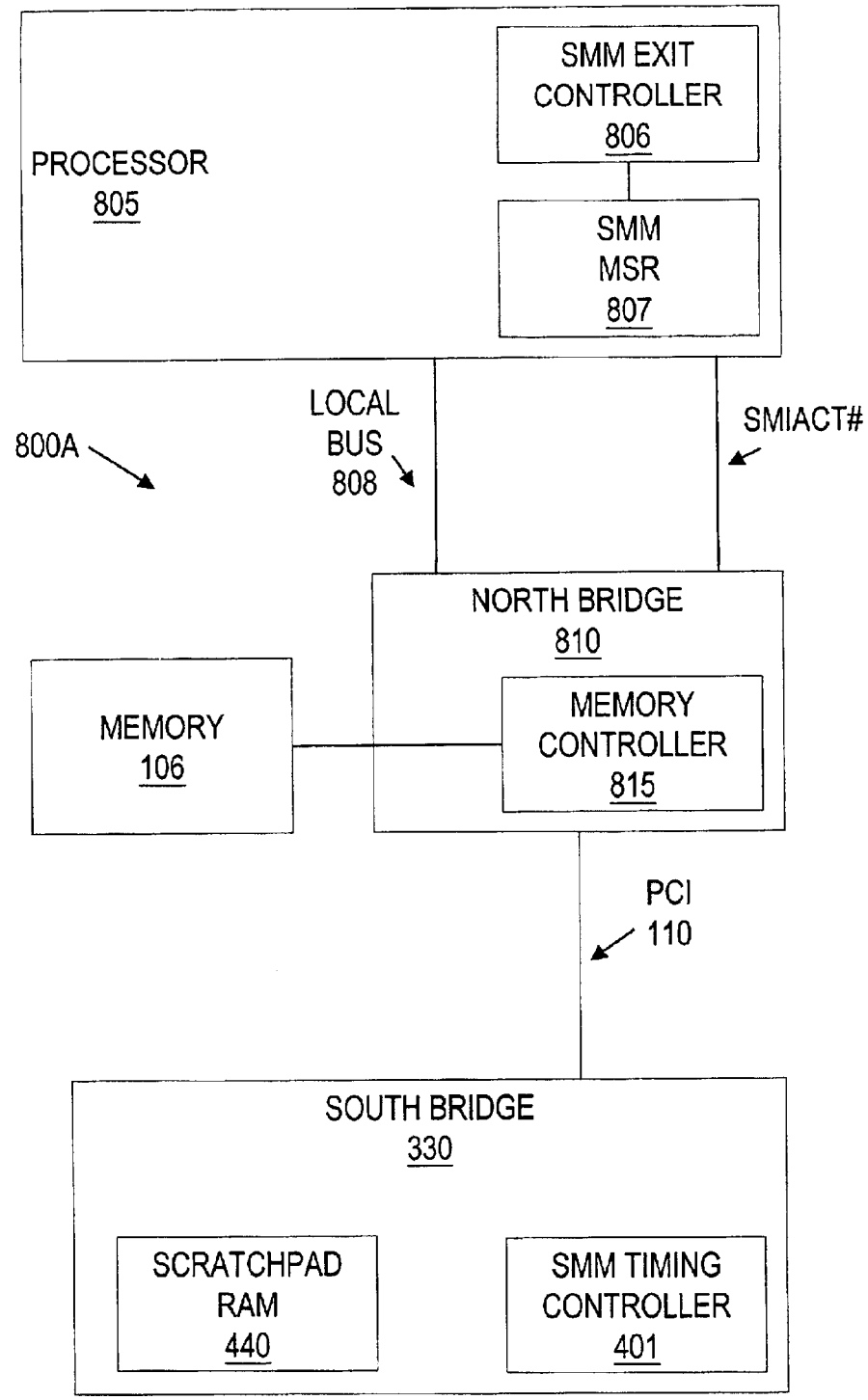
FIGS. 9A and 9B illustrate block diagrams of embodiments of a computer system operable to control the timing and duration of SMM operations, according to one aspect of the present invention.
Figure 9B:
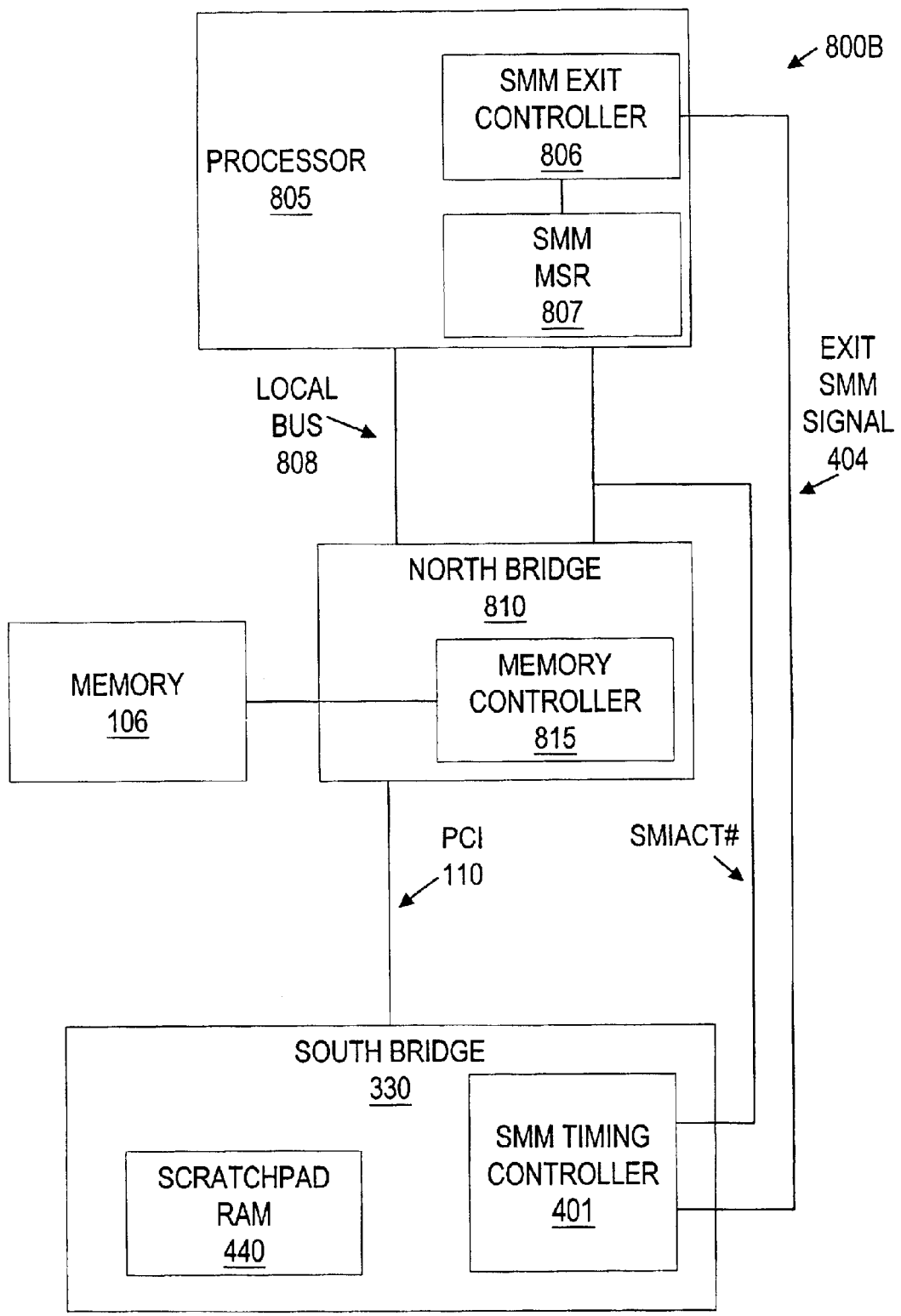

FIGS. 9A and 9B illustrate block diagrams of embodiments of computer systems 800A and 800B that control the timing and duration of SMM, according to various aspects of the present invention. FIGS. 9A and 9B include a processor 805, a north bridge 810, memory 106, and the south bridge 330. The processor includes an SMM exit controller 807 and one or more SMM MSRs (machine specific registers) 807. The north bridge 810 includes a to memory controller 815. The south bridge 330 includes the SMM timing controller 401 and the scratchpad RAM 440. The north bridge 810 is coupled between the processor 805 and the south bridge 330, to the processor 805 through a local bus 808 and to the south bridge 330 through the PCI bus 110. The north bridge 810 is coupled to receive the SMIACT# signal from the processor 805.

In the embodiment of FIG. 9A, the computer system 800A signals that the processor 805 is in SMM using standard processor signals (e.g. SMIACT# to the north bridge 810) and/or bus cycles on the local bus 808 and PCI bus 10. In the embodiment of FIG. 9B, the computer system 800B signals that the processor 805 is in SMM using standard processor signals (e.g. SMIACT#) to both the north bridge 810 and the south bridge 330. An exit SMM signal 404 is also shown between the SMM timing controller 401 and the SMM exit controller 806.

While the processor 805 is in SMM, the processor 805 knows that it is in SMM and asserts SMIACT# to either the north bridge 810 and/or the south bridge 330. The processor 805 may, for example, set and read one or more hardware flags or signals associated with SMM. These hardware flags or signals may be in the processor 805, or in the north bridge 810. In one embodiment, the north bridge 810 receives the SMIACT# signal and in response to receiving the SMIACT# signal, signals the south bridge 330 that the processor is in SMM by sending a special bus cycle or an encoded bus cycle over the PCI bus 110. In another embodiment, the SMIACT# signal is received directly by the south bridge 330.

In one embodiment, an SMM-specific hardware flag at an internal memory interface in the processor 805 is set when the processor 805 enters SMM. Any address call by the processor 805 is routed through the internal memory interface. The internal memory interface determines where the address call should be routed. If the SMM-specific hardware flag is set, then memory calls to SMM memory addresses are recognized as valid SMM memory calls. If the SMM-specific hardware flag is not set, then memory calls to SMM memory addresses are not recognized as valid SMM memory calls.

It is noted that other buses using other bus protocols may couple the processor 805, the north bridge 810, and the south bridge 330. These buses may use bus protocols that include a bus cycle that indicates that the computer system 800 is in SMM. It is also noted that processor signals other than SMIACT# may be directly received by the south bridge 330, such as the SMI# signal or another dedicated signal.

The SMM exit controller 806 in the processor 805 is configured to receive a request to the processor 805 to exit SMM. In one embodiment, the SMM exit controller 806 is operable to exit SMM prior to completing the task for which the SMI# was originally asserted that led to the processor 805 being in SMM. Upon receiving the request to exit SMM, the SMM exit controller 806 is configured to read the contents of the one or more SMM MSRs 807 to obtain a jump location for a clean-up routine, preferably stored in ROM, in SMM memory space. The SMM MSRs 807 may also store one or more bits to indicate that an SMM routine has been interrupted and/or a re-entry point (e.g. an address in SMM memory space) in the interrupted SMM routine. The SMM exit controller 806 may be configured to store the one or more bits indicating that the SMM routine has been interrupted and the re-entry point.

Figure 10A:
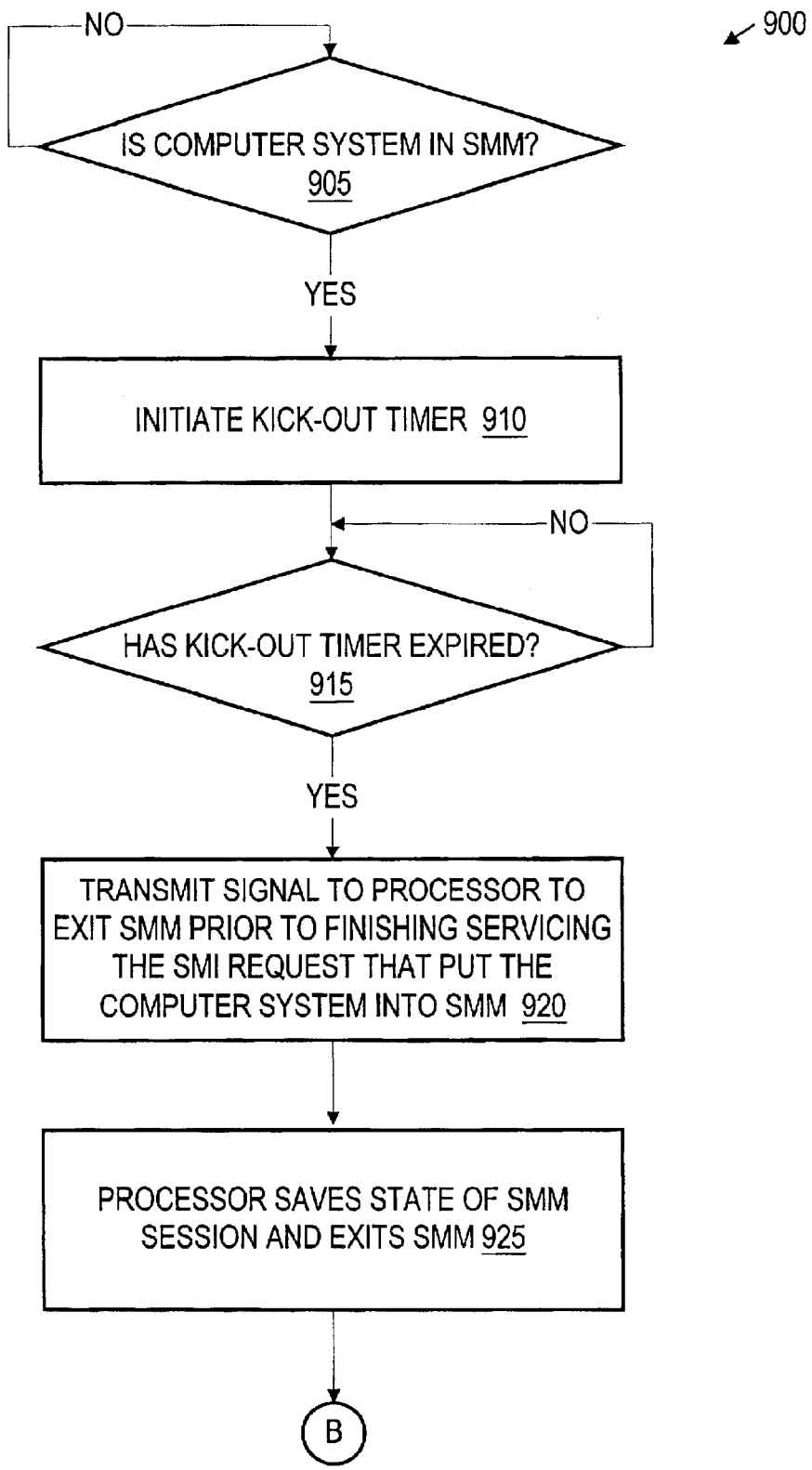

FIG. 10A illustrates a block diagram of one embodiment of a flowchart of a method for forcing the processor 805 out of SMM early, according to one aspect of the present invention. The method includes checking if the computer system is in SMM in decision block 905. If the computer system is not in SMM in decision block 905, then the method continues checking to determine if the computer system is in SMM in decision block 905. If the computer system is in SMM in decision block 905, then the method initiates the kick-out timer 407 in block 910.

The method next checks to determine if the kick-out timer 407 has expired in decision block 915. If the kick-out timer 407 has not expired, then the method continues checking to determine if the kick-out timer 407 has expired in decision block 915. If the kick-out timer 407 has expired in decision block 915, then the method transmits a request to the processor to exit SMM without completing the SMI request that invoked SMM, in block 920. The processor saves the state of the SMM session without finishing the SMM session and exits SMM, in block 925.

The request to the processor to exit SMM, in block 920, may include submitting an RSM (Resume from System Management mode) instruction, or other control signal delivered over the system bus, to the processor. Upon executing the RSM instruction, or receiving the control signal through the interface logic to the system bus, the processor exits SMM and the processor's previous state is restored from system management memory. The processor then resumes any application that was interrupted by SMM. In another embodiment, the request to the processor to exit SMM includes another device in the computer system, such as the south bridge, asserting a control signal, such as the exit SMM signal, to the processor to exit SMM.

The processor saving the SMM state, in block 925, may include setting a bit to indicate that the SMM session was not finished. If the SMM code has multiple entry points, then the processor may also save an indication of which entry point should be used upon re-entering SMM, to finish the unfinished SMM session. These indications may be saved in any of a number of places, such as the one or more SMM MSRs 807 or the scratchpad RAM 440. It is also contemplated that another specific storage location could be designed into or associated with the processor 805, the north bridge 810, the interrupt controller 365, and/or the south bridge 330.

Figure 10B:
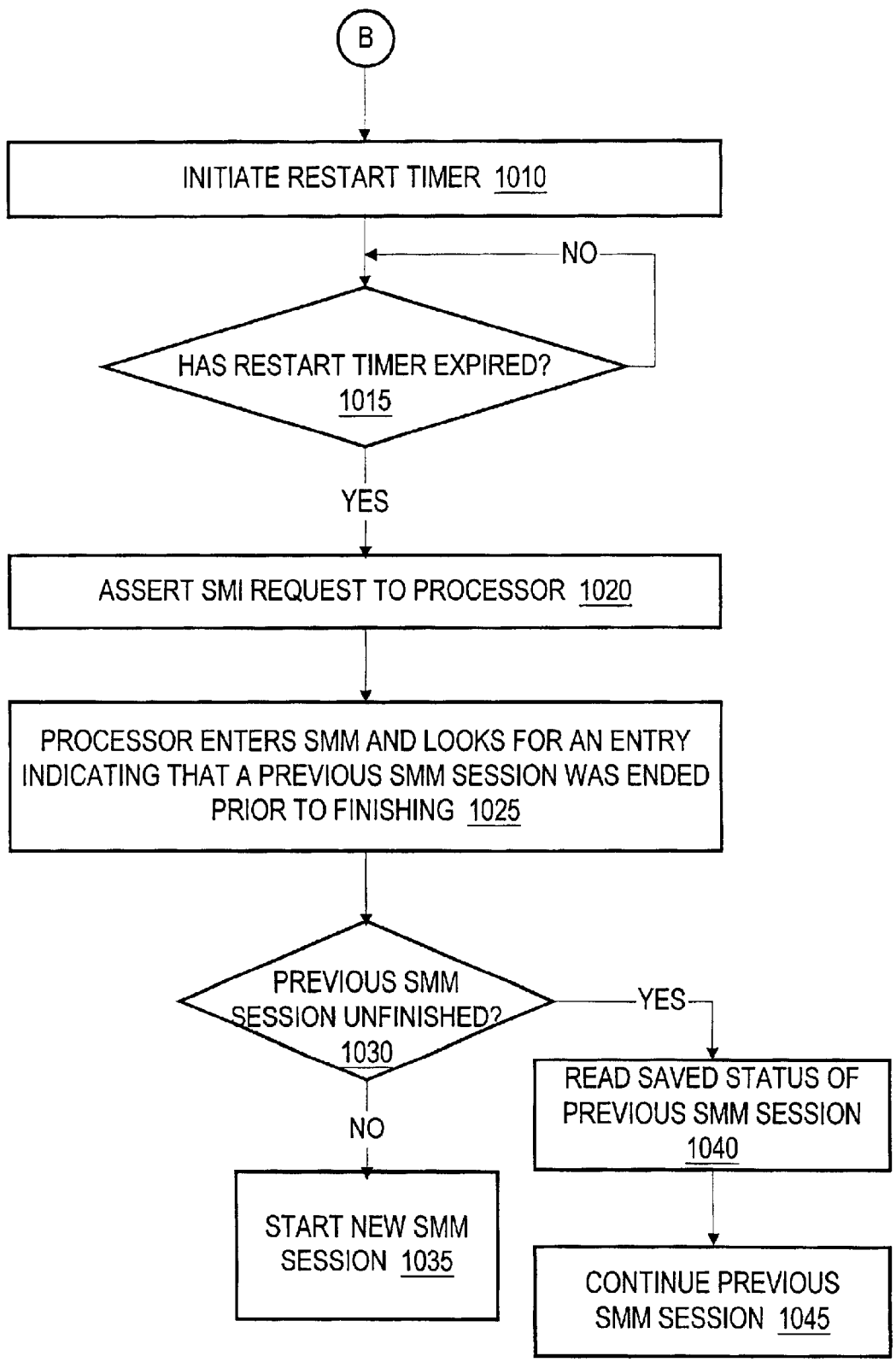
FIG. 10B illustrates a flowchart of an embodiment of a method for reinitiating SMM upon the early termination of SMM, according to one aspect of the present invention.

FIG. 10B illustrates a block diagram of an embodiment of a flowchart of a method for reinitiating SMM a preselected period of time after the early termination of SMM, according to one aspect of the present invention. It is noted that FIG. 10B may be a continuation of the method shown in FIG. 10A, or a stand-alone method. The method of FIG. 10B includes initiating the restart timer 408, in block 1010. The method checks if the restart timer 408 has expired, in decision block 1015. If the restart timer 408 has not expired, then the method continues checking to determine if the restart timer 408 has expired, in decision block 1015.

If the restart timer 408 has expired in decision block 1015, then the method asserts an SMI request to the processor, in block 1020. The processor enters SMM and looks for an entry indicating that a previous SMM session has been ended prior to fulfilling the previous SMM request, in block 1025. The entry may be, as examples, a flag bit that has been set, or a stored jump location in a default location. The method checks for an unfinished SMM session in decision block 1030. If there is no unfinished SMM session in decision block 1030, then the method starts a new SMM session, in block 1035. If there is unfinished SMM session in decision block 1030, then the method reads the saved status information about the previous SMM session, in block 1040, and continues the previous SMM session, in block 1045. It is noted that the method may make use of the saved status information, from block 1040, when continuing the previous SMM session, in block 1045.

Figure 11A:
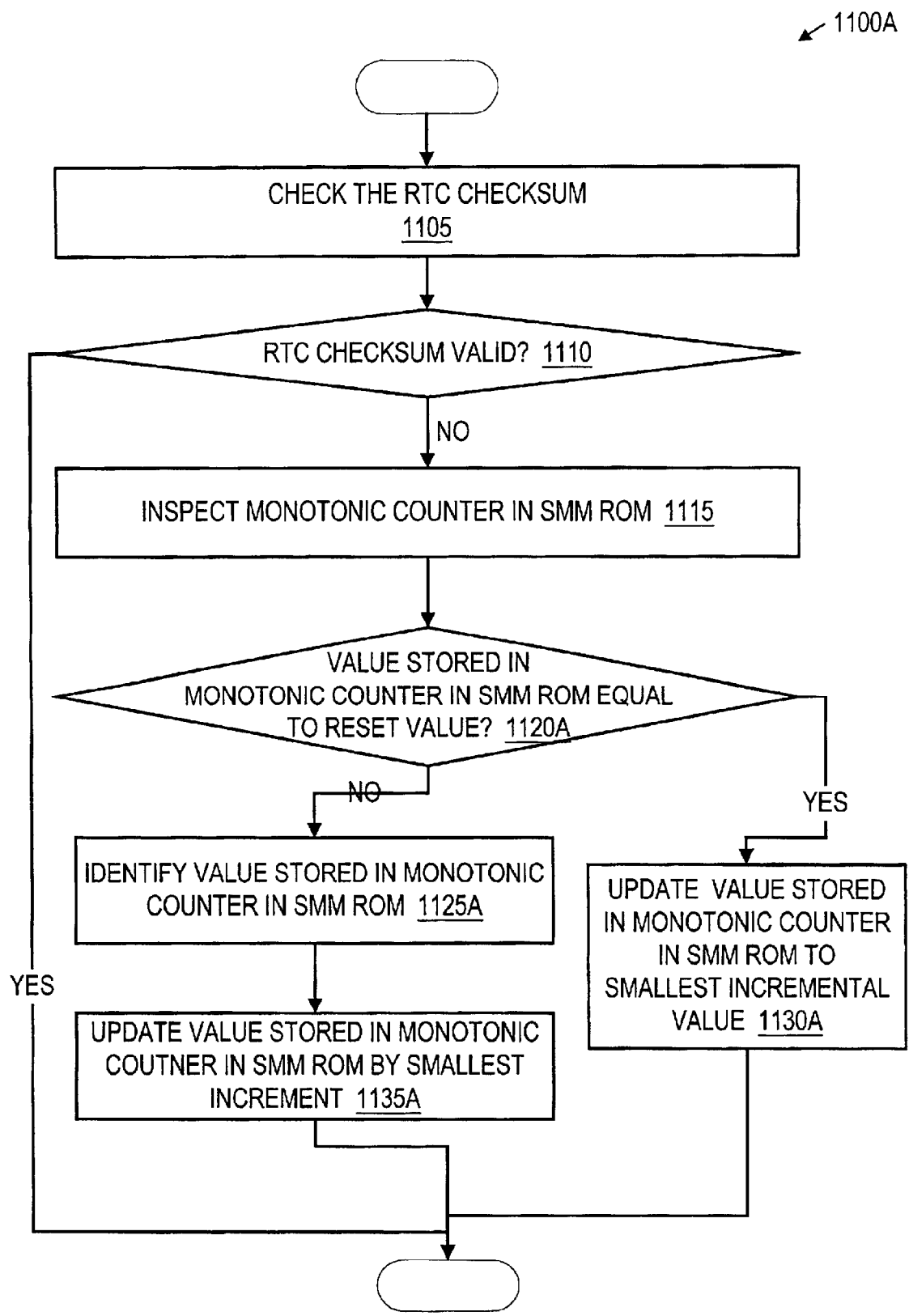
Figure 11B:
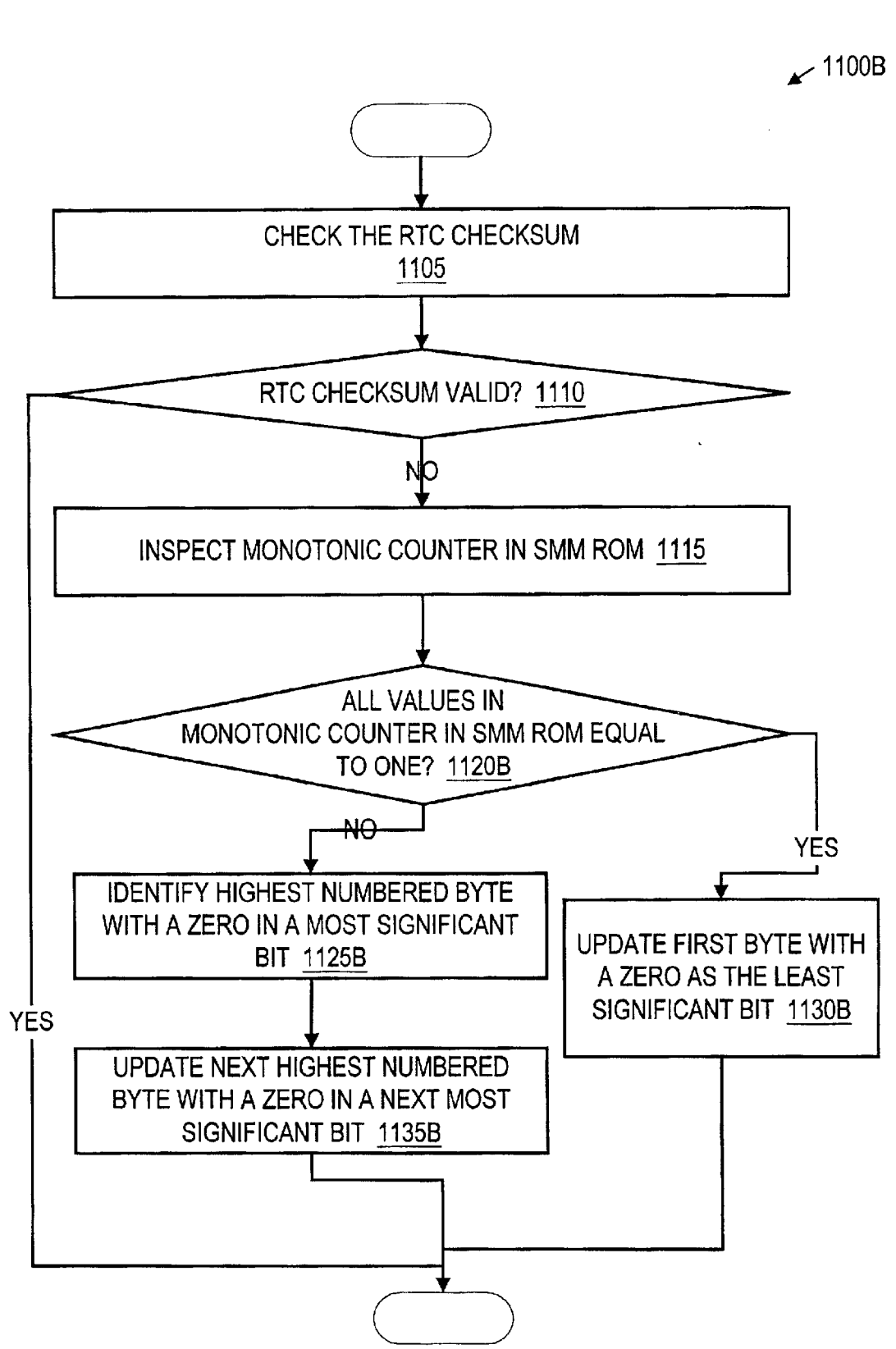

FIGS. 11A and 11B illustrate flowcharts of embodiments of methods 1100A and 1100B for upgrading the monotonic counter 435B, which may be stored in the SMM ROM 550, according to various aspects of the present invention. The method 110A, shown in FIG. 11A, includes checking the RTC checksum, in block 1105. In decision block 1110, if the RTC checksum is valid, then the method 1100A exits. In decision block 1110, if the RTC checksum is not valid, then the method 1100 inspects the monotonic counter 435B in the SMM ROM 550 in block 1115. In decision block 1120A, the method checks if the value stored in the monotonic counter 435B in the SMM ROM 550 is the default (e.g. reset or rollover) value.

In decision block 1120A, if the value stored in the monotonic counter 435B in SMM ROM 550 is the default value, then the method 1100A updates the value stored in the monotonic counter 435B to an incremental value, in block 1130A, preferably the smallest possible incremental value. In decision block 1120A, if the value stored in the monotonic counter 435B in the SMM ROM 550 is not equal to the default value, then the method 10100A identifies the value stored in monotonic counter 435B in the SMM ROM 550, in block 1125A. After identifying the value stored, in block 1125A, the method 1100A updates the value stored in the monotonic counter 435B in the SMM ROM 550 by the incremental value, in block 1135A.

The method 110B, shown in FIG. 11B, includes checking the RTC checksum, in block 1105. In decision block 1110, if the RTC checksum is valid, then the method 1100A exits. In decision block 1100, if the RTC checksum is not valid, then the method 1100 inspects the monotonic counter 435B in the SMM ROM 550 in block 1115. In decision block 1120B, the method checks if the values stored in the monotonic counter 435B in the SMM ROM 550 are all ones.

In decision block 1120B, if all values in the monotonic counter 435B in SMM ROM 550 are equal to one (i.e. the reset value), then the method 1100B updates the first byte so that a zero is stored as the least significant bit in block 1130B. In decision block 1120B, if all values in the monotonic counter 435B in the SMM ROM 550 are not equal to one, then the method 1100B identifies the highest numbered byte with a zero in a most significant bit location, in block 1125B, or the first byte if no byte has a zero in the most significant bit position. After identifying a highest numbered byte with a zero in its most significant bit location or the first byte, in block 1125B, the method 1100B updates the next highest numbered byte or the first byte with a zero in its next most significant bit location without a zero, in block 1135B.

Figure 12A:
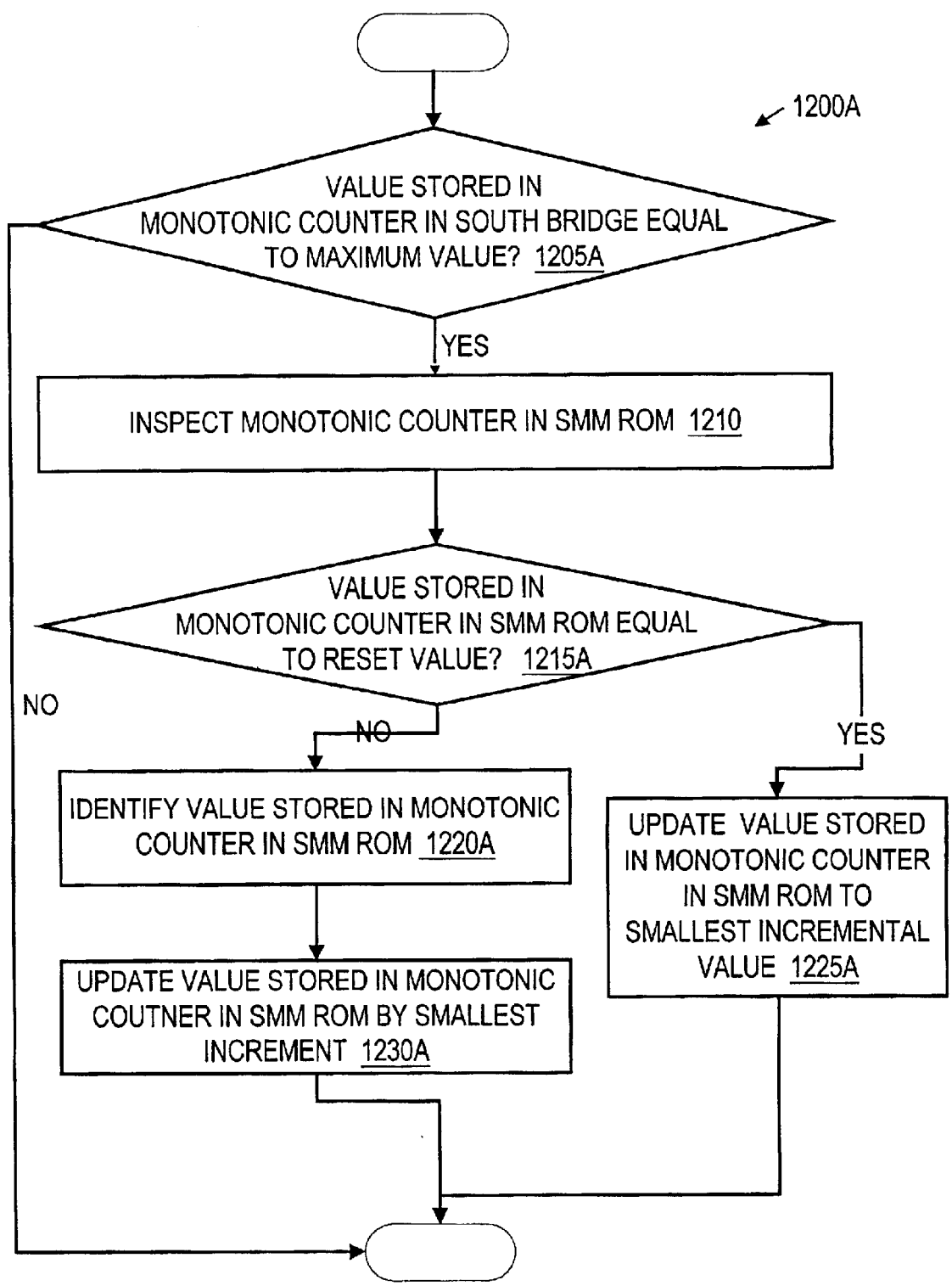
FIGS. 12A and 12B illustrate flowcharts of embodiments of methods for updating a monotonic counter in the south bridge, according to various aspects of the present invention.
Figure 12B:
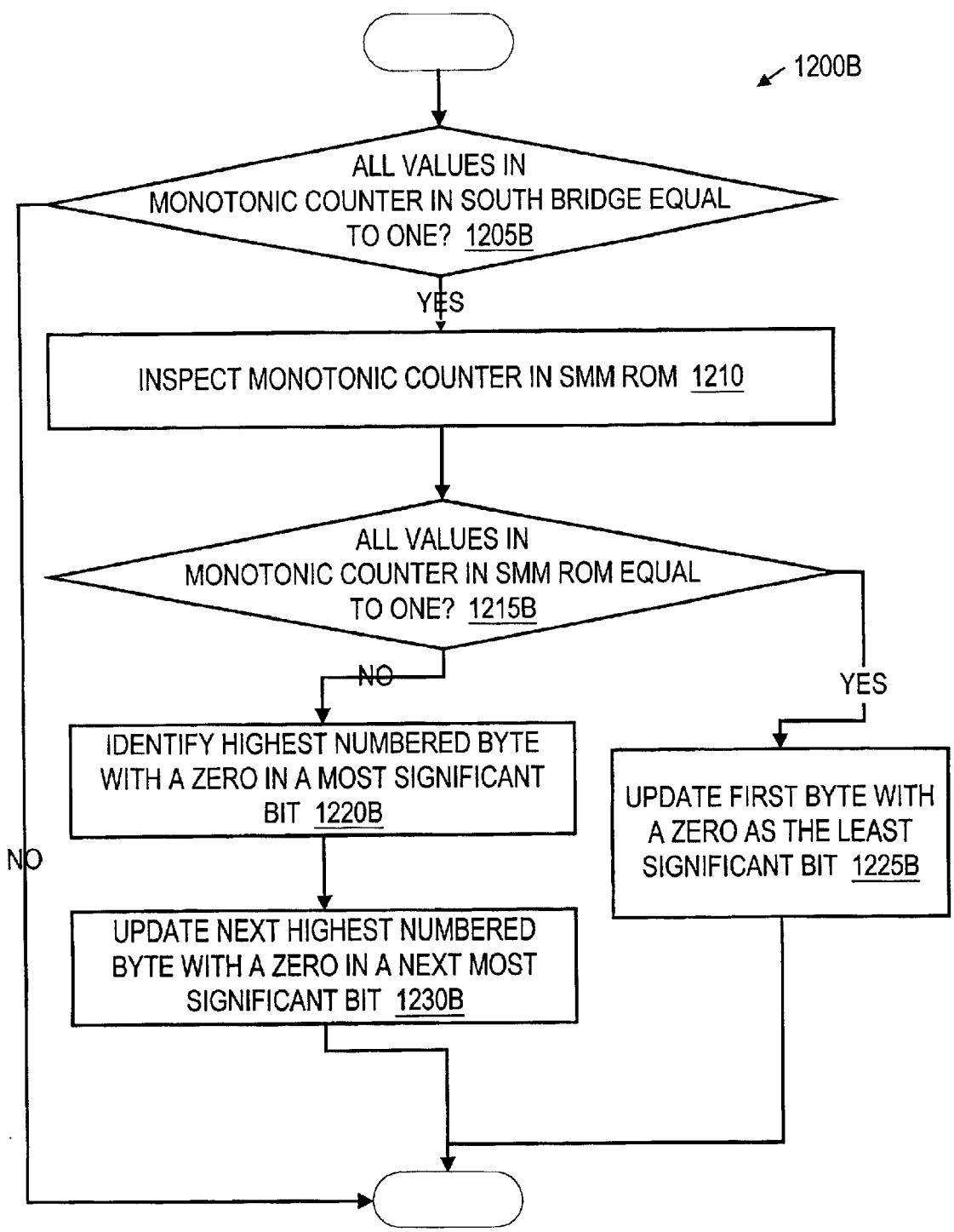

FIGS. 12A and 12B illustrate flowcharts of embodiments methods 1200A and 1200B for updating a monotonic counter 435A in the south bridge 330, according to various aspects of the present invention. The method 1200A checks to see if the value stored in the monotonic counter 435A in the south bridge 330 is the maximum value that can be stored, in decision block 1205A. If the value stored in the monotonic counter 435A in the south bridge 330 is not the maximum value, in decision block 1205, then the method 1200A exits. If the value stored in the monotonic counter 435A in the south bridge 330 is the maximum value that can be stored, in decision block 1205, then the method 1200A inspects the monotonic counter 435B in the SMM ROM 550 in decision block 1210. The method 1200A checks to see if the value stored in the monotonic counter 435B in the SMM ROM 550 is the default (or reset) value, in decision block 1215A.

If in decision block 1215A, the value stored in the monotonic counter 435B in the SMM ROM 550 is the default value, then the method 1200A updates the value stored in the monotonic counter 435B in the SMM ROM 550 with an incremental value, in block 1225A, preferably the smallest possible incremental value. If, in decision block 1215A, the value stored in the monotonic counter 435B in SMM ROM 550 is not the default value, then the method 1200A identifies the value stored in the monotonic counter 435B in the SMM ROM 550, in block 1220A. After the method 1200A identifies value stored, in block 1220, the method 1200A updates the value stored in the monotonic counter 435B in the SMM ROM 550 by the incremental value, in block 1230A.

The method 1200B, shown in FIG. 12B, checks to see if all values in the monotonic counter 435A in the south bridge 330 are equal to one (i.e. the reset value), in decision block 1205B. If all values in the monotonic counter 435A in the south bridge 330 are not equal to one, in decision block 1205B, then the method 1200B exits. If all values in the monotonic counter 435A in the south bridge 330 are equal to one, in decision block 1205B, then the method 1200B inspects the monotonic counter 435B in the SMM ROM 550, in decision block 1210. The method 1200B checks to see if all values in the monotonic counter 435B in the SMM ROM 550 are equal to one, in decision block 1215B.

If in decision block 1215B, all values in the monotonic counter 435B in the SMM ROM 550 are equal to one, then the method 1200B updates the first byte with a zero in its least significant bit, in block 1225B. If, in decision block 1215B, all values in the monotonic counter 435B in SMM ROM 550 are not equal to one, then the method 1200B identifies the highest numbered byte with a zero in its most significant bit location, in block 1220B, or the first byte if no byte has a zero in the most significant byte location. After the method 1200B identifies the highest numbered byte with a zero in its most significant bit location or the first byte, in block 1220B, the method 1200B upgrades the next highest numbered byte, or the first byte, with a zero in the next most significant bit location, in block 1230B.

Figure 13A:
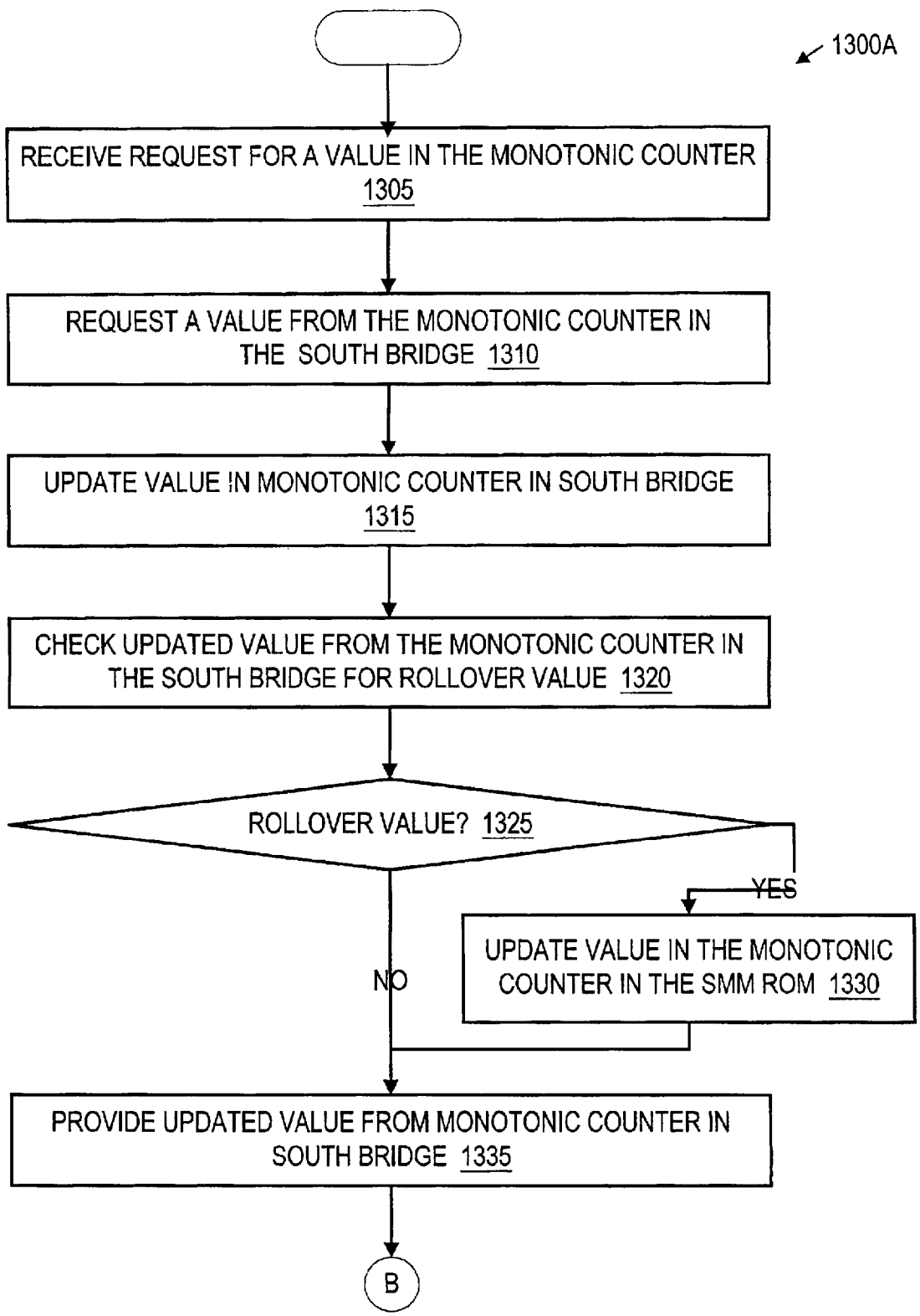
FIGS. 13A and 13B illustrate flowcharts of embodiments of a method for providing a monotonic value in a computer system, according to one aspect of the present invention.
Figure 13B:
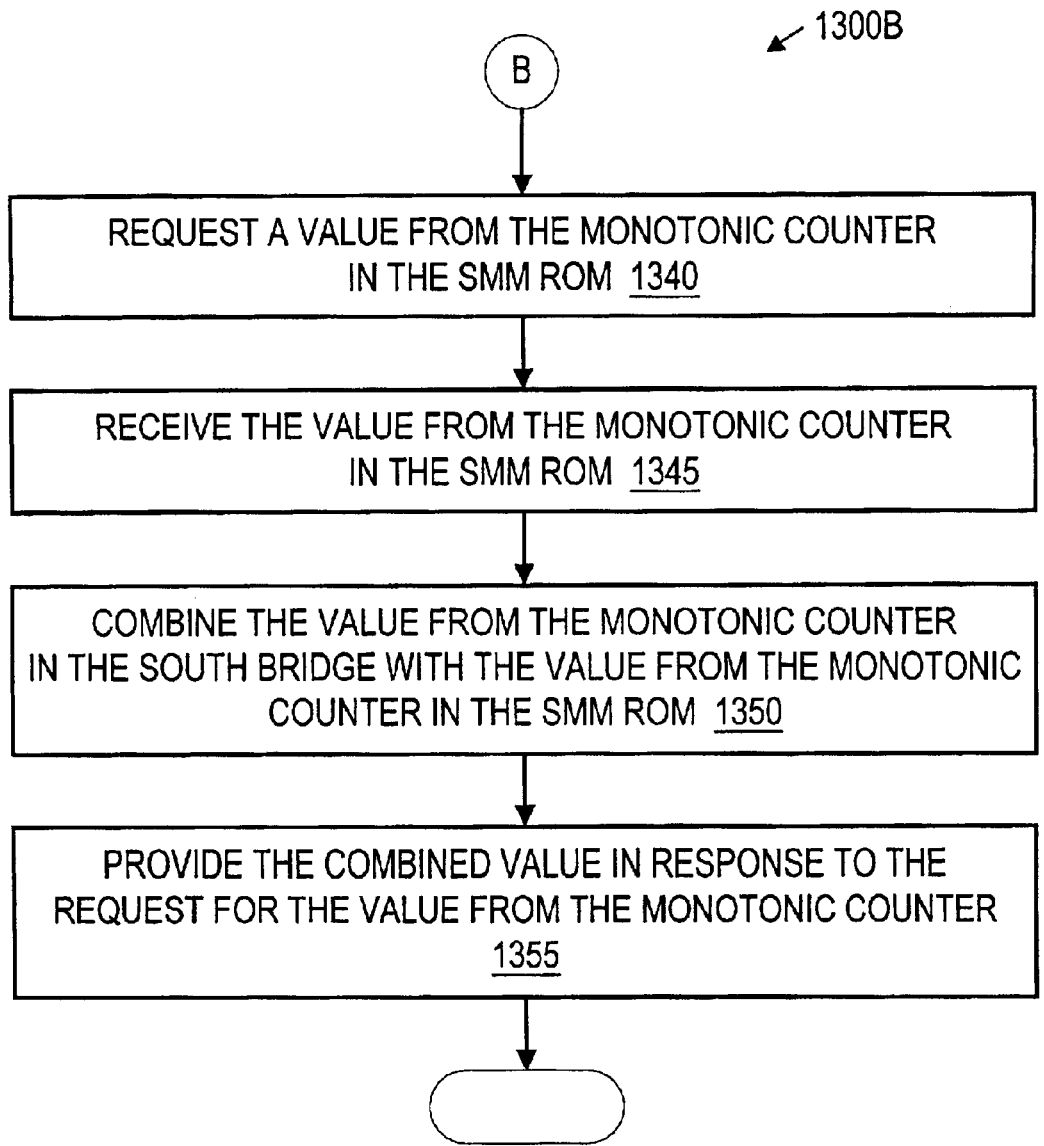

FIG. 13A and FIG. 13B illustrate block diagrams of flowcharts of embodiments of methods 1300A and 1300B for providing a value from a monotonic counter 435 in the computer system, according to various aspects of the present invention. The method 1300A receives a request for a value from the monotonic counter 435 in block 1305. The method 1300A requests the value from the monotonic counter 435A in the south bridge 330 in block 1310. The method 1300A updates the value in the monotonic counter 435A in south bridge 330 in block 1315. The method 1300A checks the updated value from monotonic counter 435A in the south bridge 330 for a rollover value, in block 1320.

In decision block 1325, if the rollover value has been reached, then the method 1300A updates the value in the monotonic counter 435B in the SMM ROM 550 in block 1320. If the rollover value has not reached in decision block 1325, or if the method 1300A has updated the value in the monotonic counter 435A in the SMM ROM 550 in block 1330, then the method 1300A provides the updated value from the monotonic counter 435A in the south bridge 330 in block 1335.

The method 1300B requests the value from the monotonic counter 435B in the SMM ROM 550, in block 1340. The method 1300B receives the value from the monotonic counter 435B in the SMM ROM 550 in block 1345. The value from the monotonic counter 435A in the south bridge 330 is combined with the value from the monotonic counter 435B in the SMM ROM 550 in block 1350. The method 1300B provides the combined value in response to the request for the value from the monotonic counter in block 1355.

As noted above, the monotonic counter 435A in the south bridge 330 may include a 32-bit value, while the monotonic counter 435B in the SMM ROM 550 may include a 15-bit value. The returned value from the monotonic counter 435, provided in response to the request for the value of the monotonic counter, would then include a 45-bit value.

It is noted that the 32-bit value from the monotonic counter 435A in the south bridge 330 may be provided by software instead of being read from the south bridge 330. In the software embodiment, the software itself provides a 32-bit, always increasing, i.e. monotonic value, which is combined with the value from the monotonic counter 435B in the SMM ROM 550 to provide a unique 45-bit value. It is also noted that the size of the monotonic counters 435A and 435B in the south bridge 330 and in the SMM ROM 550, respectively, may be designed with other bit sizes, as desired.

Although the methods 10A, 110B, 1200A, and 1200B show updates to the monotonic counters 435A and 435B as being in-line with monotonic value requests, it is also contemplated that software or hardware may be used to update the monotonic counters 435A and 435B separately from the monotonic value requests. Such updates could occur, for example, after the monotonic value request that leads to the monotonic value reaching the rollover value.

Figure 14A:
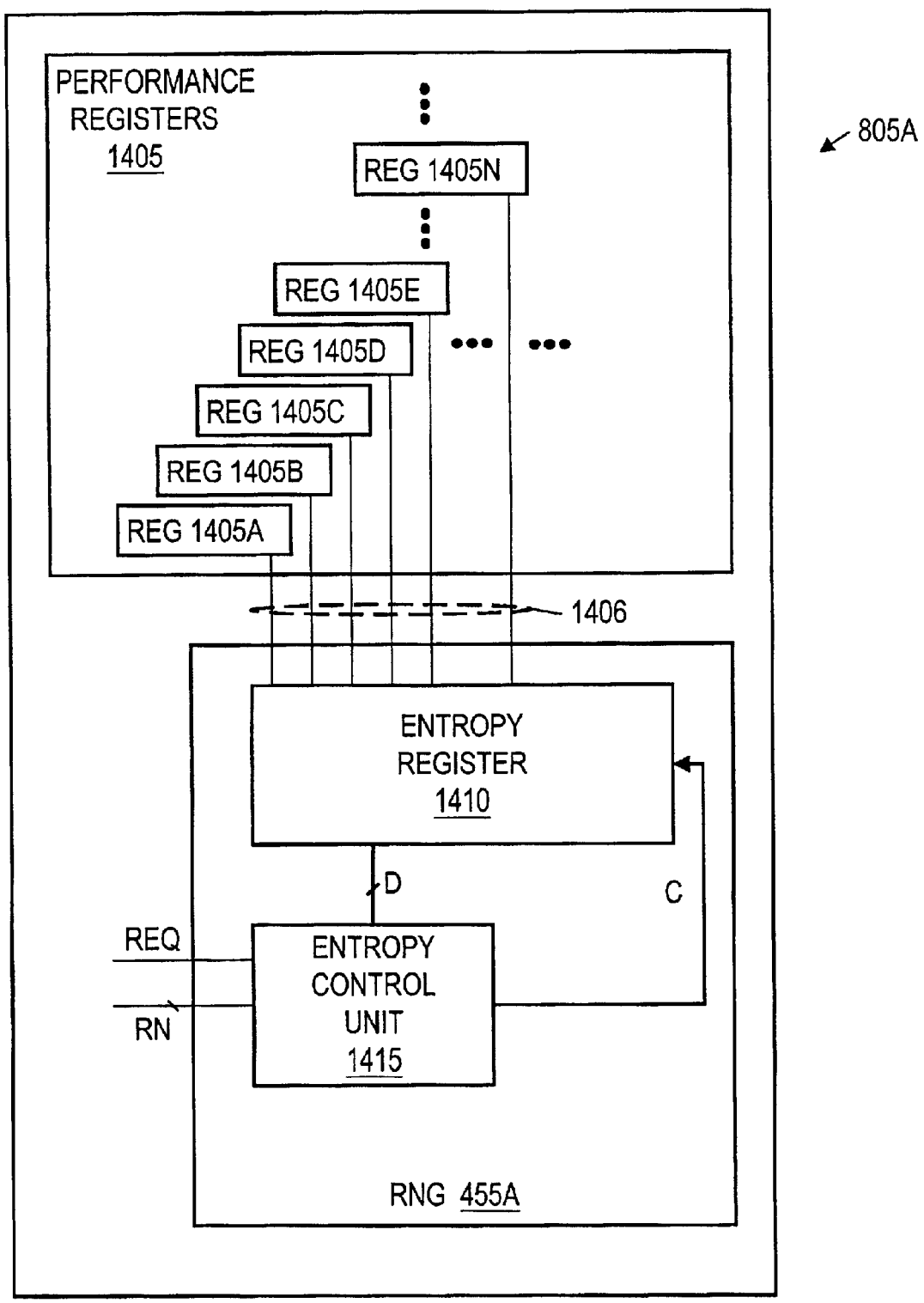
FIGS. 14A and 14B illustrate block diagrams of embodiments of processors including random number generators using entropy registers, according to one aspect of the present invention.
Figure 14B:
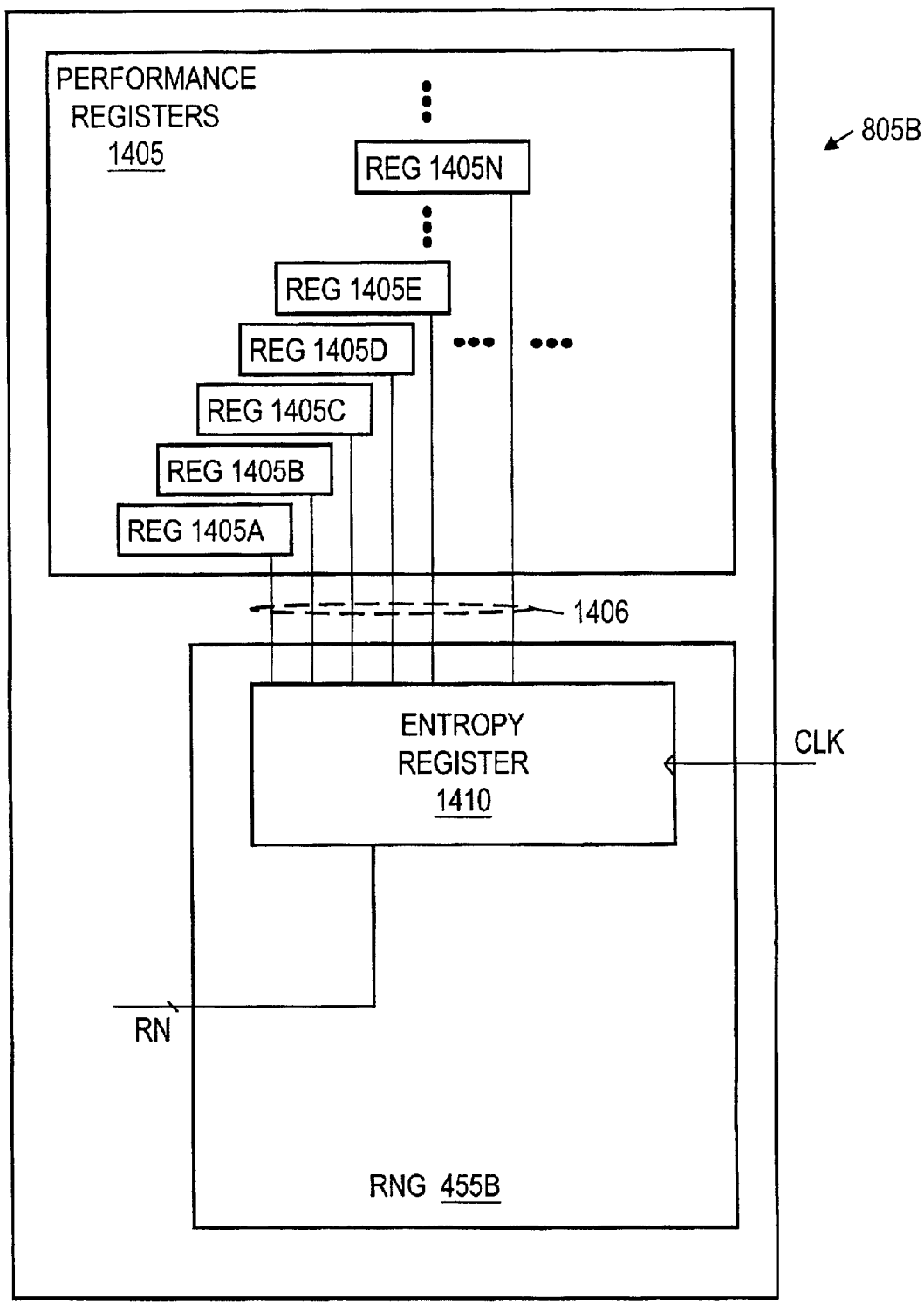

FIGS. 14A and 14B illustrate block diagrams of embodiments of processors 805A and 805B, including random number generators 455A and 455B using entropy registers 1410, according to one aspect of the present invention. The RNG 455 in FIG. 6 may also use an entropy register 1410, similar to what is shown here. FIG. 14A shows an embodiment of a processor 805A, which includes a plurality of performance registers 1405A–1405N coupled through a plurality of bit lines 1406 to a random number generator 455A. FIG. 14B shows another embodiment of a processor 805B, which includes the plurality of performance registers 1405A–1405N coupled through a plurality of bit lines 1406 to a random number generator 455B.

Common to both FIGS. 14A and 14B, the performance registers 1405A through 1405N each store a value indicative of a different performance metric. Exemplary performance metrics may include first-level-cache hit rate, second-level-cache hit rate, third-level-cache hit rate, branch target cache, and/or other model specific registers (MSRs), such as those used for measuring performance. In one embodiment, the performance registers include any register that updates the least significant bit at a rate asynchronous to the local and/or system clock.

In one embodiment, each of the plurality of bit lines 1406 couple between the least significant bit entry in one of the performance registers 1405 and an entry in an entropy register 1410 in the RNG 455. Each entry of the entropy register 1410 may couple to a different one of the performance registers 1405. In another embodiment, each entry of the entropy register 1410 may couple to one or more entries in one or more of the performance registers 1405 or other sources of single bits within the processor 805.

FIG. 14A includes the RNG 455A, which also includes an entropy control unit 1415 coupled to receive a request over a request line (REQ) from the processor 805A for a random number over output lines (RN). The entropy control unit 1415 is configured to assert a control signal (C) to the entropy register 1410 and read out the value in the entropy register 1410 over the data lines (D). The entropy control unit 1415 is further configured to provide the random number from the entropy register 1410 over the output lines (RN) in response to the request line (REQ) being asserted by the processor 805A.

FIG. 14B includes the RNG 455B, which includes the entropy register 1410. The entropy register 1410 of FIG. 14B may be read by the processor 805B. The entropy register 1410 latches the values received over plurality of bit lines 1406 upon receiving a clocking signal (CLK). The random number from the entropy register 1410 may then be read out over the output lines (RN) by the processor 805B.

It is noted that the RNG 455A and the RNG 455B may be included in other devices in the computer system other than the processor 805. Contemplated locations for the RNG 455A and the RNG 455B include the north bridge 810 and the south bridge 330. It is also noted that the performance registers 1405 are not normally accessible to a user of the processor 805 once the processor 805 is in a computer system, as the performance registers 1405 are primarily used for testing during the design and engineering stages of the manufacturing process. This may advantageously allow for better randomness with less likelihood of tampering with the random number obtained from the entropy register 1410.

Figure 15:
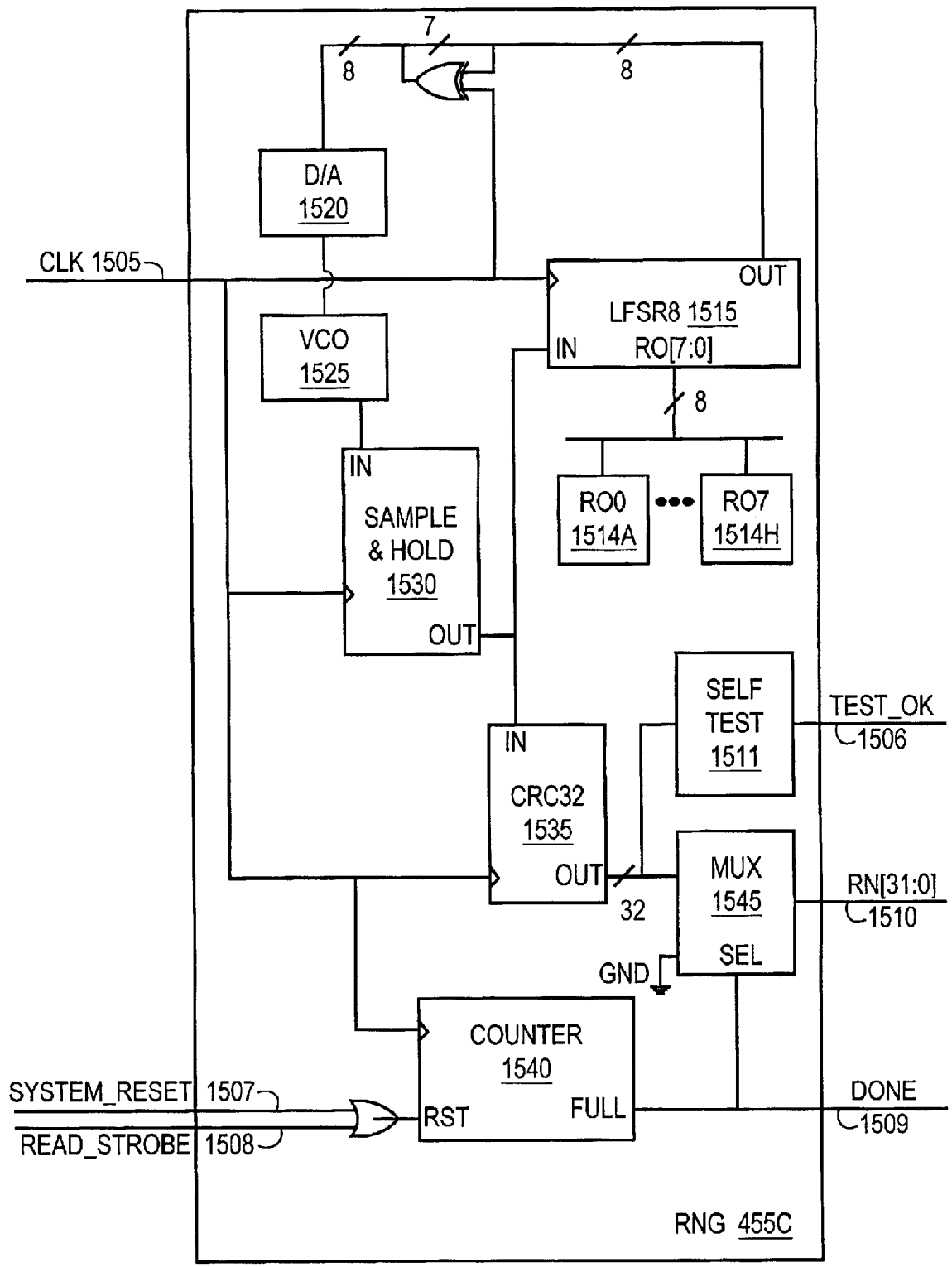
FIG. 15 illustrates a block diagram of another embodiment of a random number generator, according to one aspect of the present invention.

FIG. 15 illustrates a block diagram of another embodiment of a random number generator 455C, according to one aspect of the present invention. The RNG 455C includes a plurality of ring oscillators (RO0–RO7) 1514A–1514H, a linear feedback shift register (LFSR) 1515, a digital to analog converter (D/A) 1520, a voltage controlled oscillator (VCO) 1525, a sample and hold circuit 1530, a cyclic redundancy code generator 1535 (CRC), a self test circuit 1511, a multiplexer (MUX) 1545, and a counter 1540.

The CLK signal 1505 is received by the RNG 455C by the LFSR 1515, the sample and hold circuit 1530, the CRC 1535, and the counter 1540. Either a system reset signal (SYSTEM_RESET) 1507 or a read strobe (READ_STROBE) are received by the counter 1540 at the reset (RST) input port. The LFSR 1515 receives output signals of each of the ring oscillators (RO0–RO7) 1514A–1514H at one input port (RO[7:0]) and the output signals of the sample and hold circuit at another input (IN) terminal. A plurality of values are provided by the LFSR 1515 at the output (OUT) terminal. As shown, one of the plurality of values delivered by the LFSR 1515 is XORed with the CLK signal 1505 before all of the plurality of values provided by the LFSR 1515 are delivered to the D/A 1520. The analog output signal of the D/A 1520 is provided as a control signal to the VCO 1525.

The output of the VCO 11525 is provided to the input (IN) terminal of the sample and hold circuit 1530 and clocked on the CLK signal 1505. The output (OUT) signal of the sample and hold circuit 1530 is provided to the input terminal of the CRC 1535 and clocked on the CLK signal 1505, as well as to the IN terminal of the LFSR 1515, as described above. A plurality of output values is provided to the MUX 1545 through the CRC output port (OUT). The MUX 1545 selects between the output values of the CRC 1535 and ground (GND). The MUX 1545 provides the random number over output lines (RN[31:0]).

A request for a random number over the read strobe line (READ_STROBE) results in the counter 1540 counting a prerequisite number of clock cycles prior to asserting a signal (FULL) to the selection input (SEL) of the MUX 1545. The FULL signal may also be read by the requestor of the random number as a signal (DONE) that the requested random number is available over the RN[31:0] lines. The system reset signal 1507 also asserts a signal on the reset input terminal of the counter 1540. A self test circuit 1511 may be present to provide a known value to the MUX 1545 to be read on the RN[31:0] lines in place of a random number generated by the RNG 455C.

The RNG 455C is preferably configured to meet all appropriate requirements for an RNG in Federal Information Processing Standards Publication FIPS-140-1, entitled SECURITY REQUIREMENTS FOR CRYPTOGRAPHIC MODULES, issued on Jan. 11, 1994, by the U.S. National Institute of Standards and Technology (NIST), which is hereby incorporated by reference. The Federal Information Processing Standards Publication Series of the NIST is the official series of publications relating to standards and guidelines adopted and promulgated under the provisions of Section 111(d) of the Federal Property and Administrative Services Act of 1949 as amended by the Computer Security Act of 1987, Public Law 100-235.

It is noted that for increased randomness, the ring oscillators 1514A–1514H may be operated at frequencies and phases that do not correlate between or among the plurality of ring oscillators 1514. It is also noted that the RNG 455C may be included in locations other than the south bridge 330. Contemplated locations include the processor 805 and the north bridge 810.

Figure 16A:
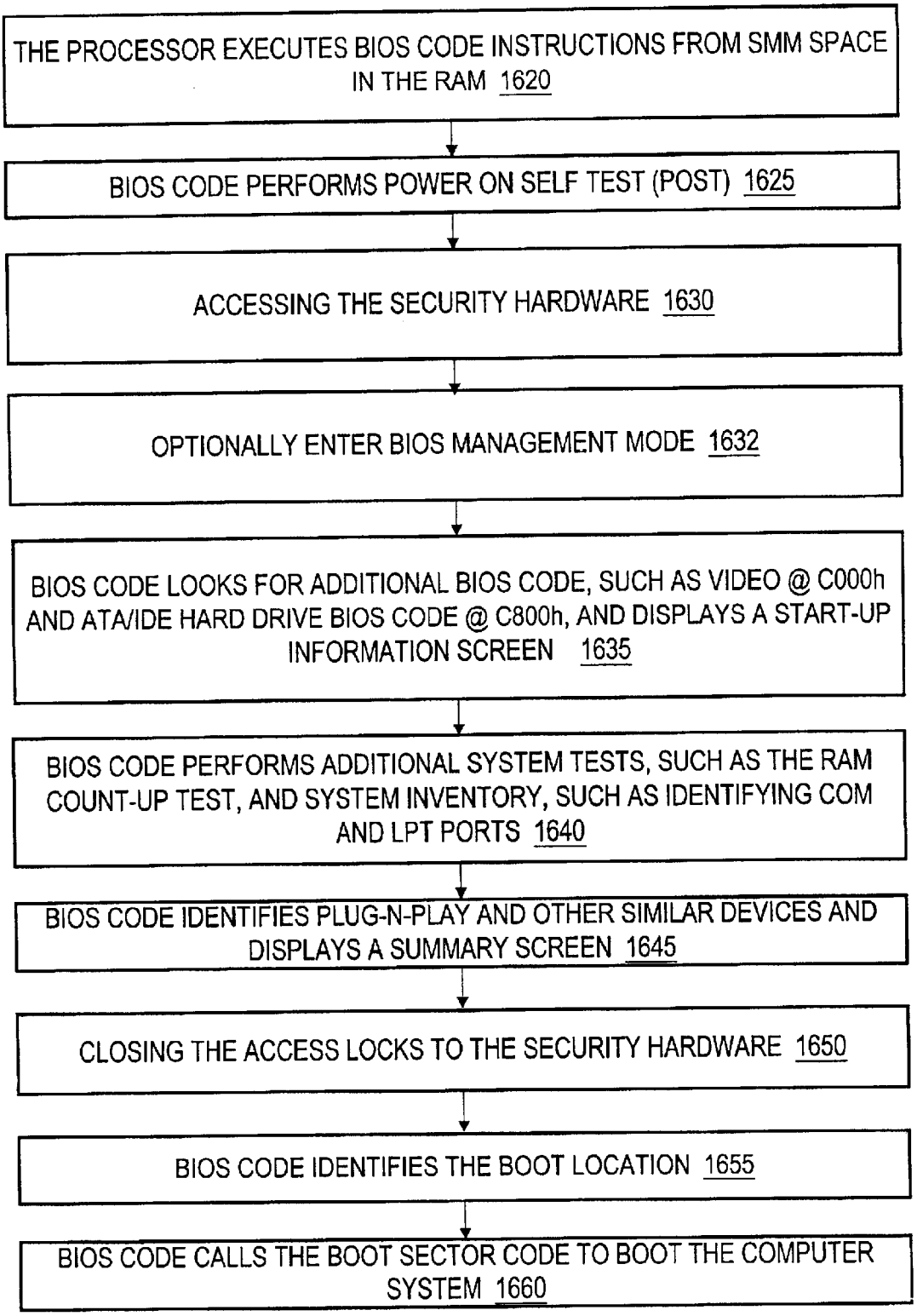
FIGS. 16A, 16B, 16C, 16D, 16E, 16F, and 16G illustrate flowcharts of embodiments of methods for accessing the security hardware, which may be locked, according to various aspects of the present invention.
Figure 16B:
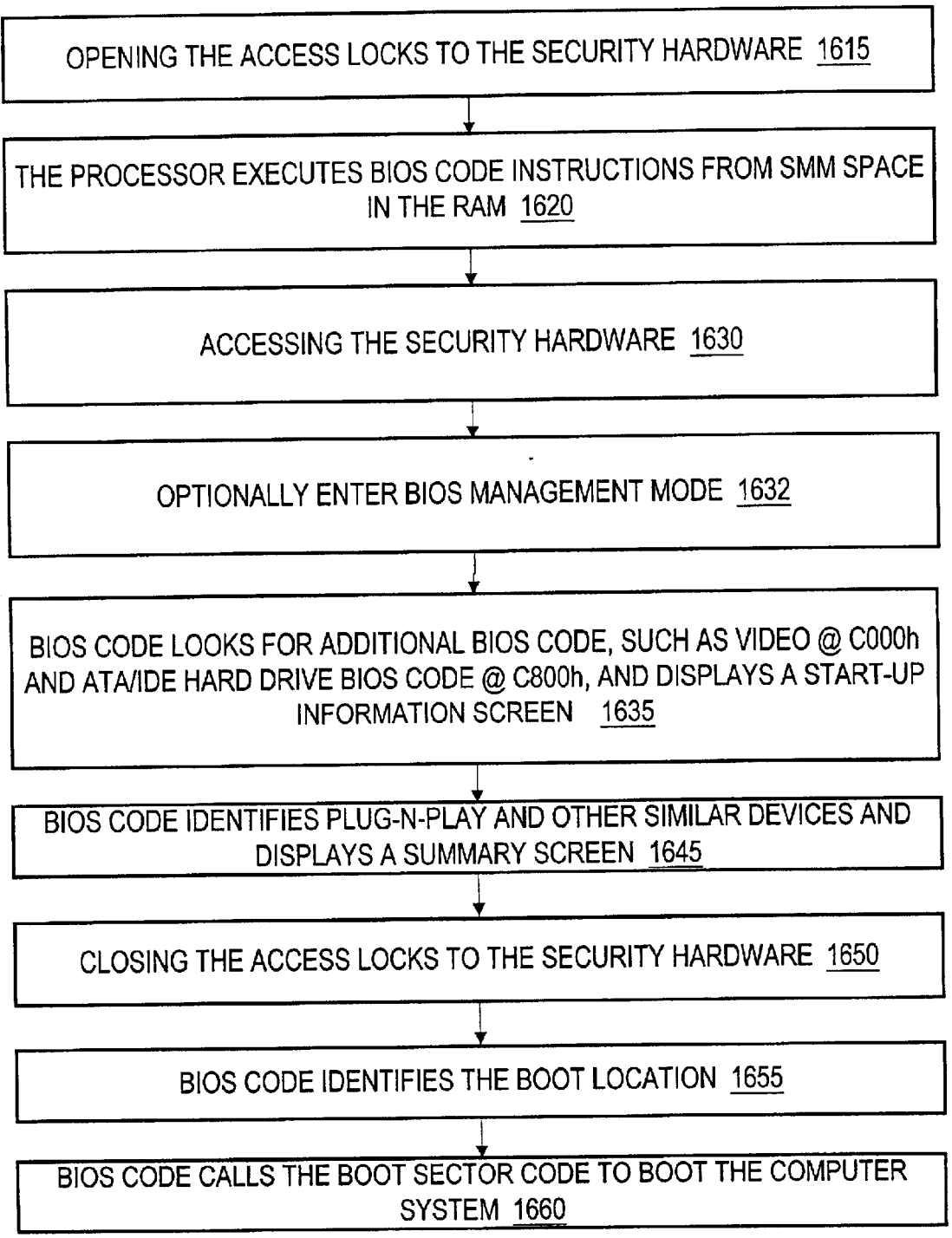
Figure 16C:
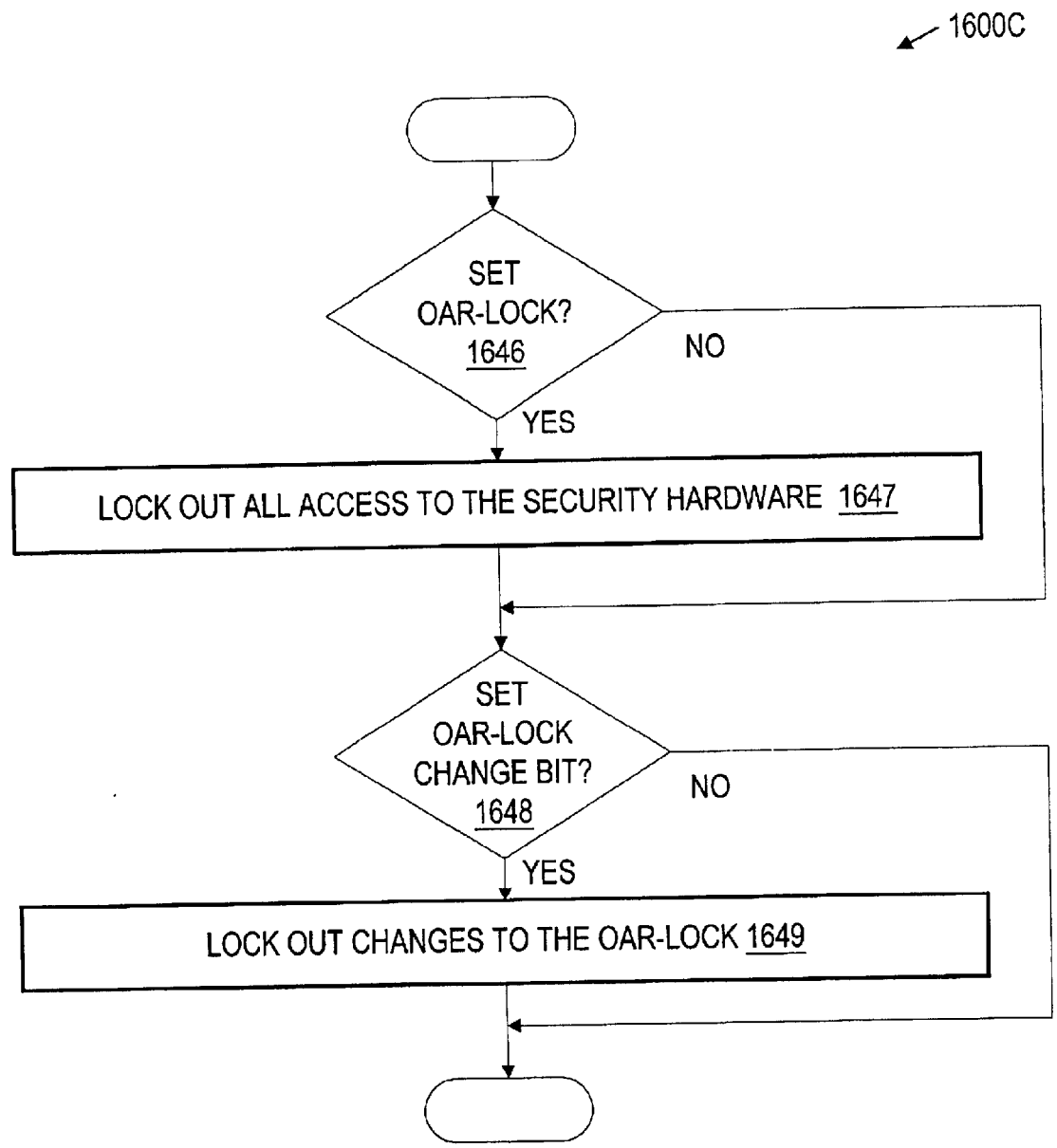
Figure 16D:
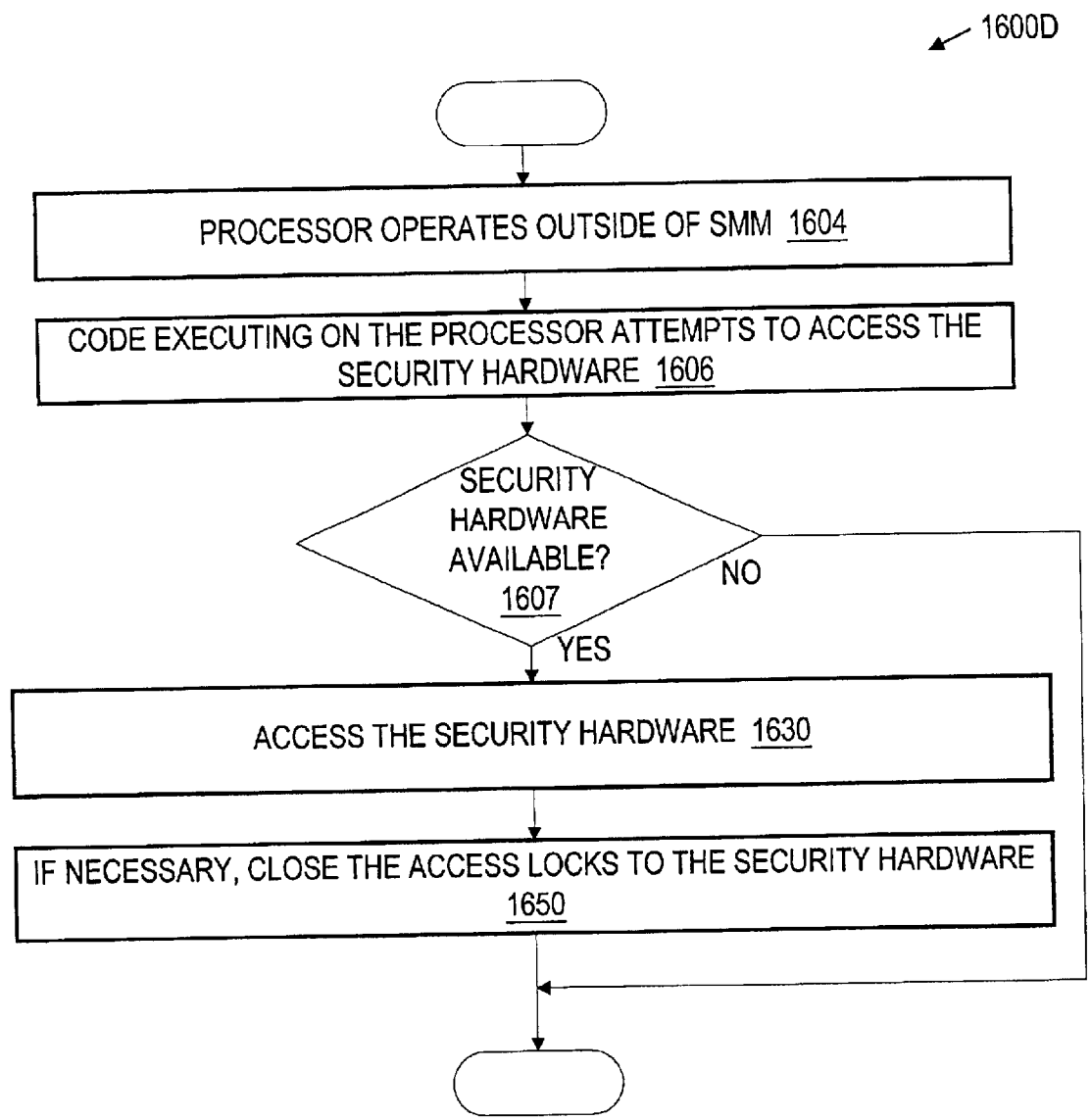
Figure 16E:
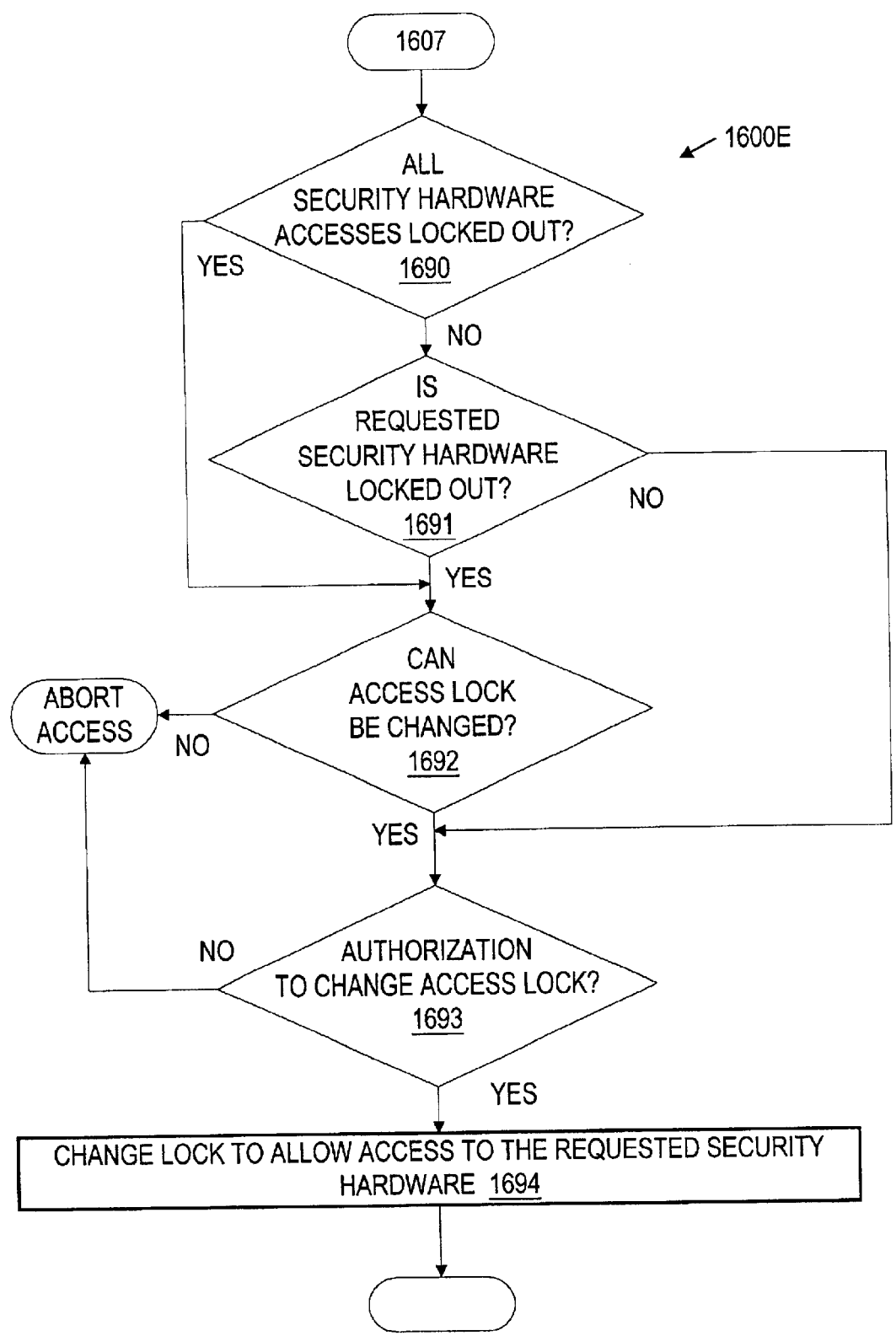
Figure 16F:
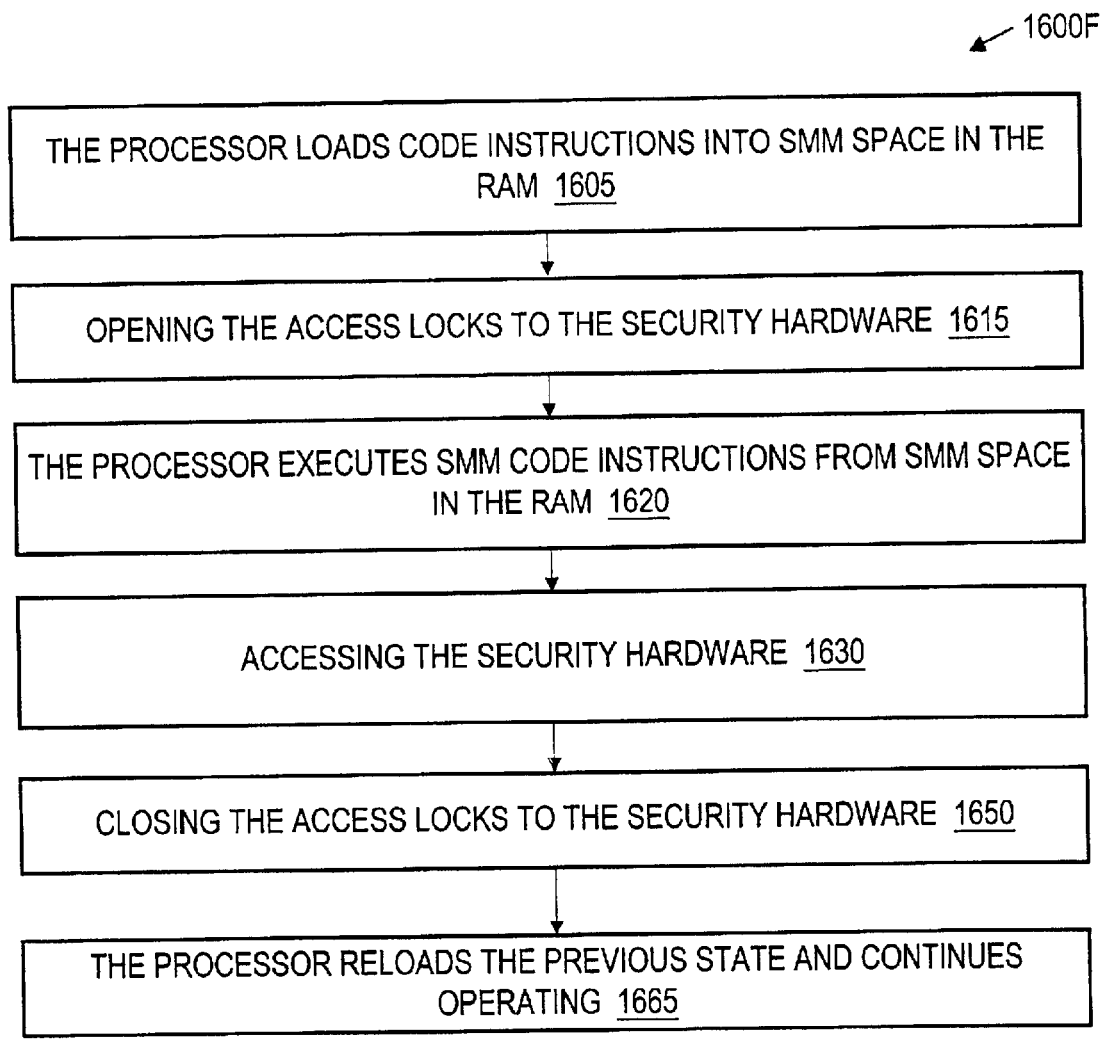
Figure 16G:
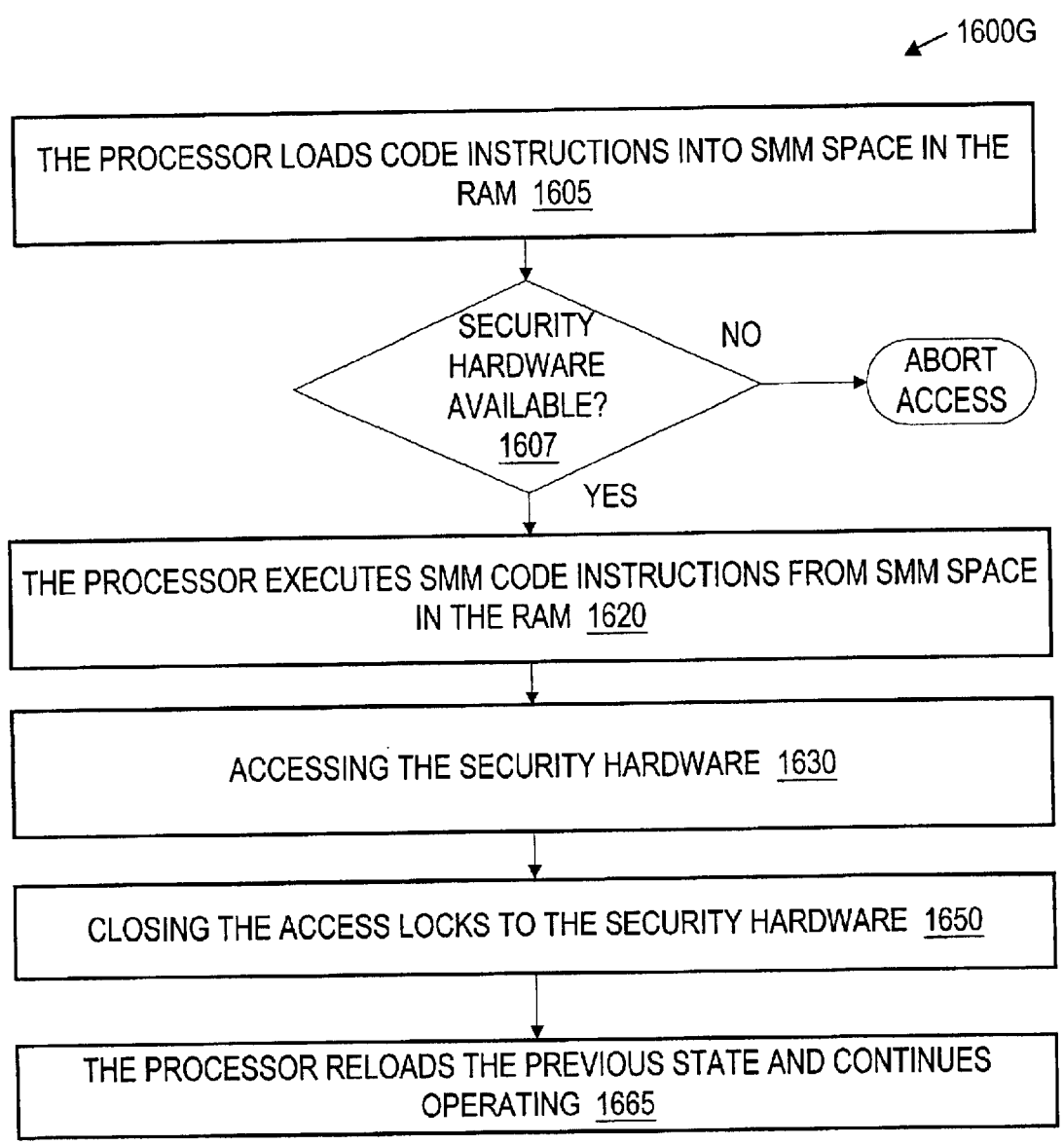

FIGS. 16A–16G illustrate flowcharts of embodiments of methods 1600A–1600G that attempt to access the security hardware 370, which may be locked, according to various aspects of the present invention. FIG. 16A shows a method 1600A of locking the security hardware 370 as a part of the boot (or cold reboot) process. FIG. 16B shows a method 1600B of unlocking and later locking the security hardware 370 as a part of a reboot (or warm boot) process. FIG. 16C shows a method 1600C of checking for rights to lock or unlock the security hardware 370 and checking a bit to disable changing the rights. FIG. 16D shows a method 1600D of attempting to use the security hardware 370 while the computer system 100 is not in SMM. FIG. 16E shows a method 1600E of checking and/or setting the lock on the OAR access locks 460 and checking the bit to disable changing the lock. FIG. 16F shows a method 1600F of unlocking and later locking the security hardware 370 while the computer system 100 is in SMM. FIG. 16G shows a method 1600G of checking for rights to unlock and later lock the security hardware 370 while the computer system 100 is in SMM.

Referring now to FIG. 16A, the method 1600A includes the processor executing the BIOS code instructions from SMM space in the RAM memory, in block 1620. The BIOS code, executed by the processor, performs a power-on self test (POST), in block 1625. The method 1600A includes accessing the security hardware 370, in block 1630. The accesses to the computer hardware 370 may initiate an unlocking of the security hardware 370, if the security hardware 370 is not open-at-reset. The accesses to the security hardware 370 may be by the BIOS code or other device or subsystem in the computer system 100, or from outside the computer system 100, if allowed. The method 1600A may optionally include entering a BIOS management mode, in block 1632. The BIOS management mode could allow for, for example, remote booting instructions, remote or secure permission to continue the boot sequence, other remote operations or remote hardware accesses or set-ups, or choosing between or among boot choices, such as hardware configurations and/or operating systems or other software choices.

The BIOS code next looks for additional BIOS code, such as from a video controller, IDE controller, SCSI controller, etc. and displays a start-up information screen, in block 1635. As examples, the video controller BIOS is often found at C000h, while the IDE controller BIOS code is often found at C800h. The BIOS code may perform additional system tests, such as a RAM memory count-up test, and a system inventory, including identifying COM (serial) and LPT (parallel) ports, in block 1640. The BIOS code also identifies plug-and-play devices and other similar devices and then displays a summary screen of devices identified, in block 1645.

The method includes closing the access locks to the security hardware, in block 1650. The BIOS code or another device or agent in the computer system 100 may close the access locks. The BIOS code identifies the boot location, and the corresponding boot sector, in block 1655. The boot location may be on a floppy drive, a hard drive, a CDROM, a remote location, etc. The BIOS code next calls the boot sector code at the boot location to boot the computer system, such as with an operating system, in block 1660.

Referring now to FIG. 16B, the method 1600B includes opening the access locks to the security hardware, in block 1615. The processor executes the BIOS code instructions from SMM space in the RAM memory, in block 1620. The computer system accesses the security hardware 370 while in SMM, while booting, in block 1630. The method 1600B may optionally include entering a BIOS management mode, in block 1632.

The BIOS code next looks for additional BIOS code, such as from a video controller, IDE controller, SCSI controller, etc. and displays a start-up information screen, in block 1635. As examples, the video controller BIOS is often found at C000h, while the IDE controller BIOS code is often found at C800h. The BIOS code also identifies plug-and-play devices and other similar devices and then displays a summary screen of devices identified, in block 1645.

The BIOS code closes the access locks to the security hardware, in block 1650. The BIOS code identifies the boot location, and the corresponding boot sector, in block 1655. The boot location may be on a floppy drive, a hard drive, a CDROM, a remote location, etc. The BIOS code next calls the boot sector code at the boot location to boot the computer system, such as with an operating system, in block 1660.

Turning now to FIG. 16C, the method 1600C includes deciding whether to set the OAR-lock, in decision block 1646. The OAR-lock in decision block 1646 may correspond to the first indicator described above with respect to FIG. 6. The OAR-lock in decision block 1646 may also correspond to setting the OAR lock override bit 1750 described below with respect to FIG. 17D. If the decision is made to set the OAR-lock, then, according to one embodiment, all access to the security hardware 370 is blocked, in block 1647. If the decision is made not to set the OAR-lock, then the method 1600C moves to decision 1648. In decision block 1648, the method 1600C decides whether to set the OAR-lock change bit. The OAR-lock change bit in decision block 1648 may correspond to the second indicator described above with respect to FIG. 6. The OAR-lock change bit in decision block 1648 may also correspond to setting the change OAR lock override bit 1755 described below with respect to FIG. 17D. If the decision is made to set the OAR-lock change bit, in decision block 1648, then, according to one embodiment, the OAR-lock cannot be changed, thereafter, as changes to the OAR-lock are themselves locked out, in block 1649.

Turning now to FIG. 16D, the method 1600D includes a processor, such as processors 102, 805, etc., operating in a mode that is not SMM, in block 1604. In block 1606, code being processed by the processor attempts to access any part of the security hardware 370, or other hardware whose access may require a check of an access lock similar to the access locks 460. The method checks, at decision block 1607, to see if the security hardware 370 is available. If the security hardware 370 is not available, at decision block 1607, then the method 1600D exits or returns. If the security hardware 370 is available, at decision block 1607, then the method 1660D accesses the security hardware 370, at block 1630. The method, optionally, closes the access locks to the security hardware, if necessary, at block 1650.

Turning now to FIG. 16E, the method 1600E includes an embodiment of decision block 1607 from FIG. 16D. The method 1600E includes checking if access to all security hardware is locked out, i.e. forbidden, at decision block 1690. If access to all security hardware is locked out, then at decision block 1690 the method 1600E moves to decision block 1692. If access to all security hardware is not locked out, then the method 1600E moves to decision block 1691. In decision block 1691, the method 1600E checks if the requested security hardware is locked out (e.g. separately using one or more access locks).

If the requested security hardware is locked out, then the method 1660E moves to decision block 1692. If the requested security hardware is not locked out, then the method 1660E moves directly to block 1693. In decision block 1692, the method 1660E checks if the access lock for the requested security hardware can be changed, e.g., unlocked. If the access lock for the requested security hardware cannot be changed, then in decision block 1692 the method 1600E aborts the access to the security hardware. If the access lock for the requested security hardware can be changed, then in decision block 1692 the method 1600E requests authorization, such as from a user, to change the access lock for the requested security hardware, in decision block 1693. If the authorization to change the access lock for the requested security hardware is not given, then the method 1600E aborts the access to the security hardware. If the authorization to change the access lock for the requested security hardware is not given, then the method 1600E moves to block 1694 and changes the lock to allow access to the requested security hardware.

It is noted that any authorization method described herein may be used in decision block 1693. Any other authorization methods known in the art that have equivalent or better security properties in the presence of an observer may also be used.

Turning now to FIG. 16F, the method 1600F includes the processor loading code instructions into SMM space in the RAM memory, in block 1605. For example, loading code instructions into SMM space may occur in response to an SMI#. The access locks to the security hardware are opened in block 1615. The opening of the access locks may be through the SMM code instructions or through a hardware mechanism, or both.

The processor processes the code instructions from SMM space in the RAM memory, in block 1620. It is noted that the SMM timing controller 401, described above, may interrupt the processing of the code instructions. The method 1600F includes accessing the security hardware 370, in block 1630. As the computer system is in SMM and the access locks have been opened, in block 1615, the security hardware is available to most or all of the subsystems of the computer system 100 (or 800), as desired.

The method 1600F includes closing the access locks to the security hardware 370, in block 1650. The processor reloads the previous state and continues operating, in block

1665. It is noted that the processing of the SMM code instructions, in block 1620, may continue while the actions described in block 1630 occurs. Preferably, the actions described in block 1650 occur after the processing of the SMM code instructions, in block 1620, has ceased. The processing may have finished or have been interrupted.

Turning now to FIG. 16G, the method 1600G includes the processor loading code instructions into SMM space in the RAM memory, in block 1605. For example, the loading of code instructions into SMM space may occur in response to an SMI#. The method 1600G next checks if the security hardware is available, in decision block 1607. If the security hardware is not available, then in decision block 1607 the method 1600G aborts the access to the security hardware. If the security hardware is available, then the method 1600G continues with block 1620.

The processor executes the code instructions from SMM space in the RAM memory, in block 1620. It is noted that the SMM timing controller 401, described above, may interrupt the processing of the code instructions. The method 1600F includes accessing the security hardware 370, in block 1630. As the computer system is in SMM and the access locks are open, as determined in decision block 1607, the security hardware is available to most or all of the subsystems of the computer system 100 (or 800), as desired.

The method 1600G includes closing the access locks to the security hardware 370, in block 1650. The processor reloads the previous state and continues operating, in block 1665. It is noted that the executing of the SMM code instructions, in block 1620, may continue while the actions described in block 1630 occurs. Preferably, the actions described in block 1650 occur after the processing of the SMM code instructions, in block 1620, has ceased. The processing may have finished or have been interrupted.

It is noted that other processes of locking and unlocking the security hardware 370, other than the access locks, may be used. The methods 1600A–1600G are intended to extend to those other processes.

For the purposes of this disclosure, the computer system is considered to have two operating modes, normal and SMM. There are boot phases that are not in SMM, but they are, by definition, as trusted as SMM, and therefore considered equivalent to SMM herein. The boot code configures and arranges how SMM will work. SMM derives its trustworthiness from the trustworthiness of the boot code. It is contemplated that the standard boot sequence could be varied. Variations include a transition to a setup environment where the user may have the opportunity to input parameters. The input parameters may, for example, modify the BIOS code. Most setup environments return to reset before loading the operating system and operating in normal mode. This is a form of maintenance mode that is an alternative to loading the operating system and is not part of the normal mode. As contemplated, the access locks would not be set in this mode. It would be part of the boot process and as trusted as SMM, although security measures could be used if remote accesses are possible inside the setup environment.

FIGS. 17A, 17B, and 17C illustrate block diagrams of embodiments 460A, 460B, and 460C of the access locks 460 shown in FIG. 6. In FIG. 17D, a block diagram of an embodiment of the OAR override register 455, from FIG. 6, is shown. In the embodiment 460A shown in FIG. 17A, the one or more access locks 460 include a sequester bit register 1705. The bit stored in the sequester bit register 1705 may be set or cleared as a flag. In the embodiment 460B shown in FIG. 17B, the one or more access locks 460 include two or more sequester registers configured to store two or more sequestering bits to lock or unlock all of the devices within the security hardware 370. The additional bits beyond the sequester bit stored in the sequester register 1705 allows for flag bits for locking and unlocking of privileges separately. For example, a write privilege could be locked, while a read privilege could be unlocked. In the embodiment of FIG. 17C, the one or more access locks 460 include one or more sequester registers 1715A–1715N for each device within the security hardware 370C.

In FIG. 17D, the OAR override 445 includes an OAR-lock override register 1750 that stores at least one OAR-lock override bit, and a change OAR-lock override register 1755 that stores at least one change OAR-lock override bit. According to one embodiment of the present invention, if the OAR-lock override bit is not set, then access to the security hardware 370 is determined by the settings of the access locks 460. If the OAR-lock override bit is set, then the access locks 460 are ignored in favor of the security hardware 370 being either always available or never available, based on the implementation. Preferably, the security hardware is never available when the OAR-lock override bit is set. The setting of the OAR-lock override bit may be changed in SMM (or with authorization) unless the change OAR-lock override bit is set. Preferably, the change OAR-lock override bit is OAR, similar to one embodiment of the access locks 460, and may be set, in various embodiments, with the access locks 460 at boot time, such as in block 1650.

Figure 18A:
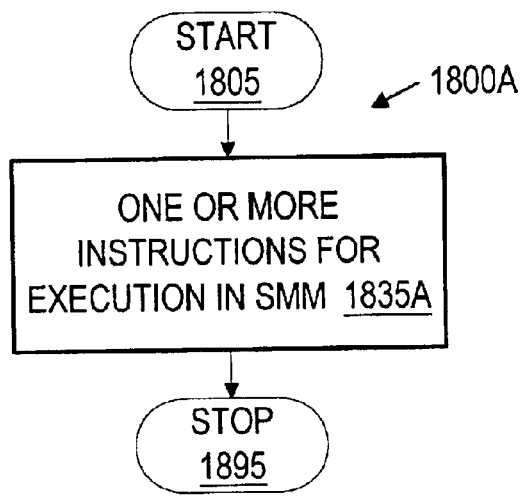

FIG. 18A illustrates a prior art flowchart of an SMM program 1800A. The prior art SMM program 1800A starts at 1805, includes one or more instructions for execution in SMM, in block 1810A, and ends at 1895 without interruption. In other words, prior art SMM program 1800A is uninterruptible and has no other entry points than the start at 1805. There are also no reasonable exit points, barring processor failure, other than the stop at 1895.

Figure 18B:
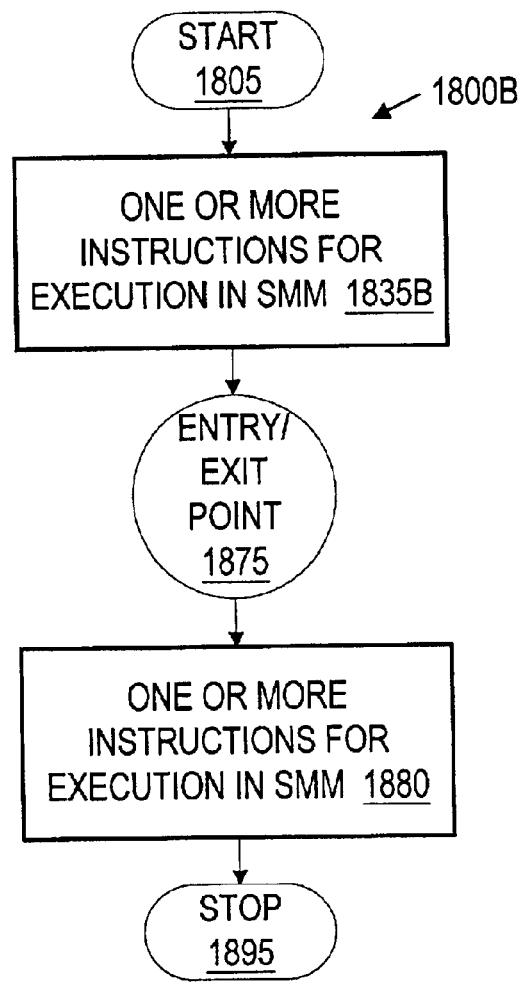
FIG. 18B illustrates a flowchart of an embodiment of operation of an interruptible and re-enterable SMM program, and FIG. 18C illustrated a flowchart of an embodiment of operation of a computer system running the interruptible and re-enterable SMM program, according to various aspects of the present invention.

FIG. 18B illustrate a flowchart of an embodiment of operations of an interruptible and re-enterable SMM program 1800B, according to one aspect of the present invention. In contrast to the prior art SMM program 1800A, the interruptible and re-enterable SMM program 1800B includes a start at 1805, one or more instructions for execution in SMM, in block 1810B, an entry/exit point 1815, one or more instructions for execution in SMM, in block 1820, and the stop at 1895.

Figure 18C:
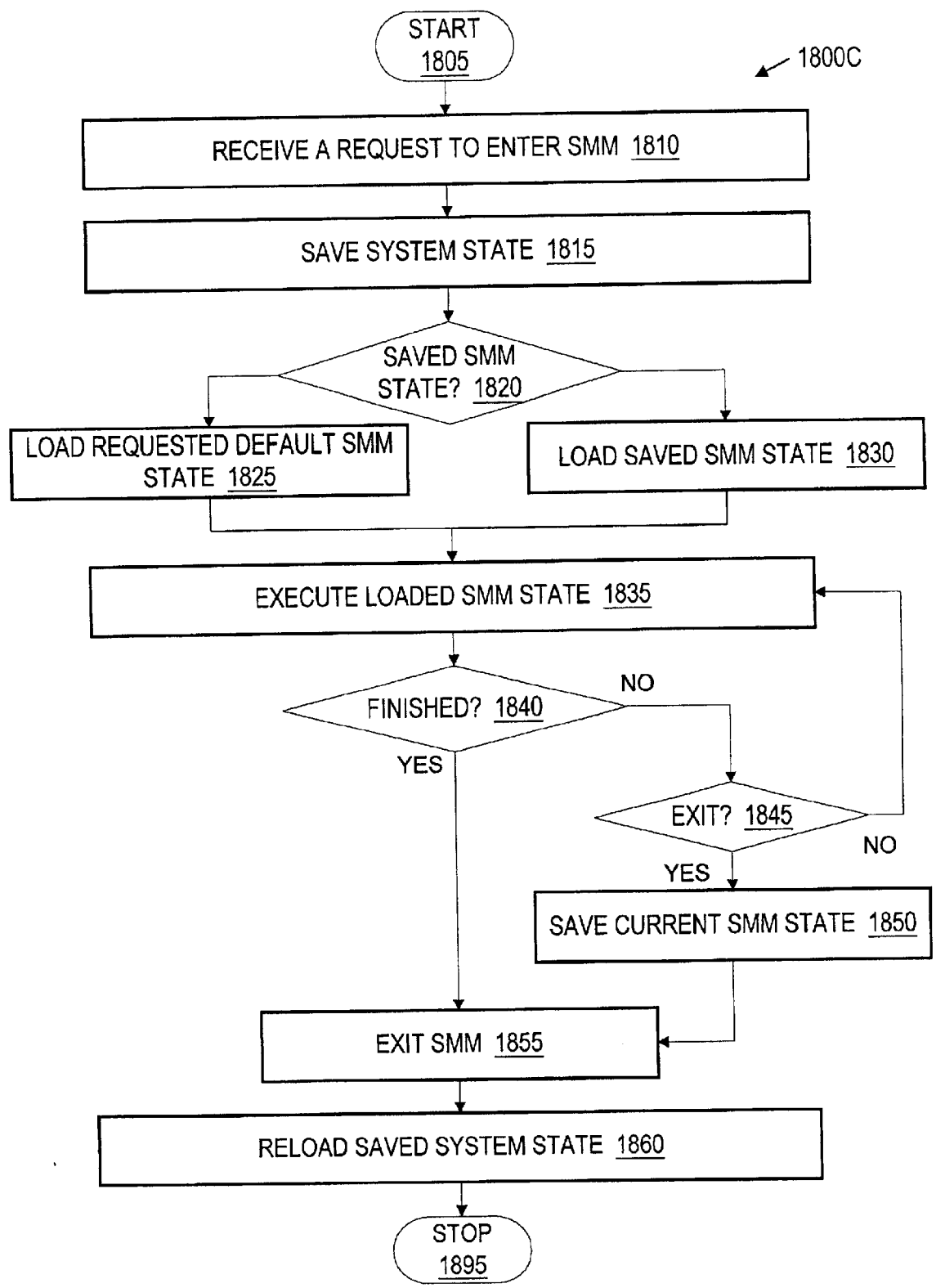

Also in contrast to the prior art SMM program 1800A, FIG. 18C illustrates an embodiment of operation of a computer system running the interruptible and re-enterable SMM program 1800B, according to one aspect of the present invention. The operations 1800C of the computer system includes a start 1805. The operations also include receiving a request to enter SMM, at 1810 and saving the system state at 1815. The method checks, at 1820, for a saved SMM state, as could be found from exiting the SMM program 1800B at 1875. If no saved SMM state is found at 1820, then load the requested default SMM state at 1825. If a saved SMM state is found at 1820, then load the saved SMM state, at 1830.

The method 1800C executes the loaded SMM state, at 1835, either the default state from 1825 or the saved state at 1830. If the SMM processing is finished, at 1840, then the method moves to 1855 and exits SMM. If the SMM processing is not finished, then the method continues execution of the SMM state, if no exit request is received at 1845. If the exit request is received at 1845, then the method saves the current SMM state at 1850 and exits SMM at 1855. The saved system state is reloaded at 1860, and the method ends at the stop 1895.

While only one entry/exit point 1815 is shown in the embodiment of FIG. 18B, other embodiments may include two or more entry/exit points 1815 in an SMM program 1800B or the operations of the method 1800C shown in FIG. 18C. In these embodiments, each entry/exit point 1815 would have one or more instructions for execution in SMM, similar to blocks 1810B and 1820, both before and after the entry/exit point 1815.

For example, in one embodiment, block 1810B includes one instruction for execution in SMM, followed by an entry/exit point 1815A. Entry/exit point 1815A is followed by another single instruction for execution in SMM, in block 1820A. Block 1820A is followed by another entry/exit point 1815B. Entry/exit point 1815B is followed by another single instruction for execution in SMM, in block 1820B. Block 1820B is followed by the stop 1895. While a single instruction in blocks 1810B, 1820A, and 1820B may be small, the concept of regularly spaced Entry/exit points 1815 is illustrated. In other embodiments, two, three or more instructions for execution in SMM may be substituted for the single instructions. In still other embodiments, there may be a variable number of instructions for execution in SMM in blocks 1810B, and 1820. The number of instructions may depend on the execution times for each set of instructions, so that SMM may be interruptible every so often during execution.

It is noted that forced exits from SMM, as are taught herein in one aspect of the present invention, for example, with respect to FIG. 10A, and re-entry into SMM, as is also taught herein in another aspect of the present invention, for example, with respect to FIG. 10B, are but two examples of how interruptible, re-enterable SMM code could be implemented or used. Those of skill in the art of computer programming with full appreciation of this disclosure will appreciate that many programming techniques used with non-SMM code that used interruptible, re-enterable code flow will now be available in SMM code.

Figure 19A:
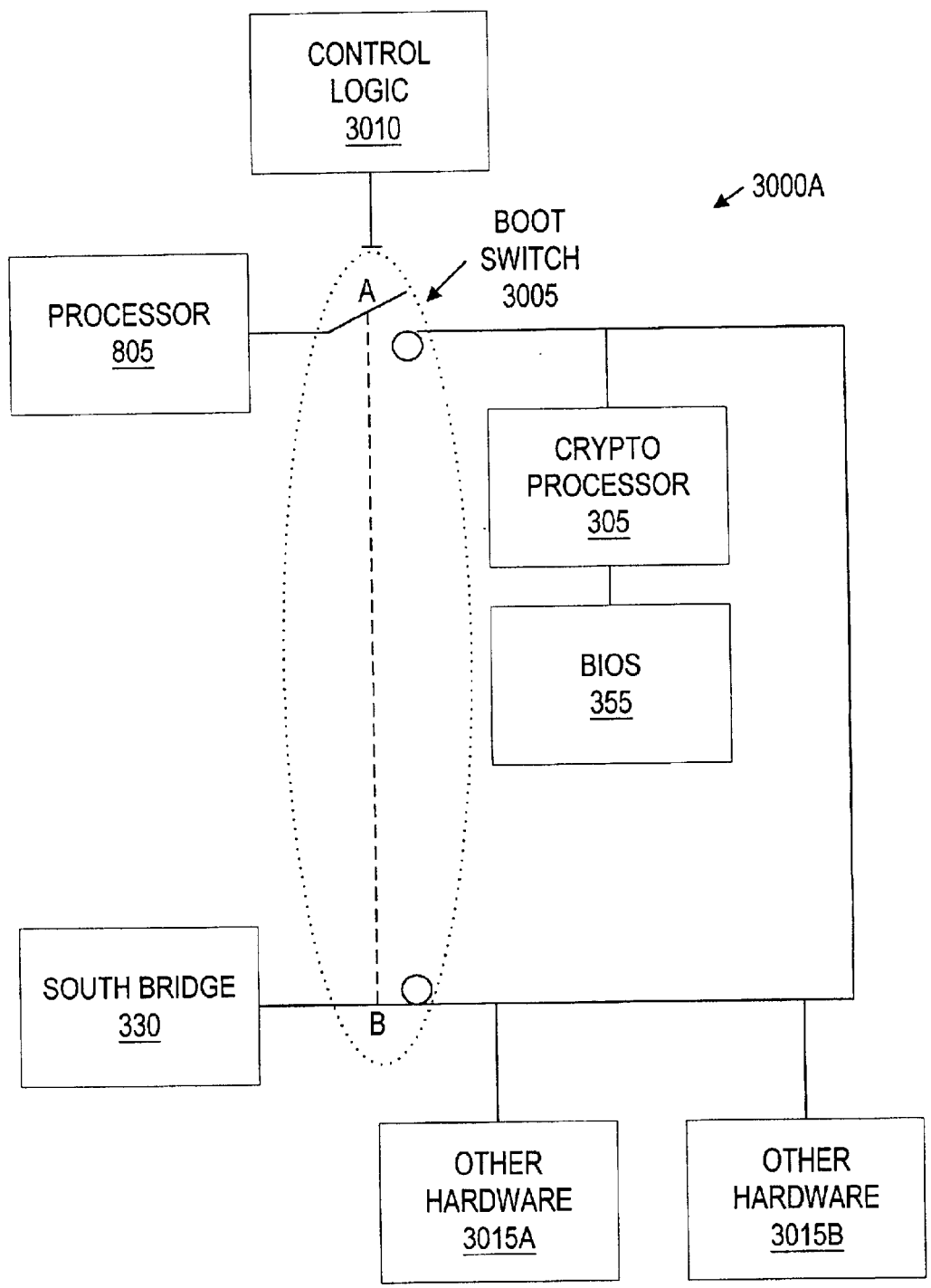
FIGS. 19A, 19B, and 19C illustrate block diagrams of embodiments of computer systems with the BIOS ROM accessible to the processor at boot time and to the south bridge at other times, according to various aspects of the present invention.
Figure 19B:
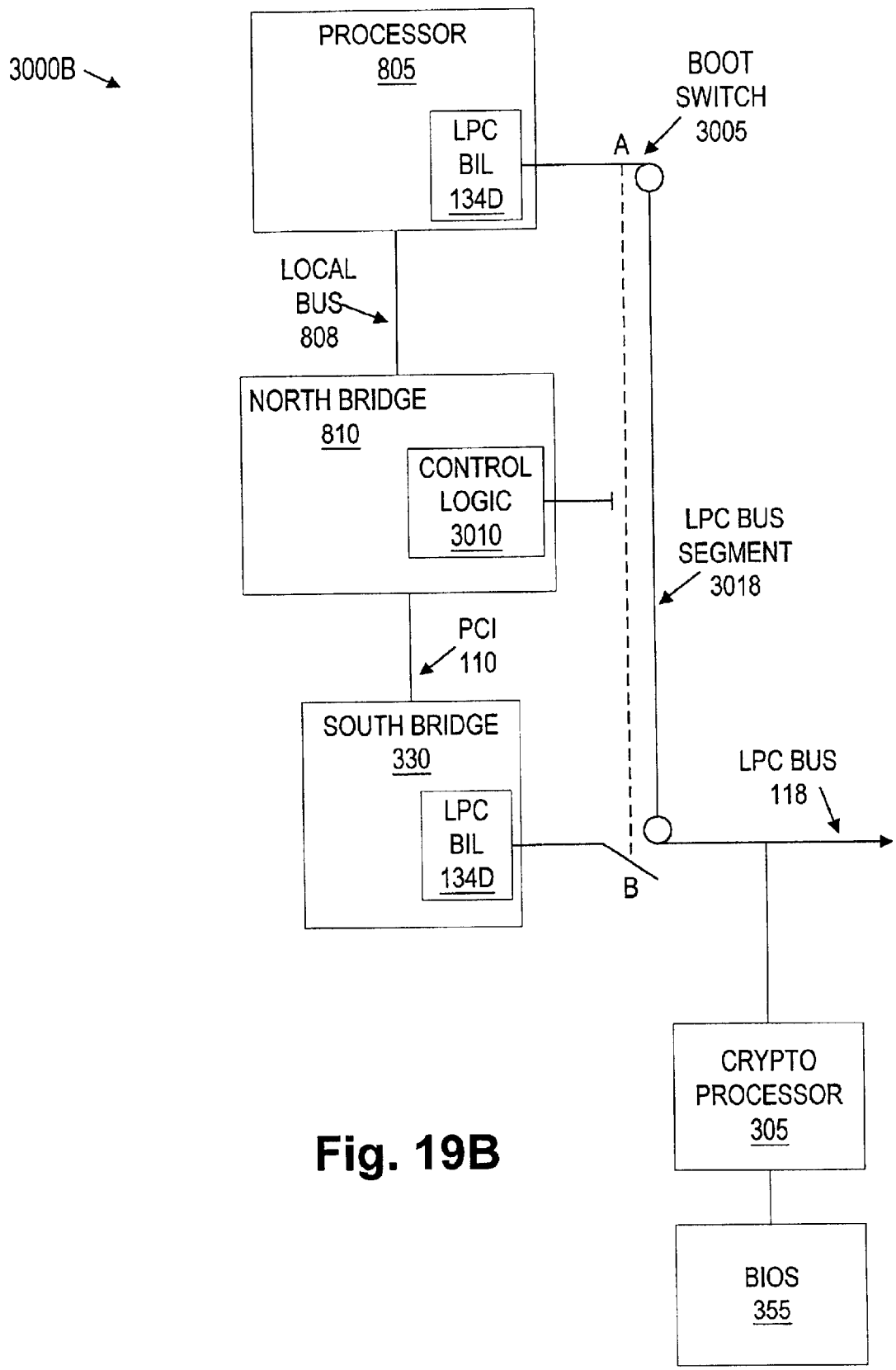
Figure 19C:
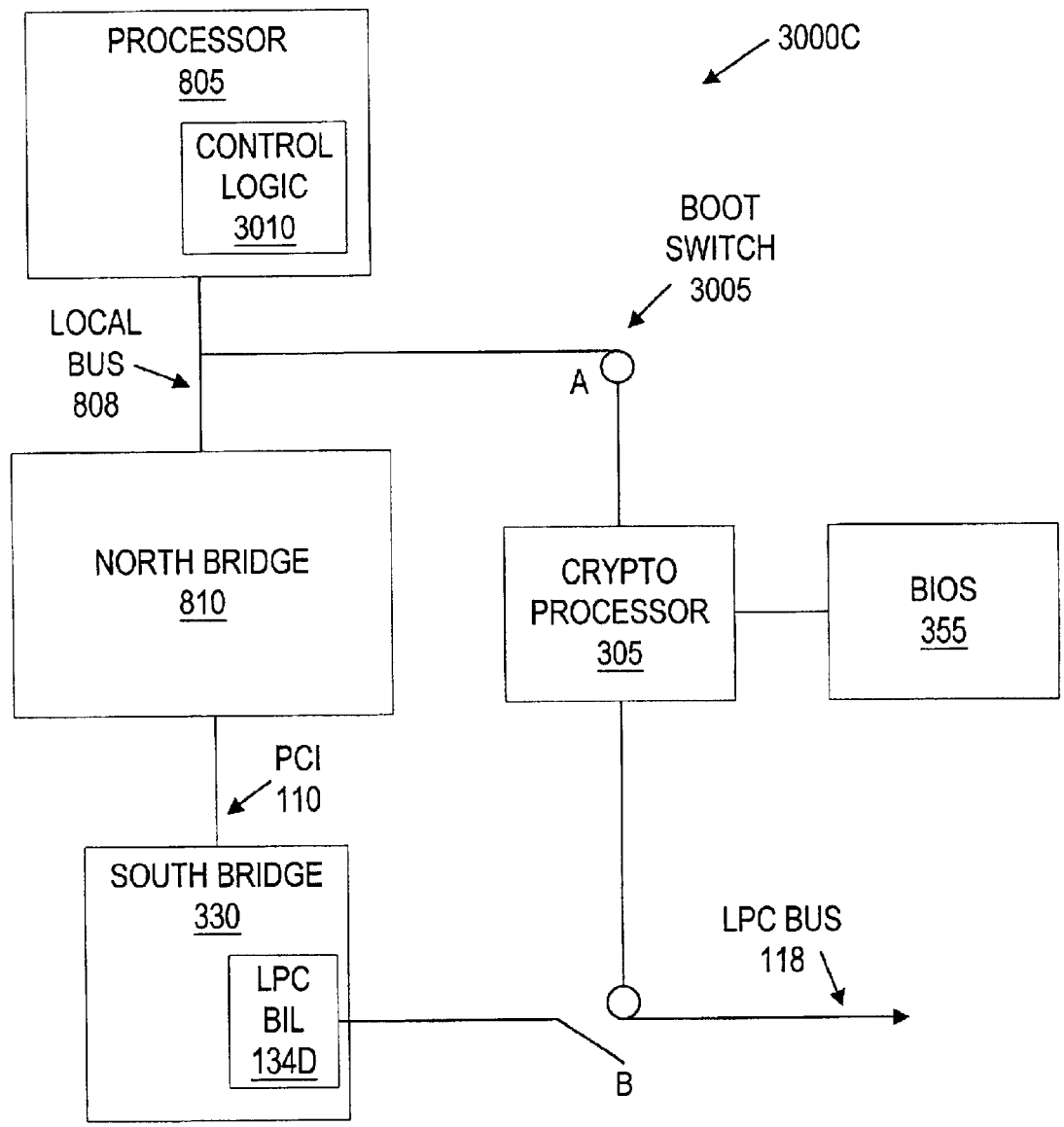

FIGS. 19A, 19B, and 19C illustrate block diagrams of embodiments 3000A, 3000B, and 3000C of computer systems with the BIOS ROM 355 accessible to the processor 805 at boot time and to the south bridge 330 at other times. Common to all three figures are a processor 805, a south bridge 330, control logic 3010, a boot switch 3005, a crypto-processor 305, and BIOS ROM 355. The processor 805 is coupled to the south bridge 330 in a usual fashion at times other than at boot time. At boot time, the control logic 3010 is operable to change the boot switch 3005 such that the processor 805 has access to the BIOS 355 without going through the south bridge 330 in the usual fashion.

In FIG. 19A, embodiment 3000A shows the processor 805 coupled to one part (A) of the boot switch 3005. Part A of the boot switch 3005 is open, as would occur after booting. The control logic 3010 is coupled to the boot switch 3005 to control the operations of the boot switch 3005. The south bridge 330 is coupled to Part B of the boot switch 3005. Part B of the boot switch 3005 is closed, again as would occur after booting. The south bridge 330 is shown coupled to the bus to which the BIOS is coupled, shown as being through the crypto-processor 305. Other hardware 3015A and 3015B are also shown coupled to the bus, which may be an LPC bus 118, or another bus.

In FIG. 19B, embodiment 3000B shows the processor 805 coupled to one part (A) of the boot switch 3005 through an instance of LPC bus interface logic (BIL) 134D. Part A of the boot switch 3005 is closed, as would occur during booting. The processor 805 is coupled to a north bridge 810 through a local bus 808. The north bridge 810 includes the control logic 3010, coupled to the boot switch 3005 to control the operations of the boot switch 3005. The north bridge 808 is further coupled to the south bridge 330 through a PCI bus 110. The south bridge 330 is coupled to Part B of the boot switch 3005 through another instance of LPC BIL 134D. Part B of the boot switch 3005 is open, again as would occur during booting. The south bridge 330 is shown coupled to an LPC bus to which the BIOS 355 is coupled, shown as being through the crypto-processor 305. Other hardware 3015A and 3015B are not shown in this embodiment, but may be present. The connection between Part A of the boot switch 3005 and Part B of the boot switch 3005 is shown as an LPC bus segment 3018.

As illustrated, during the booting process, the processor 805 is operable to use an LPC bus protocol to access the BIOS 355 directly, without going through the north bridge 810 or the south bridge 330. By providing a more direct connection between the processor 805 and the BIOS ROM 355, the computer system 3000B may advantageously boot or reboot faster than using more usual methods of accessing the BIOS ROM 355. After booting, accesses to the BIOS ROM 355 are through the south bridge 330 using the LPC bus 118.

In FIG. 19C, embodiment 3000C shows the processor 805 coupled to one part (A) of the boot switch 3005 through the local bus 808. Part A of the boot switch 3005 is closed, as would occur during booting. The processor 805 is also coupled to the north bridge 810 through the local bus 808. The processor 805 includes the control logic 3010, coupled to the boot switch 3005 to control the operations of the boot switch 3005. The north bridge 808 is further coupled to the south bridge 330 through a PCI bus 110. The south bridge 330 is coupled to the LPC bus 118 an instance of LPC BIL 134D. Part B of the boot switch 3005 is coupled to the LPC bus 118. Part B of the boot switch 3005 is open, again as would occur during booting. The BIOS ROM 355 is coupled through the crypto-processor 305 to the local bus 808 when Part A of the boot switch 3005 is closed and to the LPC bus 118 when Part B of the boot switch 3005 is closed. The crypto-processor 305 may include bus interface logic for the local bus 808 and the LPC bus 118, or the crypto-processor 305 may be configured to translate the bus protocols as necessary to pass bus cycles to the BIOS ROM 355. Other hardware 3015A and 3015B are not shown in this embodiment, but may be present.

As illustrated, during the booting process, the processor 805 is operable to use the local bus protocol to access the BIOS 355 directly, without going through the north bridge 810 or the south bridge 330. By providing a more direct connection between the processor 805 and the BIOS ROM 355, the computer system 3000C may advantageously boot or reboot faster than using more usual methods of accessing the BIOS ROM 355. After booting, accesses to the BIOS ROM 355 are through the south bridge 330 using the LPC bus 118.

It is noted that the control logic 3010 may be signaled to or configured to operate the boot switch 3005 at times other than booting to allow for faster access to the BIOS ROM 355, the crypto-processor 305 (when present), or, for example, other hardware 3015 on the LPC bus.

In various embodiments of the present invention, the security of SMM is assumed. It is noted that one or more so-called "backdoors" may exist that could be exploited to compromise the security of SMM. The issues contemplated include misuse of the hardware debug test (HDT) mode of the processor 805 as well as the ability of the processor 805 to load and replace microcode. Illustrated in FIGS. 20A–D are various embodiments 805A, 805B, 805C, 805D of the processor 805, each of which includes various security protections against one or more backdoor attacks.

Figure 20A:
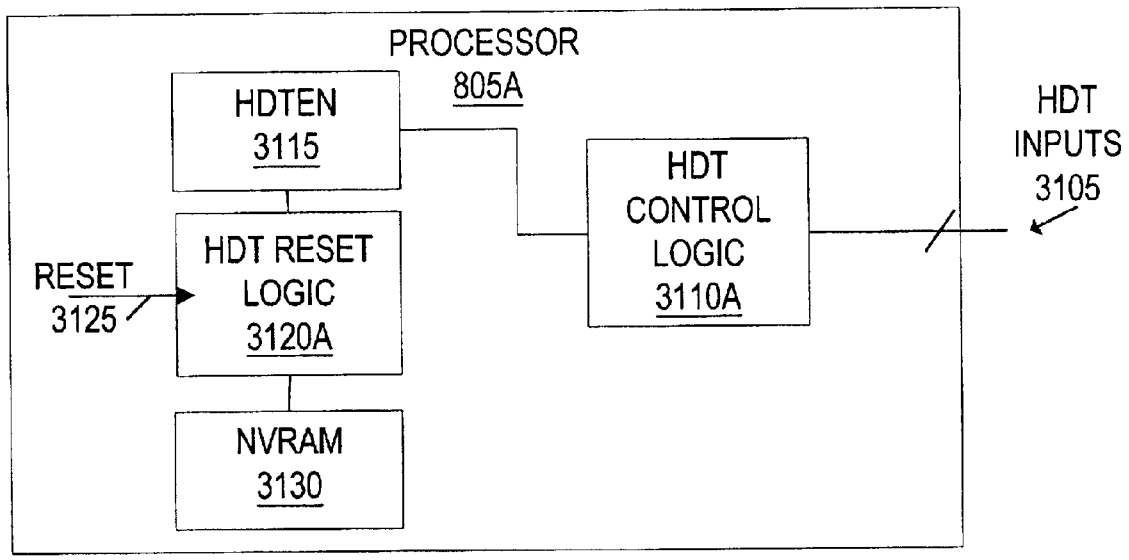
FIGS. 20A–20D illustrate block diagrams of embodiments of processors including lock registers and logic, according to various aspects of the present invention.

In FIG. 20A, the processor 805A includes HDT control logic 3110A, HDT reset logic 3120A, and one or more registers, including an HDT enable register 3115 and non-volatile random access memory (NVRAM) 3130. As shown, the HDT control logic 3110A is coupled to receive a plurality of input signals through a plurality of HDT pins 3105. The HDT control logic 3110A is further coupled to the HDT enable register 3115. The HDT reset logic 3120A is coupled to receive a RESET signal over a line 3125 and to access (i.e. read and write) the HDT enable register 3115 and the NVRAM 3130.

Figure 20B:
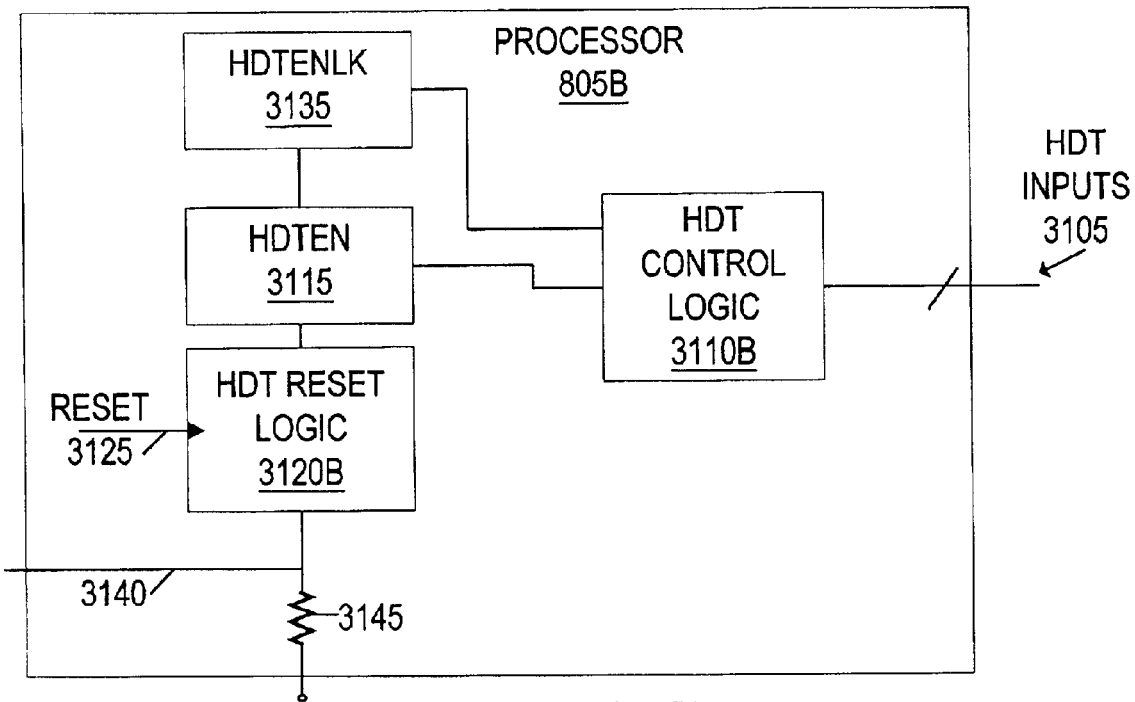

In FIG. 20B, the processor 805B of FIG. 20B includes HDT control logic 3110B, HDT reset logic 3120B, and two registers, including the HDT enable register 3115 and an HDT enable lock register 3135. As shown, the HDT control logic 3110B is coupled to receive a plurality of input signals through the plurality of HDT pins 3105. The HDT control logic 3110B is further coupled to the HDT enable register 3115 and the HDT enable lock register 3135. The HDT reset logic 3120B is coupled to receive the RESET signal over the line 3125 and a signal, such as over a line 3140, through a pull-up (or pull-down) resistor 3145.

Figure 20C:
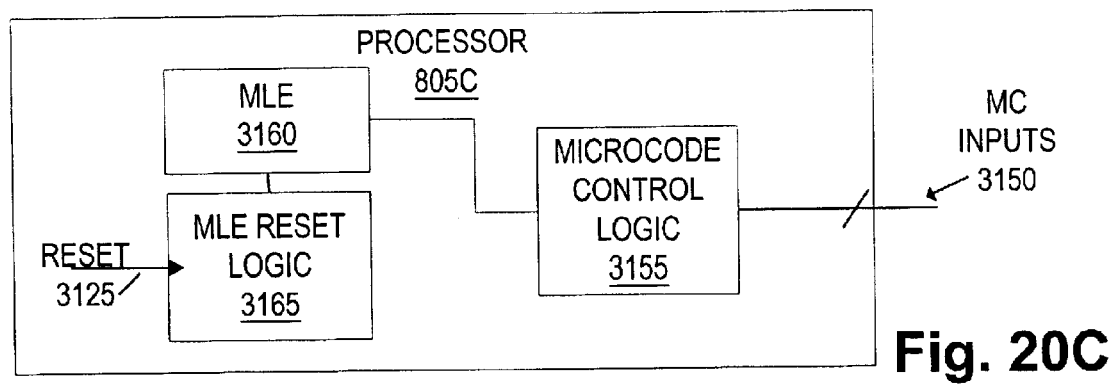

In FIG. 20C, the processor 805C includes microcode control logic 3155, microcode loader enable reset logic 3165, and one or more registers, including a microcode loader enable register 3160. As shown, the microcode control logic 3155 is coupled to receive a plurality of input signals through a plurality of microcode input pins 3150. The microcode control logic 3155 is further coupled to the microcode loader enable register 3160. The microcode loader enable reset logic 3165 is coupled to receive the RESET signal and to access the microcode loader enable register 3160.

Figure 20D:
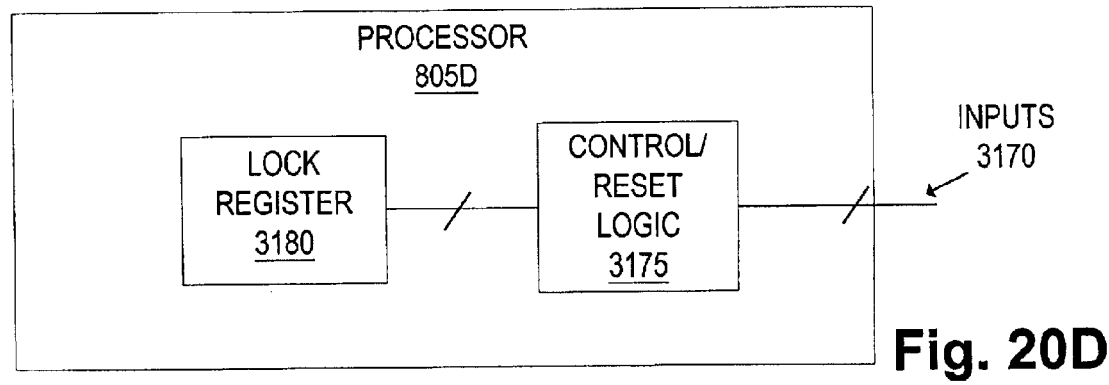

In FIG. 20D, the processor 805D includes HDT control logic 3110 integrated with the microcode control logic 3155, the HDT reset logic 3120, and the MLE reset logic 3165 to form control/reset logic 3175. The HDT enable register 3115 and the microcode loader enable register 3160 are integrated into a multibit lock register 3180. A plurality of inputs 3170 is shown to the control/reset logic 3175. The plurality of inputs 3170 may include the HDT inputs 3105, the microcode inputs 3150, and/or the reset signaling means. Other embodiments (not shown) integrate only the HDT control logic 3110 and the microcode control logic 3155, or just the HDT reset logic 3120 and the MLE reset logic 3165.

According to various embodiments of the present invention, the registers 3115, 3135, and 3160, as well as the NVRAM 3130 include storage space for one or more bits. In one embodiment, each register is configured to store a single bit. It is noted that the enable registers 3115 and 3160 may also be integrated into a single lock register, and the HDT enable lock register 3135 may be used as a microcode enable lock register. It is contemplated that the registers 3115, 3135, 3160, and/or 3180 could be included in the SMM MSRs 807.

In various embodiments, the HDT enable register 3115 is configured to store one or more HDT enable bits signifying whether HDT mode is enabled or disabled. The HDT reset logic 3120 is configured to set the one or more HDT enable bits to a default state upon a reset of the processor 805.

Multiple embodiments for controlling the HDT modes are contemplated, such as those illustrated in FIGS. 20A and 20B. In one embodiment, the HDT mode is enabled as the default on non-production processors 805 used for engineering and testing. The HDT mode may be disabled as the default in standard production processors 805. In another embodiment, illustrated in FIG. 20A, the default state may be stored in and read from the NVRAM 3130. In this embodiment, the default state may be changeable, but in the illustrated embodiment, the default state is set to disabled. In still another embodiment, illustrated in FIG. 20B, the default state is set using a strapping option. The default value is provided to the HDT reset logic 3120B through the pull-up (or pull-down) resistor 3145.

Multiple embodiments for controlling the microcode loader modes are also contemplated, such as those illustrated in FIGS. 20C and 20D. In one embodiment, not illustrated, the microcode update mode is enabled as the default on non-production processors 805 used for engineering and testing. The microcode update mode may be disabled as the default in standard production processors 805. In another embodiment, similar to that illustrated in FIG. 20A, the default state may be stored in and read from the NVRAM 3130. In this embodiment, the default state may be changeable, but in the illustrated embodiment the default state is set to disabled. In still another embodiment, illustrated in FIG. 20B, the default state is using a strapping option. The default value is provided to the MLE reset logic 3165 through the pull-up (or pull-down) resistor 3145.

Figure 21:
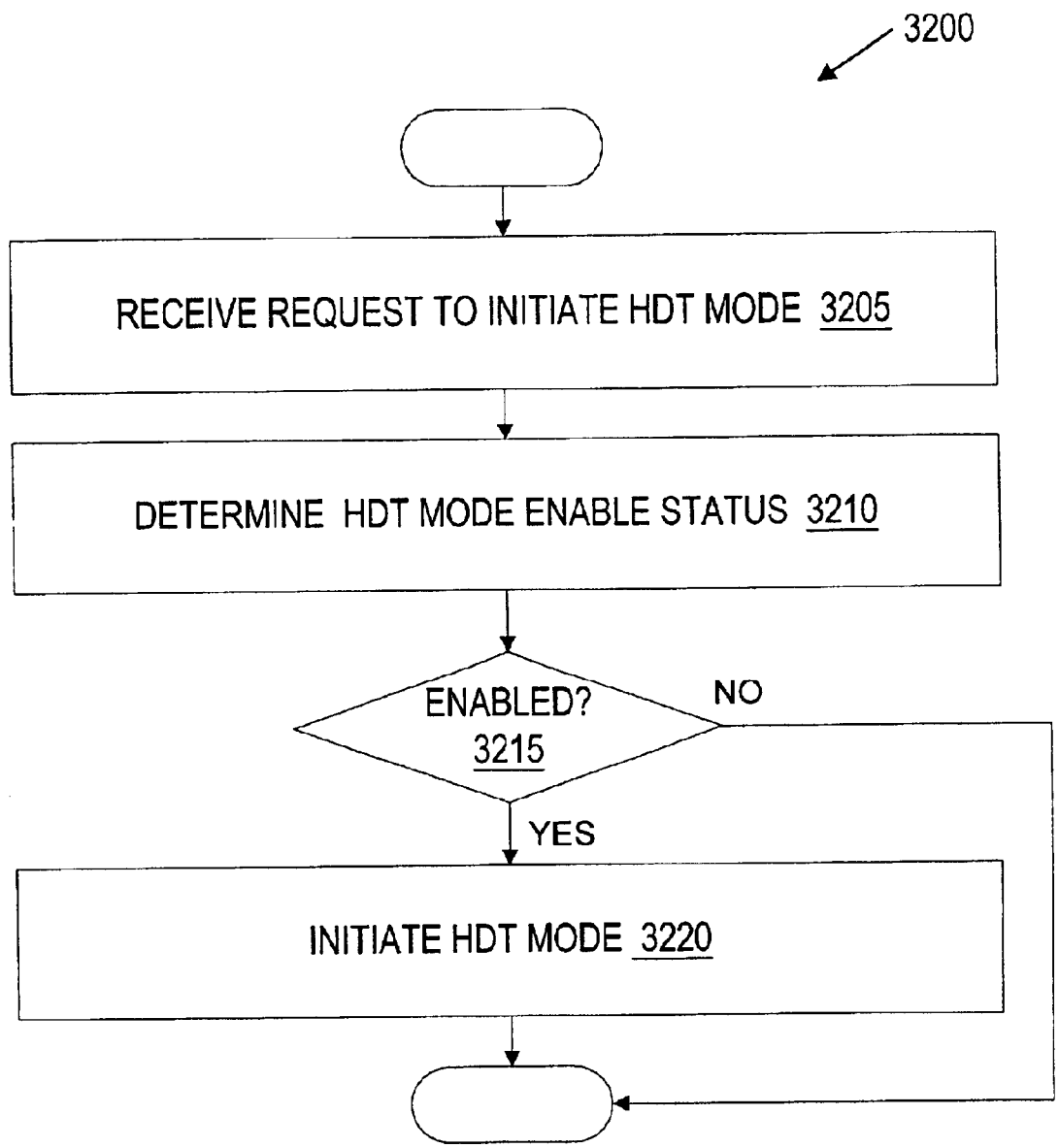
FIG. 21 illustrates a flowchart of an embodiment of a method for initiating HDT mode, according to one aspect of the present invention.

Turning now to FIG. 21, a method 3200 for initiating the HDT mode is shown. In response to receiving a request to enter the HDT mode (step 3205), the HDT control logic 3110 checks the status of the one or more HDT enable bits to see if the HDT mode is enabled or disabled (step 3210). If the HDT mode is enabled (step 3215), then the HDT control logic 3110 initiates the HDT mode (step 3220). If the HDT mode is disabled (step 3215), then the; HDT control logic 3110 will not initiate the HDT mode.

Figure 22:
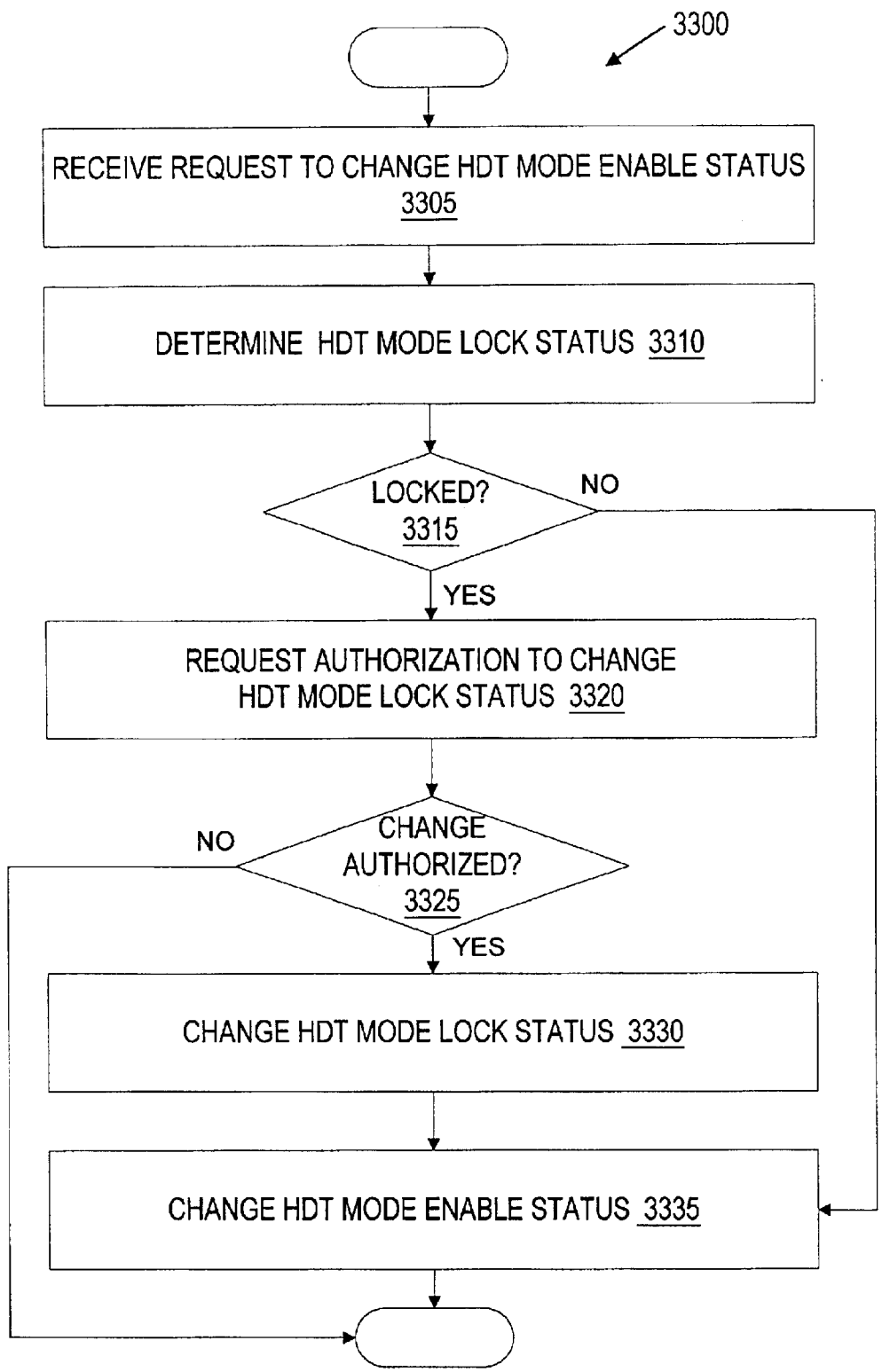
FIG. 22 illustrates a flowchart of an embodiment of a method for changing the HDT enable status, according to one aspect of the present invention.

Turning now to FIG. 22, a method 3300 for changing the HDT mode enable status, which includes an HDT mode lock, is shown. In response to receiving a request to enter the HDT mode (step 3305), the HDT control logic 3110 checks the status of the one or more HDT enable lock bits to determine if the HDT lock mode is locked or unlocked (step 3310). If the HDT lock mode is unlocked (step 3315), then the HDT control logic 3110 initiates HDT mode (step 3335). If the HDT lock mode is locked (step 3315), then the HDT control logic 3110 requests authorization to change the HDT lock mode status (step 3320). If the change is authorized (step 3325), then the HDT control logic 3110 changes the HDT mode lock bit to unlocked (step 3330). If the change is not authorized (step 3325), then the HDT control logic 3110 does not change the HDT mode lock bit.

In various embodiments, the HDT enable status may be changed by setting or resetting the one or more HDT enable status bits. For example, the HDT mode may be disabled, but inside SMM, a predetermined input to the HDT control logic 3110 may signal the HDT control logic 3110 to change the HDT mode status to enabled. In the embodiment of FIG. 20A, for example, once signaled, the HDT control logic 3110 would change the status of the HDT enable bit from disabled to enabled.

Referring back to the embodiment of FIG. 20B, for example, in response to receiving a request to change the HDT mode status, the HDT control logic 3110 checks the status of the one or more HDT enable lock bits to see if the HDT lock mode is enabled or disabled. If the HDT lock mode is disabled, then the HDT control logic 3110 may change the HDT mode status. If the HDT lock mode is enabled, then the HDT control logic 3110 will not change the HDT mode status.

It is noted that the method 3300 may alternatively terminate if the microcode update lock status is locked (step 3315), instead of requesting authorization to change the microcode update lock status (step 3320). The method 3300 may also include receiving a request to change the microcode update lock status (not shown) prior to the method 3300 requesting authorization (step 3320).

Figure 23:
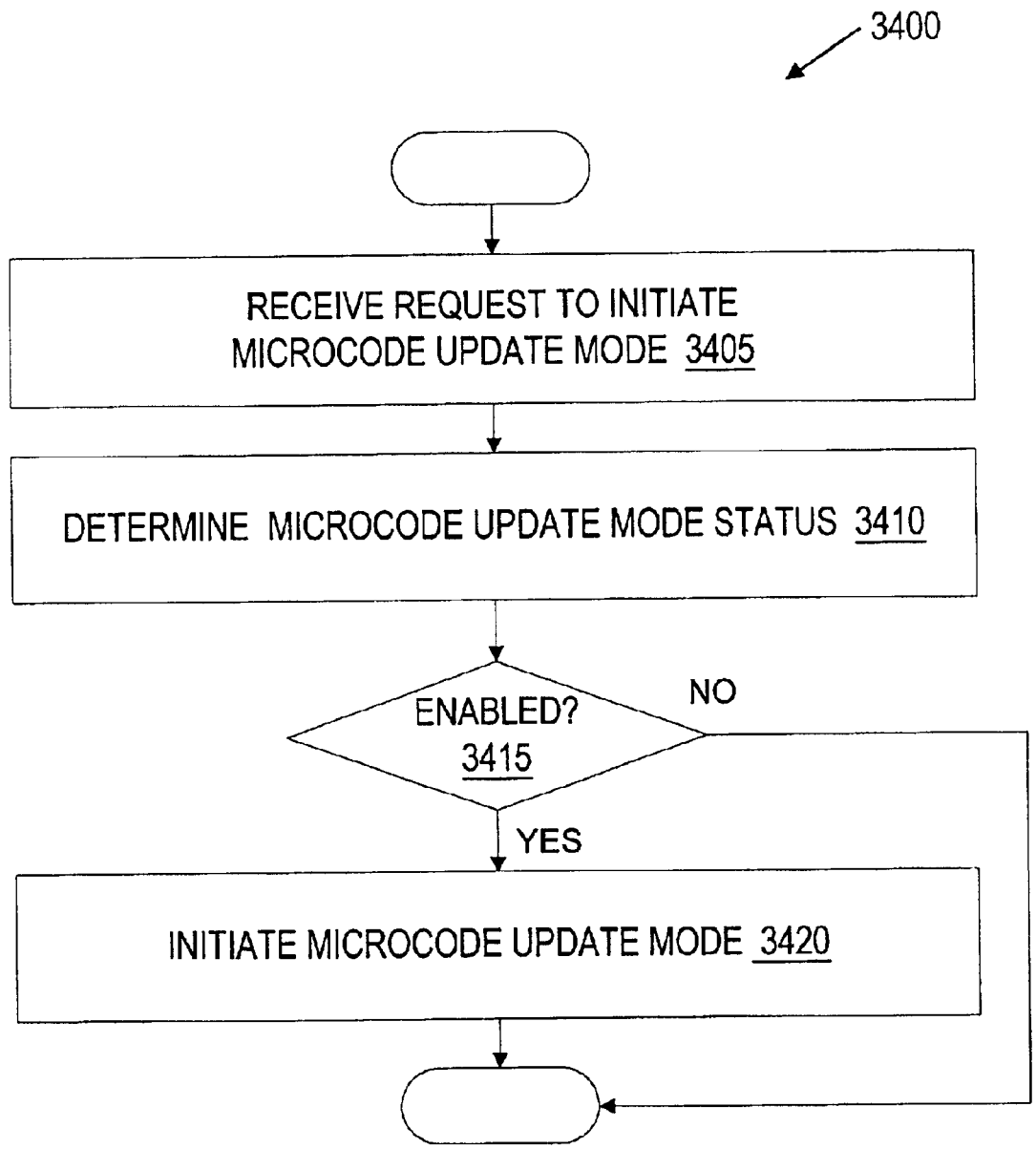
FIG. 23 illustrates a flowchart of an embodiment of a method for initiating the microcode loader, according to one aspect of the present invention.

Turning now to FIG. 23, a method 3400 for initiating the microcode loader is shown. In response to receiving a request to initiate the microcode update mode (step 3405), the microcode control logic 3155 checks the status of the one or more microcode enable bits to see if microcode update mode is enabled or disabled (step 3410). If the microcode update mode is enabled (step 3215), then the microcode control logic 3110 initiates the microcode update mode (step 3220). If the microcode update mode is disabled (step 3215), then the microcode control logic 3110 will not initiate the microcode update mode.

Figure 24:
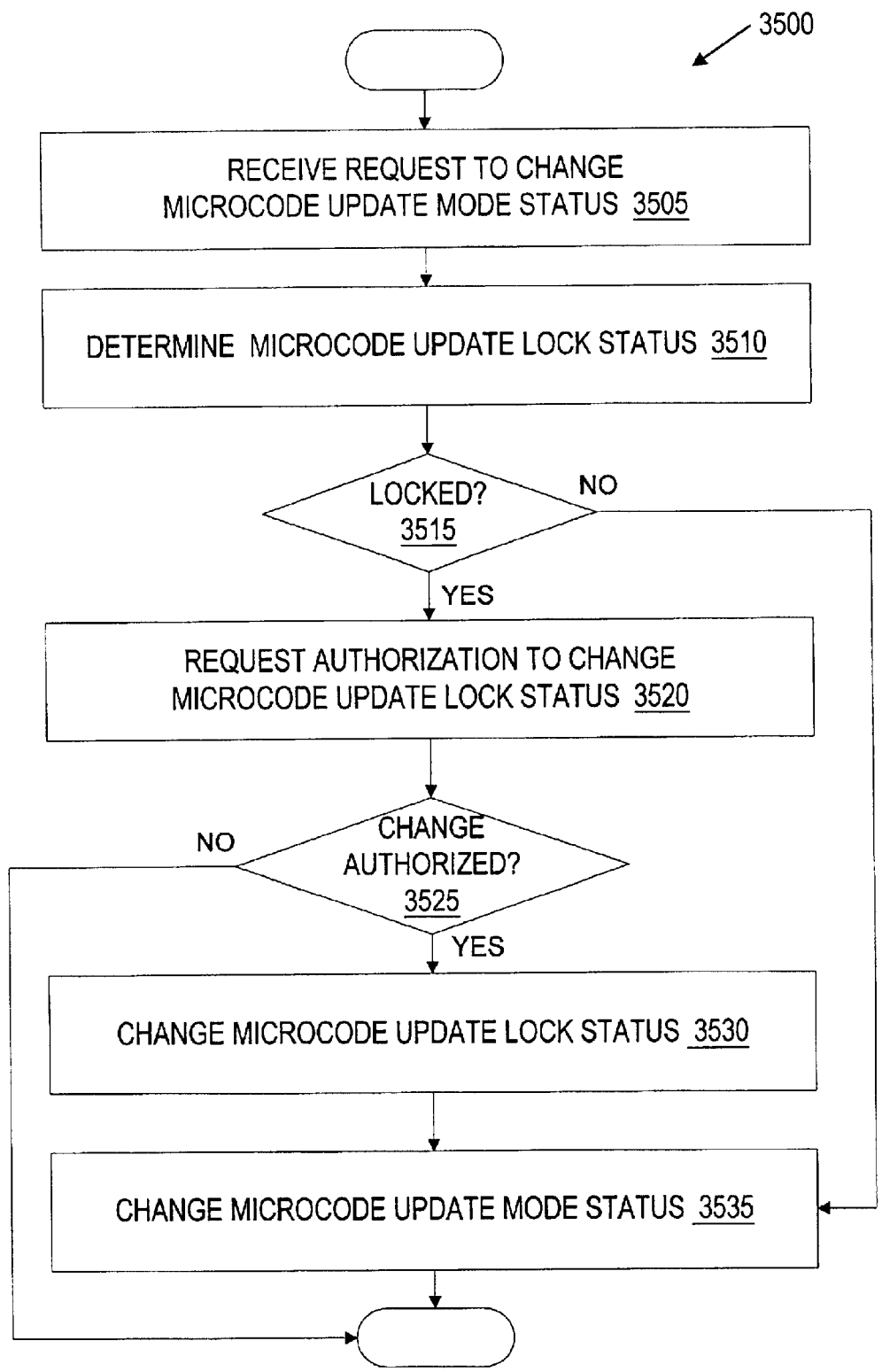
FIG. 24 illustrates a flowchart of an embodiment of a method for changing the microcode loader enable status, according to one aspect of the present invention.

Turning now to FIG. 24, a method 3500 for changing the microcode update mode enable status, which includes a microcode mode lock, is shown. In response to receiving a request to enter the microcode mode (step 3505), the microcode control logic 3110 checks the status of the one or more microcode enable lock bits to see if the microcode mode is locked or unlocked (step 3510). If the microcode lock mode is unlocked (step 3515), then the microcode control logic 3110 initiates the microcode mode (step 3535). If the microcode lock mode is locked (step 3515), then the microcode control logic 3110 requests authorization to change the microcode mode lock status (step 3520). If the change is authorized (step 3525), then the microcode control logic 3110 changes the microcode mode lock bit to unlocked (step 3530). If the change is not authorized (step 3525), then the microcode control logic 3110 does not change the microcode mode lock bit.

In various embodiments, the microcode enable status may be changed by setting or resetting the one or more microcode enable status bits. For example, the microcode mode may be disabled, but inside SMM, a predetermined input to the microcode control logic 3110 may signal the microcode control logic 3110 to change the microcode mode status to enabled. In the embodiment of FIG. 20C, for example, once signaled, the microcode control logic 3110 will change the status of the one or more microcode enable bits from disabled to enabled.

In response to receiving a request to change the microcode mode status, the microcode control logic 3110 may check the status of the one or more microcode enable lock bits to determine if the microcode lock mode is enabled or disabled. If the microcode lock mode is disabled, then the microcode control logic 3110 may change the microcode mode status. If the microcode lock mode is enabled, then the microcode control logic 3110 will not change the microcode mode status.

It is noted that the method 3500 may alternatively terminate if the microcode update lock status is locked (step 3515), instead of requesting authorization to change the microcode update lock status (step 3520). The method 3500 may also include receiving a request to change the microcode update lock status (not shown) prior to the method 3500 requesting authorization (step 3520).

Figure 25A:
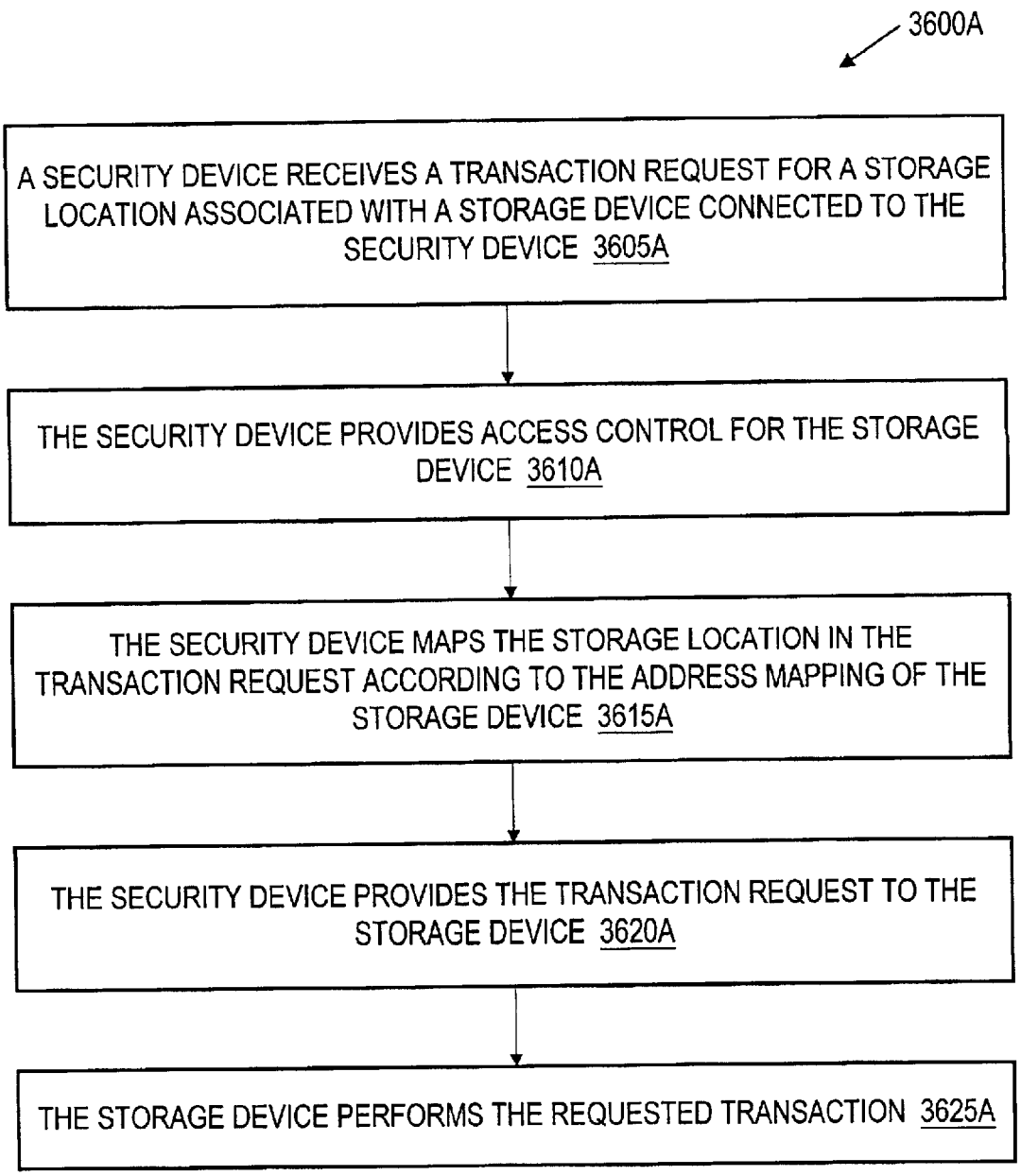
FIGS. 25A, 25B, 26, and 27 illustrate flowcharts of embodiments of methods for secure access to storage, according to various aspects of the present invention.
Figure 25B:
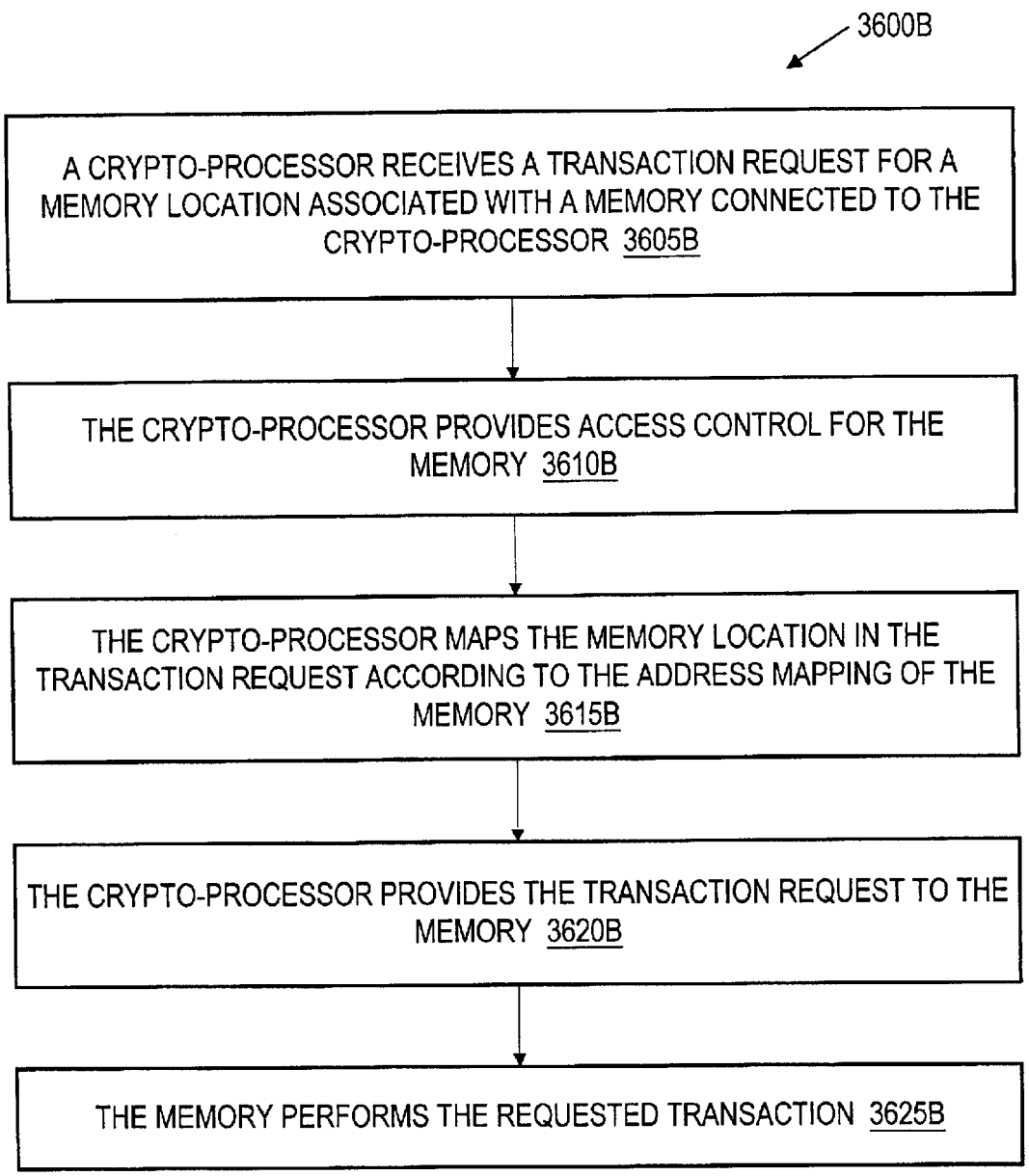
Figure 26:
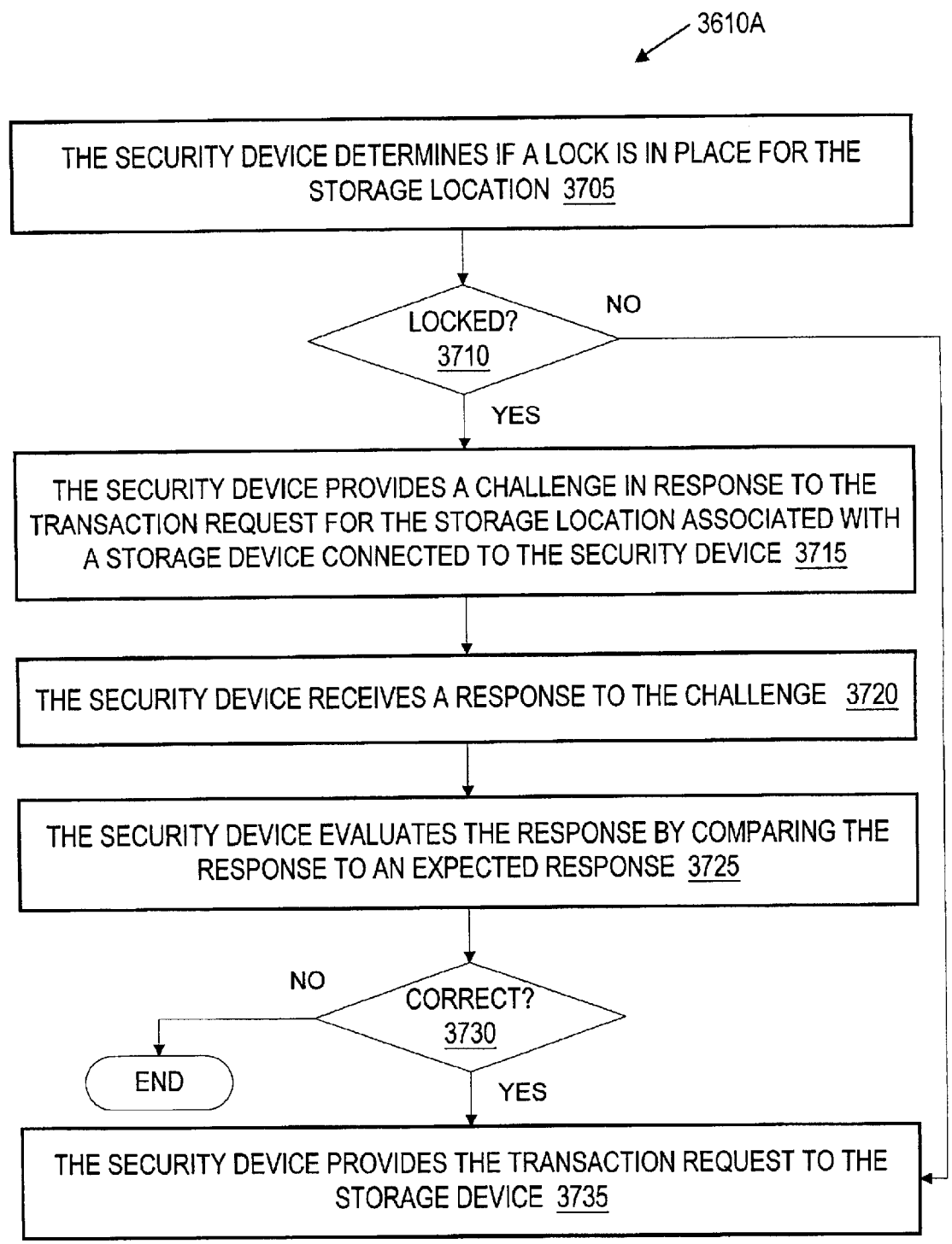
Figure 27:
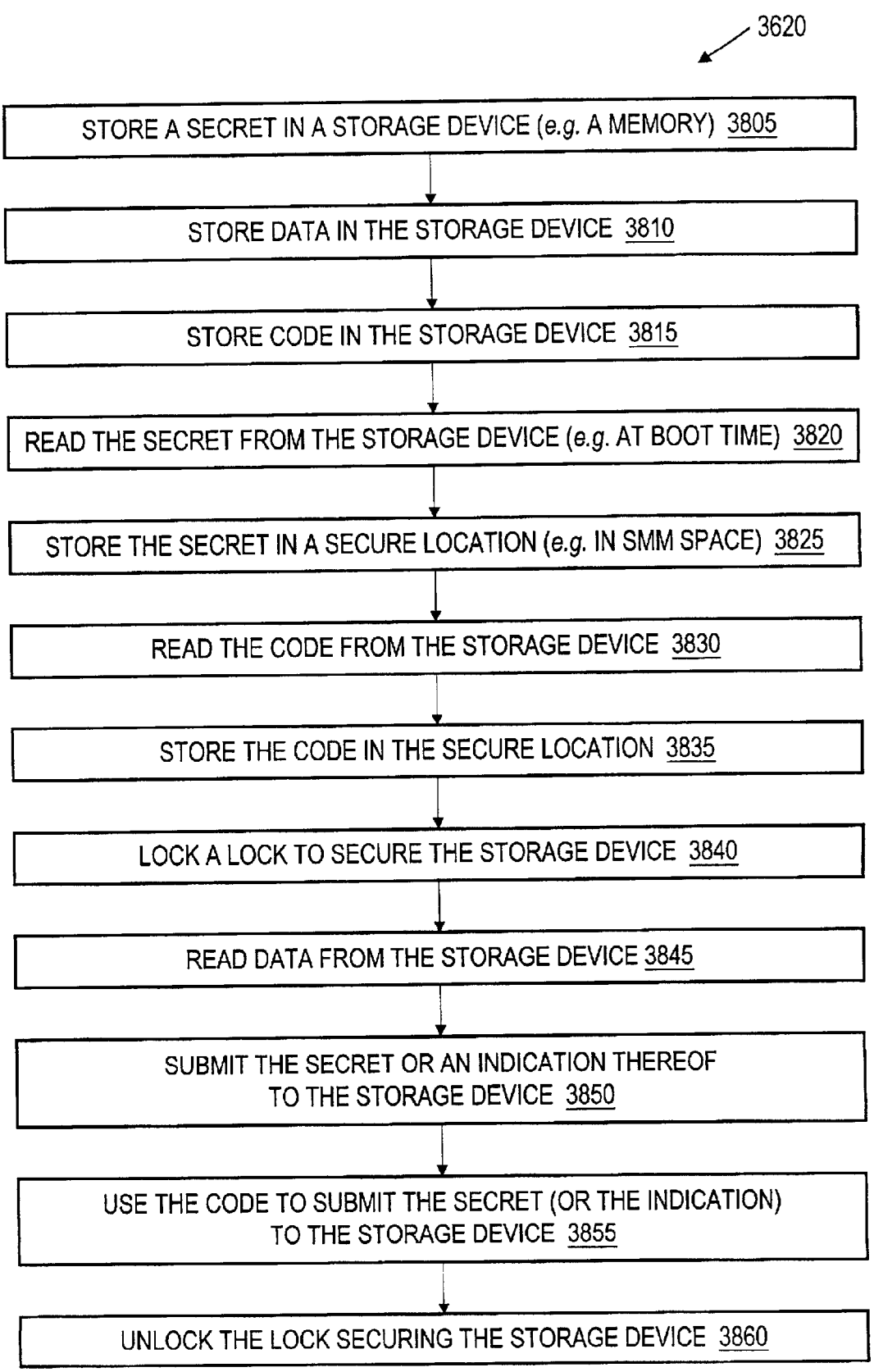

FIGS. 25A, 25B, 26, and 27 illustrate flowcharts of embodiments of methods 3600A, 3600B, 3610A, and 3620 for secure access to storage, according to various aspects of the present invention. FIG. 25A shows a flowchart of the method 3600A where a security device maintains secure access to a storage device, according to one aspect of the present invention. FIG. 25B shows a flowchart of the method 3600B where a crypto processor maintains secure access to a memory, according to one aspect of the present invention. FIG. 26 shows a flowchart of the method 3610A where a security device provides secure access control to a storage device using a challenge-response authentication protocol, according to one aspect of the present invention. FIG. 27 shows a flowchart of the method 3620 where a secret is used to unlock data access to a secure storage device.

Turning to FIG. 25A, the method 3600A includes the security device receiving a transaction request for a storage location associated with the storage device connected to the security device (block 3605A). The security device provides access control for the storage device (block 3610A). One embodiment of the access control shown in block 3610A is illustrated by the method 3600B shown in FIG. 26.

According to the method 3600A, the security device maps the storage location in the transaction request according to the address mapping of the storage device (block 3615A). The security device provides the transaction request to the storage device (block 3620A). Under normal circumstances, the storage device will perform the requested transaction (block 3625A).

In various embodiments, the security device associated with the method 3600A may include a crypto processor or a block of logic configured to provide security for the storage device. The storage device may include an electronic storage medium like a memory or a magnetic or optical storage medium like a hard drive or an optical drive. The memory may include a RAM, a ROM, or a flash memory. The hard drive or optical drive may be fixed or removable. The transaction request may include, for example, a read request, a write request, or a combination of read and write requests.

It is noted that in various embodiments, the memory (or the storage device) may include further security hardware of its own. The further security hardware may include access logic, a random number generator, and a secret, such as is illustrated above in FIG. 7C or 7D.

Turning to FIG. 25B, the method 3600B includes the crypto-processor receiving a transaction request for a memory location associated with the memory connected to the crypto-processor (block 3605B). The crypto-processor provides access control for the memory (block 3610B). One embodiment of the access control shown in block 3610B is illustrated in FIG. 26.

According to the method 3600B, the crypto-processor maps the memory location in the transaction request according to the address mapping of the memory (block 3615B). The crypto-processor provides the transaction request to the memory (block 3620B). Under normal circumstances, the memory will perform the requested transaction (block 3625B).

Turning to FIG. 26, the method 3610A includes the security device determining if a lock is in place for the storage location (block 3705). A transaction request may have been received for the storage location. If the lock is not in place (block 3710), then the method 3610A moves past the authentication portion. If the lock is in place (block 3710), then the security device provides a challenge for the storage location (block 3715). The challenge may be associated with the storage location or with the storage device that includes the storage location. The challenge may be in response to the transaction request. Next, the security device receives a response to the challenge (block 3720). The security device evaluates the response by comparing the response to an expected response (block 3725). If the evaluation is not correct (block 3730), then the method ends.

If the evaluation is correct (block 3730), then the method proceeds with the security device providing the transaction request to the storage device (block 3735).

In various embodiments, the security device associated with the method 3610A may include a crypto processor or a block of logic configured to provide security for the storage device. The storage device may include an electronic storage medium like a memory or a magnetic or optical storage medium like a hard drive or an optical drive. The memory may include a RAM, a ROM, or a flash memory. The hard drive or optical drive may be fixed or removable. The transaction request may include, for example, a read request, a write request, or a combination of read and write requests.

Turning to FIG. 27, the method 3620 includes storing a secret in a storage device (block 3805). The storage device may include only a portion of a physical device. The storage device itself may be embodied as any storage device known in the art. The method 3620 may also include storing data in the storage device (block 3810) and storing code in the storage device (block 3815). The method 3620 may also include providing a lock (e.g. a lock bit or bits) to secure data stored in the storage device or the storage device itself (block 3815). Note that the above steps of method 3620 (blocks 3805–3820) may be performed relatively proximate in time, such as when the storage device is manufactured, installed, or initialized.

The method 3620 also includes reading the secret from the storage device (block 3825), such as, for example, when the computer system including the storage device or coupled to communicate with the storage device is booted. For the secret to remain secure, the reading of the secret preferably occurs when the storage device is in a secure or trusted configuration. The method 3620 may also read the code from the storage device (block 3830). The method 3620 stores the secret in a secure location (block 3825) and also may store the code in the secure location (block 3830). The secure location may be in the SMM memory space previously described, or in a secure memory, register, or other storage location in the computer system 100, such as in the processor 805 or in the south bridge 330.

In various embodiments, the storage device associated with the method 3620 may include an electronic storage medium like a memory or a magnetic or optical storage medium like a hard drive or an optical drive. The memory may include a RAM, a ROM, or a flash memory. The hard drive or optical drive may be fixed or removable. A read in method 3620 may describe any transaction request, such as, for example, a read request, a write request, or a combination of read and write requests.

Figure 28:
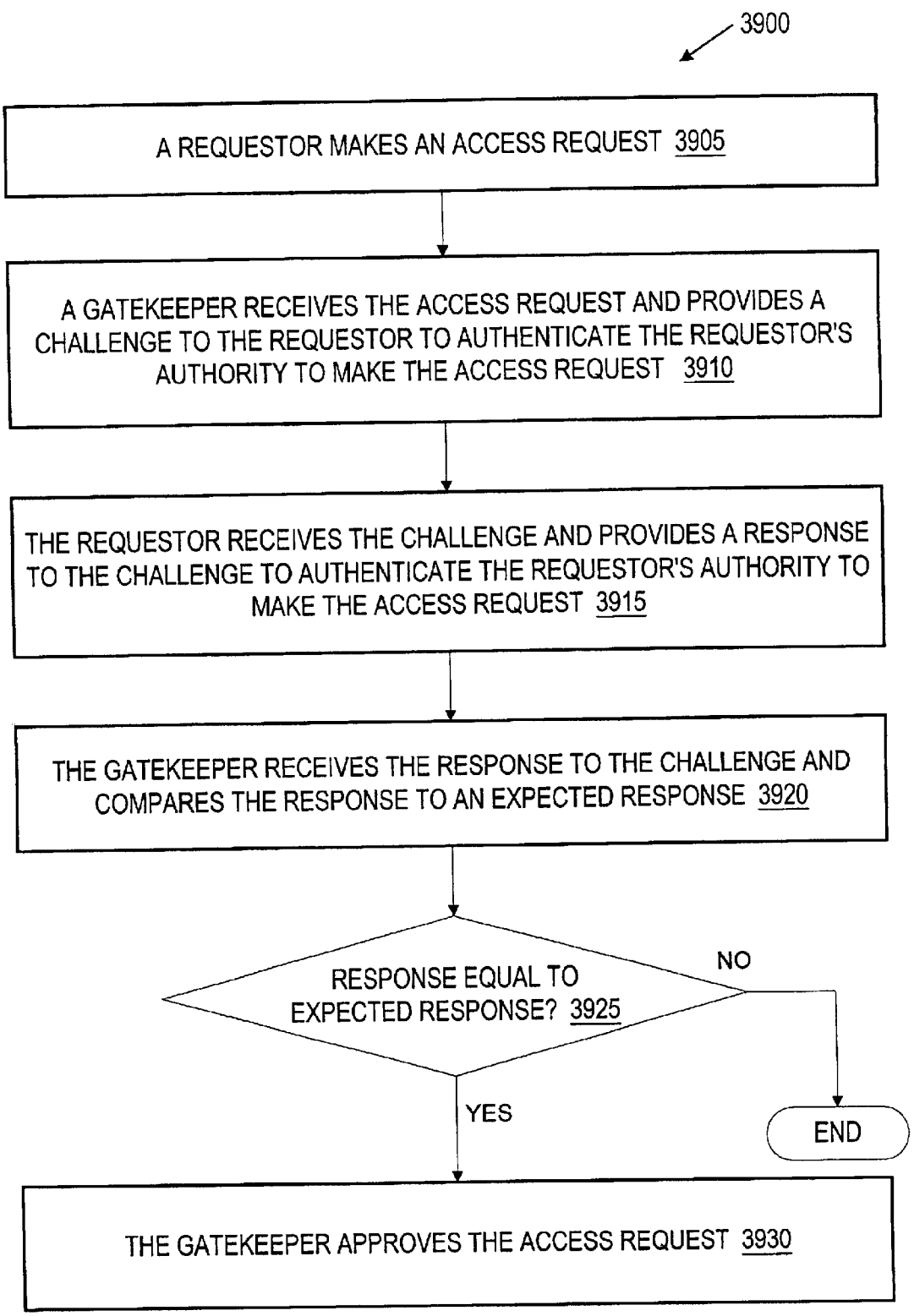
FIG. 28 illustrates a prior art challenge-response method for authentication.

FIG. 28 illustrates a prior art challenge-response method 3900 for authentication. The method has a requestor making an access request, in block 3905. In block 3910, a gatekeeper receives the access request and provides a challenge to the requestor to authenticate the requestor's authority to make the access request. In block 3915, the requestor receives the challenge and provides a response to the challenge to authenticate the requestor's authority to make the access request. In block 3920, the gatekeeper receives the response to the challenge and compares the response to an expected response.

In decision block 3925, the gatekeeper determines if the response is equal to the expected response. If the response is not equal to the expected response, in decision block 3925, then the method ends, preventing the requester from completing the access request. If the response is equal to the expected response, in decision block 3925, then the method continues with block 3930. In block 3930, the gatekeeper approves the access request. Typically, a sha1 hash, well known in the art, of the secret and a number known to both the gatekeeper and the requester is used to demonstrate knowledge of the secret.

Turning to FIGS. 29A, 29B, 29C, 29D, and 29E, an embodiment of computer subsystem 4000A, including a south bridge 330D and I/O devices, an embodiment of a processor 805E, an embodiment of a processor 805F, an embodiment of a computer subsystem 4000B, including a processor 805 and other system devices, and an embodiment of a computer system 4000C, including an embodiment of a processor 805 and various devices are shown, including Globally Unique IDentifiers (GUIDs) 4099 and/or a stored secret 4095 and/or a system GUID 4085.

Figure 29A:
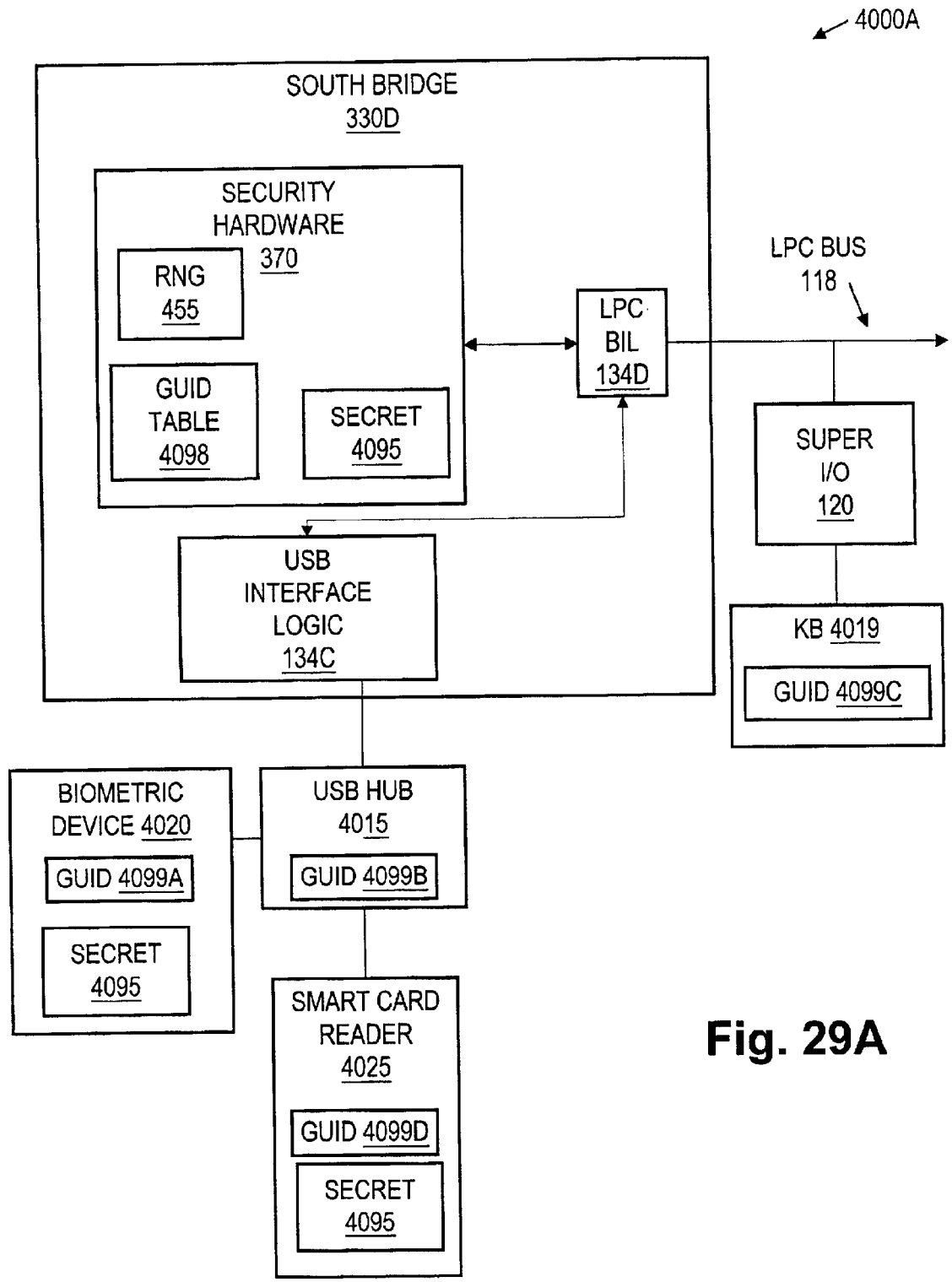
FIGS. 29A, 29B, 29C, 29D, and 29E illustrate embodiments of computer devices or subsystems including GUIDs and/or a stored secret and/or a system GUID, according to various aspects of the present invention.

In FIG. 29A, the south bridge 330D includes an embodiment of the security hardware 370 coupled to the LPC BIL 134D and the USB interface logic 134C. The embodiment of the security hardware 370 includes the random number generator (RNG) 455, a storage location storing a secret 4095, and storage locations for storing a GUID table 4098. The GUID table 4098 may include a GUID for the south bridge 330D itself. The south bridge 330D is coupled through the USB interface logic 134C to a USB hub 4015 including a GUID 4099B. Coupled to the USB hub 4015 are a biometric device 4020 and a smart card reader 4025. The biometric device 4020 includes the secret 4095 and a storage location for storing a GUID 4099A. The smart card reader 4025 includes the secret 4095 and a storage location for storing a GUID 4099D. Coupled through the LPC bus 118 to the LPC BIL 134D are the Super I/O chip 120 and a keyboard 4019, including a GUID 4099C.

Figure 29B:
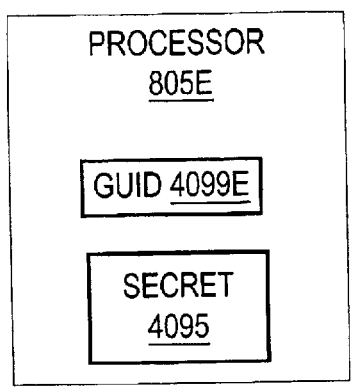
Figure 29C:
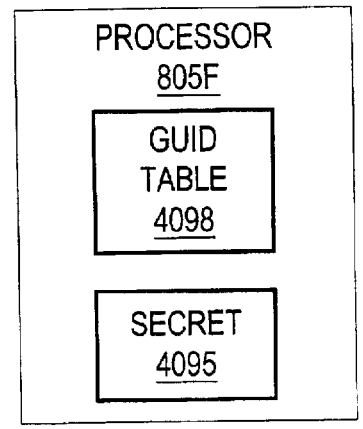

In FIG. 29B, the processor 805E includes a GUID 4099E. In FIG. 29C, the processor 805F includes the GUID table 4098, either in place of or in addition to the GUID table 4098 shown in the south bridge 330D, shown in FIG. 29A. The GUID table 4098 of the processor 805F may include a GUID for the processor 805F itself.

Figure 29D:
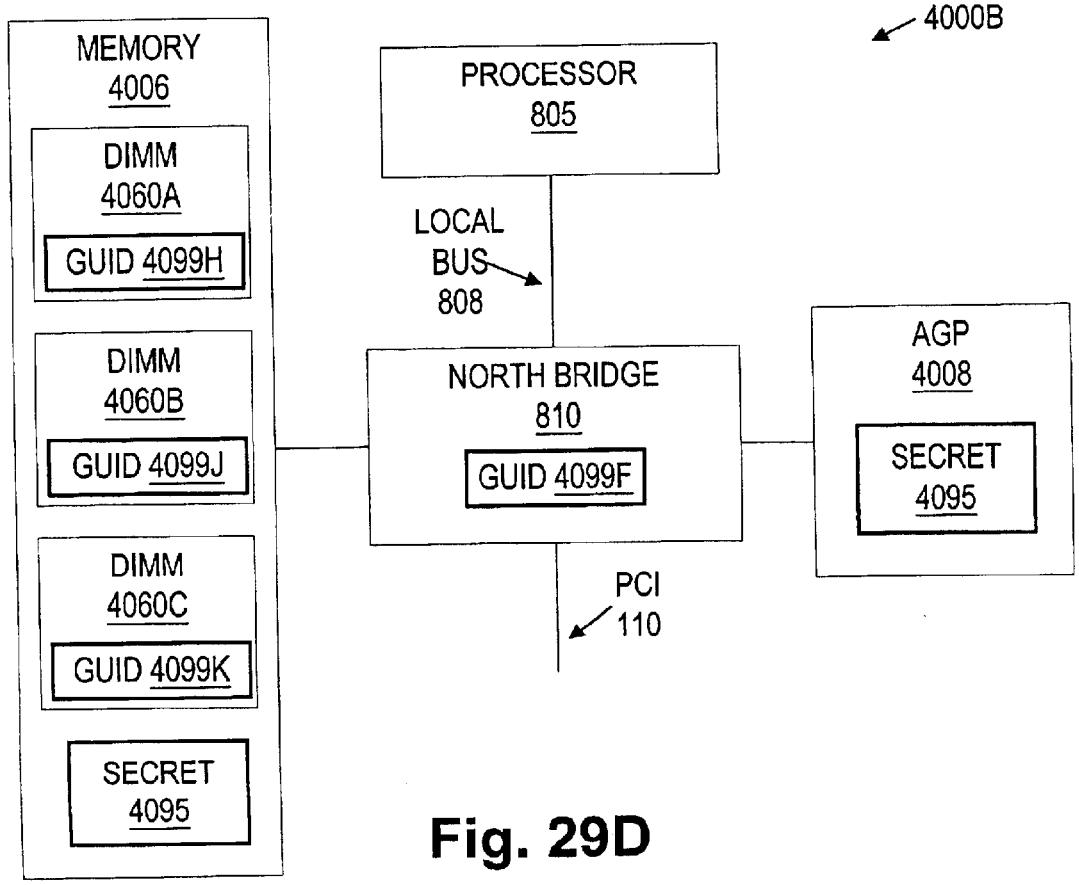

In FIG. 29D, the computer subsystem 4000B includes the processor 805, which may represent any of the embodiments of the processor 805, such as the processor 805E shown in FIG. 29B or the processor 805F shown in FIG. 29C, coupled to a north bridge 810 including a GUID 4099F through the local bus 808. The north bridge 810 is shown coupled to an AGP device 4008 including a secret 4095 (could also include a GUID 4099G) and a memory 4006 including a plurality of memory modules, shown as DIMMs (dual In-line Memory Modules) 4060A–4060C. Each of the DIMMs 4060A–4060C includes a GUID 4099H–4099K, respectively. In alternative embodiments, the GUIDs 4099 may be replaced by a storage location to store the secret 4095 (such as shown the AGP 4008 and as in FIG. 29A) or augmented by the storage location to store the secret 4095 and the GUID 4099. Note that the computer system 4000A and 4000B may connect between the north bridge 810 and the south bridge 330D.

According to one embodiment of the present invention, at boot time or during some other trusted set-up, the south bridge 330D and/or the processor 805F or other master device transmits the secret 4095 to each of the devices coupled to the master device capable of storing the secret 4095. Thus, in the illustrated embodiment of FIG. 29A, the USB hub 4015, the biometric device 4020, and the smart card reader 4025 would each store the secret 4095. In other words, during the trusted set-up, the device or devices become known to the master device through an authentication routine, and the master device communicates the secret 4095 to those devices that authenticate properly as a trusted component of the computer subsystem 4000 or some part of the computer system. During data requests or transfers, the master device transmits a random number (or at least a nonce, a number that is used only once) to the device along with the data request. The device may encrypt the data using the random number (or the nonce) and the secret before transmitting the data to the master device. Whether or not the data is encrypted, the device returns the random number (or the nonce) with the data as an authenticator of the data.

As an example of this embodiment, consider the biometric device 4020 of FIG. 29A as a fingerprint scanner 4020. Placing a finger on the fingerprint scanner 4020 may cause the fingerprint scanner 4020 to send an interrupt to the system. The fingerprint scanner 4020 scans the fingerprint of the finger on the fingerprint scanner 4020 to create fingerprint data. The system notifies the south bridge 330D, which sends the nonce to the fingerprint scanner 4020. The fingerprint scanner 4020 receives the nonce and returns the fingerprint data and the nonce to the south bridge 330D in response to receiving the nonce. The fingerprint scanner 4020 may also encrypt the fingerprint data using the nonce in lieu of sending the fingerprint data in the clear (i.e. not encrypted).

According to another embodiment of the present invention, at boot time or during some other trusted set-up, the south bridge 330D and/or the processor 805F or other master device reads the GUIDs from each device coupled to the south bridge 330D (i.e. the master device) capable of storing or actually storing a GUID 4099. Thus, in the illustrated embodiment of FIG. 29A, the USB hub 4015, the biometric device 4020, the smart card reader 4025, and the keyboard 4019 each have GUIDs 4099B, 4099A, 4099D, and 4099C, respectively. The south bridge 330D stores the GUIDs for each device in the GUID table 4098. In other words, during the trusted set-up, the device or devices become known to the south bridge 330D through an authentication routine, and the devices communicate their respective GUIDs 4099 to the south bridge 330D that authenticates them as a trusted component of the computer subsystem 4000 or some part of the computer system.

During data requests or transfers, the south bridge 330D or other master device (e.g. the processor 805E or 805F) transmits a random number (or at least a nonce) to the device along with the data request. The device may encrypt the data using the random number (or the nonce) and the GUID before transmitting the data to the south bridge 330D. Whether or not the data is encrypted, the device returns the random number (or the nonce) with the data as an authenticator of the data.

As an example of this embodiment, consider a request from the system (e.g. the master device) to the keyboard 4019 for data. The system may request the keyboard 4019 to submit the GUID 4099C with the data. The GUID 4099C in this case may be combined with the data using a hash function (i.e. a one way function well known in the art). The data are transmitted from the keyboard 4019 to the system along with the GUID 4099C. The master device, such as the security hardware 370 (alternatively the crypto-processor 305, such as shown in FIG. 4) authenticates the data.

In another embodiment of the present invention, one or more devices (such as 4035 shown in FIG. 29E) include both the GUID 4099 and the storage location for the secret 4095. In this embodiment, the system master, e.g. the south bridge 330D, and the devices 4120 use the GUID 4099, the secret 4095, or both to authenticate data transmissions.

It is noted that other I/O buses besides the USB 116 and the LPC bus 118 may be used in various embodiments of the present invention. For example, a hard drive (not shown) including a GUID 4099 and/or storage locations for the secret 4095 may be coupled to the IDE interface 114 (shown in FIG. 1A). In another example, the biometric device 4020 may couple to the computer subsystem 4000 through the PCI bus 110 or a serial port or a parallel port, such as through the Super I/O chip 120. Other I/O buses and connections are contemplated.

As currently implemented by some manufacturers, using 128 bits for the QUID 4099, up to $10^{36}$ possible values are available for any GUID 4099. The sheer number of possible values allows for a device without a QUID 4099 to be assigned a random GUID 4099 with a very low possibility of duplication. The use of the random number or the nonce may prevent a replay attack using a device, such as the biometric device 4020. Note that devices without GUIDs 4099 established during manufacturing may create a random GUID 4099, either for each boot or reset or for each data transmission.

It is contemplated that, for example, a part of the memory, such as a memory controller (e.g. see memory 4006 in FIG. 29D) could include a GUID table 4098 and be the master device for the memory modules, such as DIMMs 4060A–4060C. The memory controller could register the GUIDs 4099 for the DIMMs 4060. The memory controller could then give its own GUID 4099 to another master device (e.g. north bridge 810 or processor 805). In this way, transmissions between and among system devices could be registered as being from known devices. Other subsystem master device arrangements are also contemplated, such as the north bridge 810 and the south bridge 330D as local masters, with the processor 805 being the system master. Additional master devices could include the USB hub 4015 for the other USB devices and a drive controller for its attached storage drives (e.g. hard drives or-optical drives).

Figure 29E:
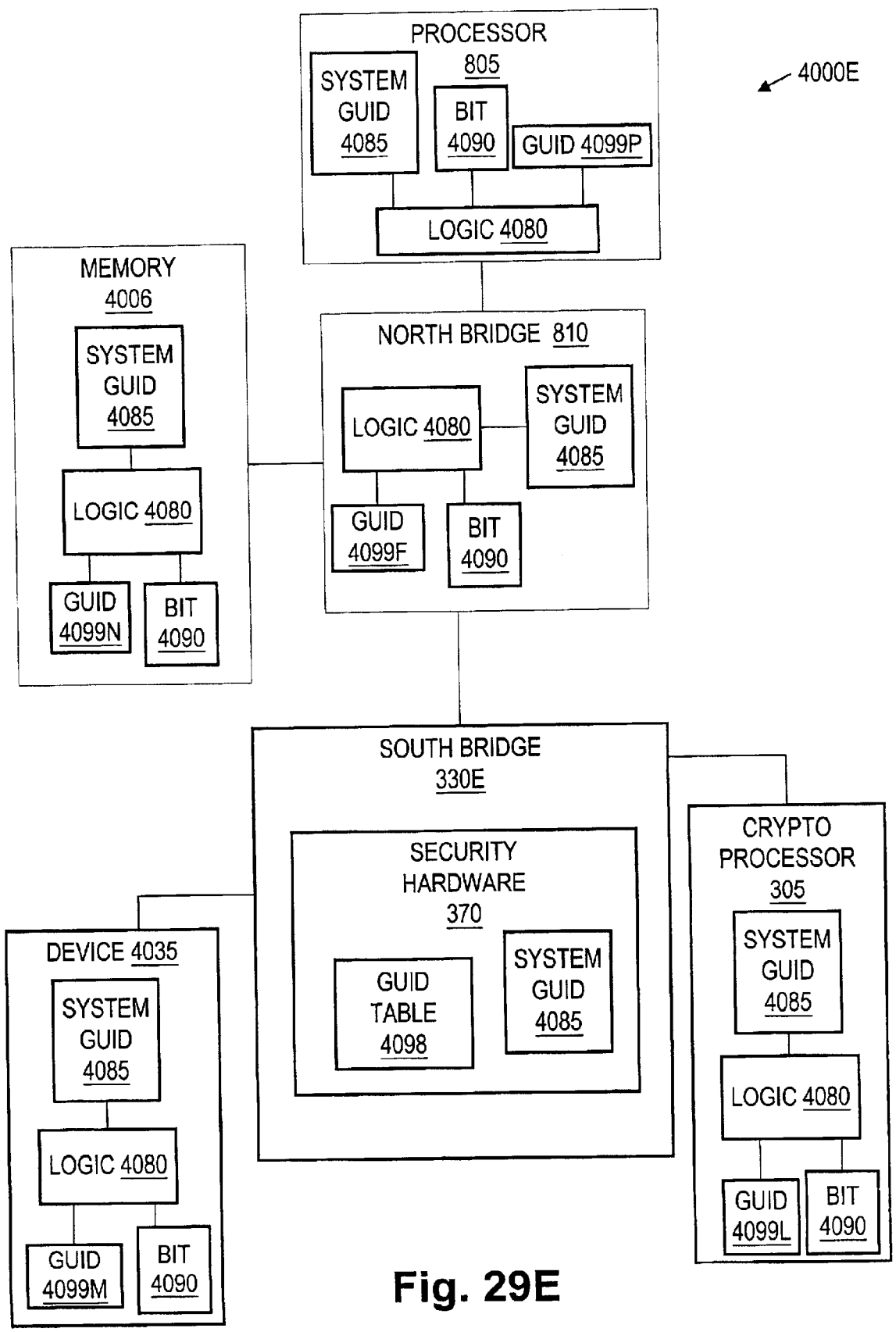

Turning now to FIG. 29E, an embodiment of the computer system 4000C is illustrated with a further embodiment of system components that are recognized by the computer system. As shown, an embodiment of the processor 805 is coupled to an embodiment of the north bridge 810. A memory subsystem 4006 and an embodiment of a south bridge 330E are also coupled to the north bridge 810. A generic device 4035 and an embodiment of the crypto-processor 305 are coupled to the south bridge 330E. The south bridge 330E includes security hardware 370, including a storage location for a system GUID 4085 and the GUID table 4098 described above. In the illustrated embodiment of the computer system 4000C, each of the processor 805, memory 4006, the north bridge 810, the device 4035, and the crypto-processor 305 includes logic 4080, a storage location for the system GUID 4085, a storage location for an introduced bit 4090, and a respective GUID 4099, such as GUIDs 4099P, 4099F, 4099M, or 4099L. Note that the logic 4080 of FIG. 29E may be implied in FIGS. 29A–29D.

In one embodiment, upon first being placed in the computer system 4000C, a system master introduces each device 4035 to the computer system 4000C. For the purposes of this aspect of the present invention, a "device" may be any component or subsystem or master device that may be a part of the computer system 4000C. Examples include the processor 805, the north bridge 810, the memory controller 4006 or memory modules (not shown), the south bridge 330, USB devices (shown elsewhere), other I/O devices, and the crypto-processor 305. For the purposes of this discussion, reference will be made to device 4035, but device 4035 is intended to be generic. In particular, the device 4035 may be removable from the computer system 4000C and normally usable in another computer system (not shown) other than computer system 4000C, including data drives and I/O devices. The system master shown in FIG. 29E is the south bridge 330E. The processor 805 may alternatively be the system master. A logic circuit (not shown) on or a part of a motherboard (not shown) for the computer system 4000C, or on a daughter card (not shown), may also be the system master.

As each device 4035, 805, 4006, 330E, 305, etc. is introduced to the computer system 4000C, the system master provides the system GUID 4085 to the device 4035. The device 4035 stores the system GUID 4085. The device 4035 provides the system master with its GUID 4099M and the system master stores the GUID 4085M of the device in the GUID table 4098. Upon exchanging GUIDs, the device 4035 sets the introduced bit 4090. While the introduced bit 4090 is set, the device 4035 is "married" to the computer system 4000C and will only exchange data with the computer system 4000C. The device 4035 and the computer system 4000C may also "divorce by mutual consent" by authenticating their respective GUIDs and having the device 4035 reset the introduced bit.

Each data transfer in the computer system 4000C may involve the exchange of the GUID 4099 and/or the system GUID 4085. A failure to authenticate the system GUID 4085 results in the device 4035 not responding with the requested data or simply not responding to the data request. Should the device 4035 request data from another device in the computer system 4000C without providing or authenticating its own GUID 4099M, the computer system 4000C will not respond with the requested data or simply does not respond to the data request from the device 4035.

To prevent complete loss of data or use of the device 4035 and the computer system 4000C, a maintenance mode or "divorce court" may be available to force the introduced bit 4090 to be reset. For example, a manufacturer may place a master ID value in each of a batch of components to allow for a repair facility to reset the introduced bit 4090.

In various embodiments, the logic 4080 may be configured to provide requested data using a hash function on the GUID 4099M and either a nonce, a random number, or the requested data. For example, the processor 805 may request data from the memory 4006. The processor 805 may provide a random number and the result of a hash of the random number and either the GUID 4099N for the memory 4006 or the system GUID 4085. The memory 1406 compares the result of the hash from the processor 805 with its own calculation of the hash value before responding to the data request from the processor 805.

In another embodiment, the device 4035 (as well as other system devices) does not store the system GUID 4085. In this embodiment, the device 4035 only responds to a data transaction when its GUID 4099M is provided with the data transaction. To initiate a data transaction, the device 4035 demonstrates its own GUID 4085 to the system master 330E, which authenticates the device 4035 as being introduced to the computer system 4000C and thus trusted. Note that the secret 4095 may be substituted for the system GUID 4085 and used in place of the respective GUIDs 4099. Note also that the device 4035 may be used in other computer systems other than computer system 4000C so long as the device 4035 has not been introduced to the computer system 4000C. After the device 4035 has been introduced to the computer system 4000C and the introduced bit 4090 has been set, the device is only usable in the computer system 4000C until the introduced bit 4090 has been reset. Note that the introduced bit 4090 is preferably stored in non-volatile memory.

Figure 30A:
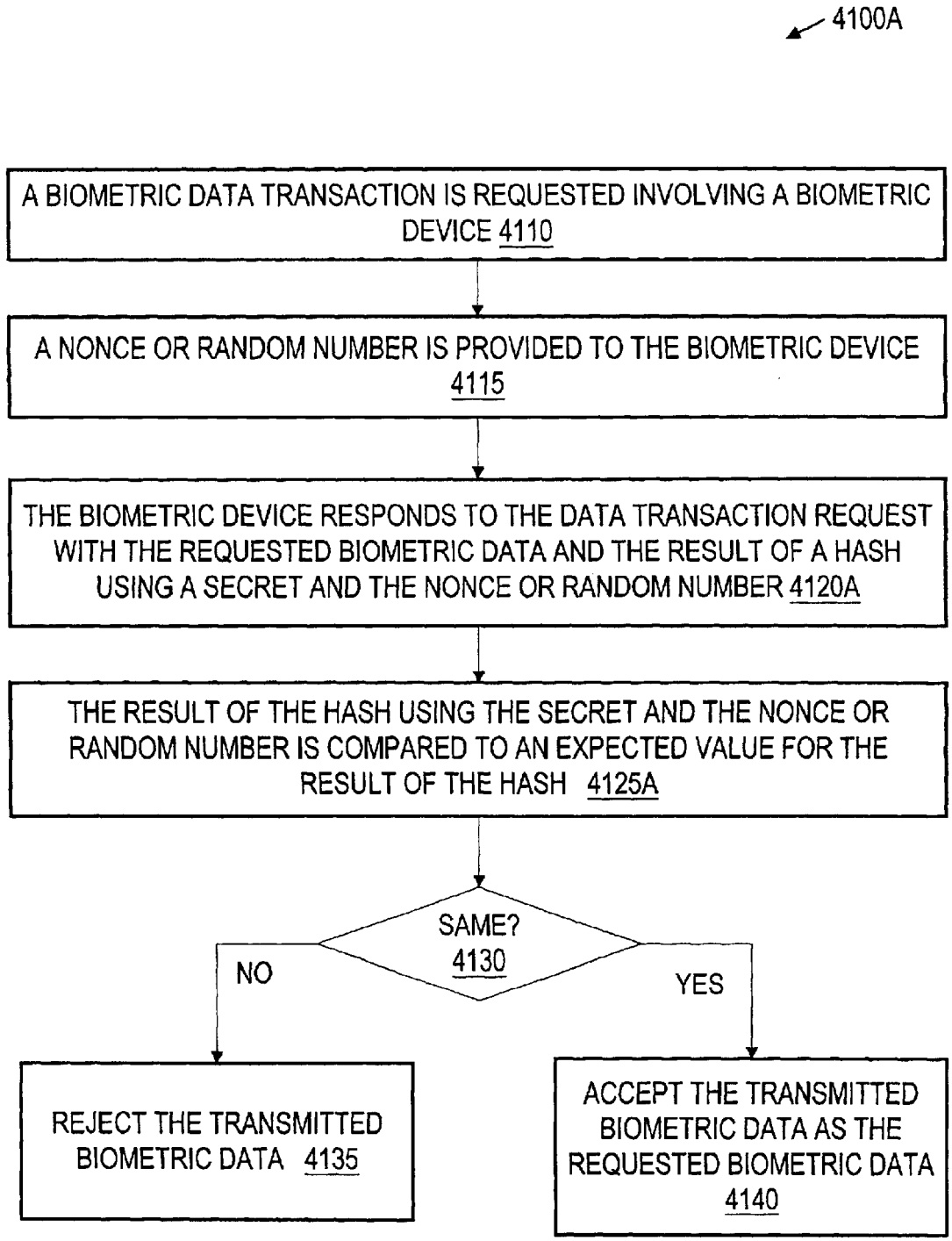
FIGS. 30A and 30B illustrate flowcharts of embodiments of methods for operating a computer system including a biometric device, such as the biometric device shown in FIG. 29A, according to various aspects of the present invention.
Figure 30B:
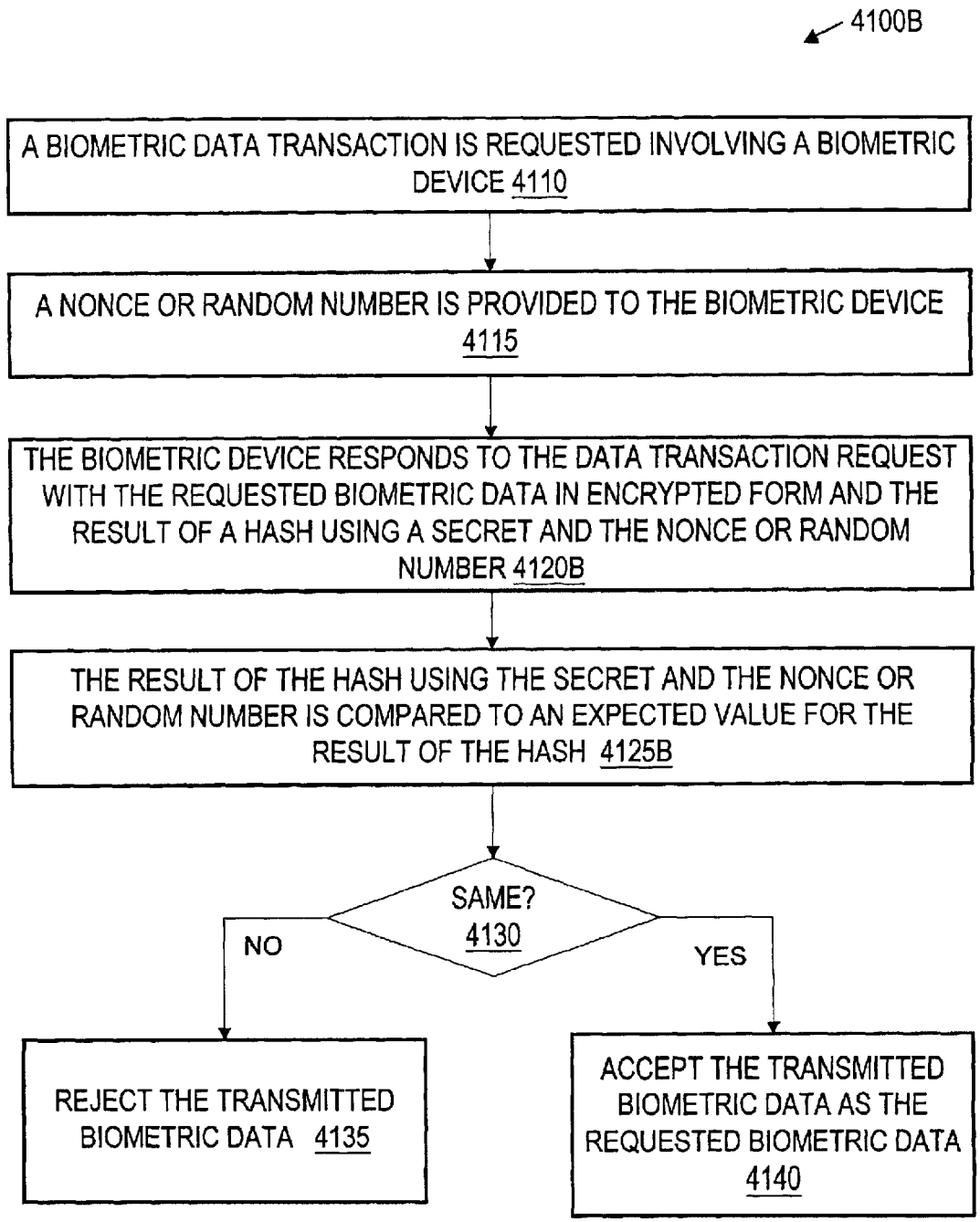

Turning now to FIGS. 30A and 30B, flowcharts of embodiments of methods 4100A and 4100B for operating a computer system including a biometric device, such as the biometric device 4020 shown in FIG. 29A. In FIG. 30A, the method 4100A includes the biometric data being sent in the clear along with the result of a hash program using a secret and a nonce or random number. In FIG. 30B, the method 3100B includes the biometric data being sent in encrypted form and an indication of the nonce or random number is sent as the result of the hash using the secret and the nonce or random number. The nonce or random number may be sent in the clear in all or only some of transmissions in the data transaction. Note that the secret may be an individual secret, such as a GUID of a device, or a group secret, such as a system GUID, a sub-system GUID, or both the individual secret and the group secret. The secret may be programmed at manufacture, established at boot time, or a random number picked during a trusted set-up, or a combination thereof.

In FIG. 30A, the method 4100A includes a biometric data transaction being requested involving a biometric device, in step 4110. A nonce or random number is provided to the biometric device, in step 4115. The biometric device responds to the biometric data transaction request with the requested biometric data and the result of the hash function using the secret and the nonce or random number, in step 4120A. The result of the hash function is compared to an expected value for the hash function, in step 4125A. If the result of the hash function is not the same as the expected value, in the decision block 4130, then the transmitted biometric data are rejected, in step 4135. If the result of the hash function is the same as the expected value, in the decision block 4130, then the transmitted biometric data are accepted as the requested biometric data, in step 4140.

In FIG. 30B, the method 4100B includes a biometric data transaction being requested involving a biometric device, in step 4110. A nonce or random number is provided to the biometric device, in step 4115. The biometric device responds to the biometric data transaction request with the requested biometric data in encrypted form and the result of the hash using a secret and the nonce or random number, in step 4120B. The result of the hash is compared to an expected value for the hash of the secret and the nonce or random number, in step 4125B. If the result of the hash for is not the same as the expected value for the result of the hash, in the decision block 4130, then the transmitted biometric data are rejected, in step 4135. If the result of the hash is the same as the expected value for the result of the hash, in the decision block 4130, then the transmitted biometric data in encrypted form are accepted as the requested biometric data, in step 4140.

Another embodiment of the method 4100 includes providing a nonce or random number, receiving biometric data, transmitting the biometric data and the nonce or random number or the random number, and authenticating the biometric data using the nonce or random number. In still another embodiment, the method 4100 may further include encrypting the biometric data, receiving the encrypted biometric data and the nonce or random number, and decrypting the encrypted biometric data. This embodiment may only transmit the encrypted biometric data and the nonce or random number. In still another embodiment, the method 4100 may include encrypting the biometric data using the nonce or random number and decrypting the encrypted biometric data using the nonce or random number.

The method 4100 may also include receiving a secret, storing the secret, transmitting at least an indication of the secret with the biometric data, receiving at least the indication of the secret, and authenticating the biometric data using at least the indication of the secret. In a further embodiment, the method 4100 may include encrypting the biometric data using the secret, and decrypting the encrypted biometric data using the secret. In still another embodiment, the method 4100 may include encrypting the biometric data using the secret and the nonce or random number, and decrypting the encrypted biometric data using the secret and the nonce or random number. In one embodiment, the secret may include a system GUID. The method 4100 may also include providing a GUID, encrypting the biometric data using the GUID, the secret, and the nonce or random number, and decrypting the encrypted biometric data using the GUID, the secret, and the nonce or random number.

It is noted that in various embodiments, receiving the biometric data may occur in response to providing the nonce or random number. In other embodiments, receiving the biometric data may occur only in response to providing the nonce or random number. Various steps of various embodiments of the method may be performed by different entities, including, but not limited to, the biometric device, the master device, and the system master.

Figure 31A:
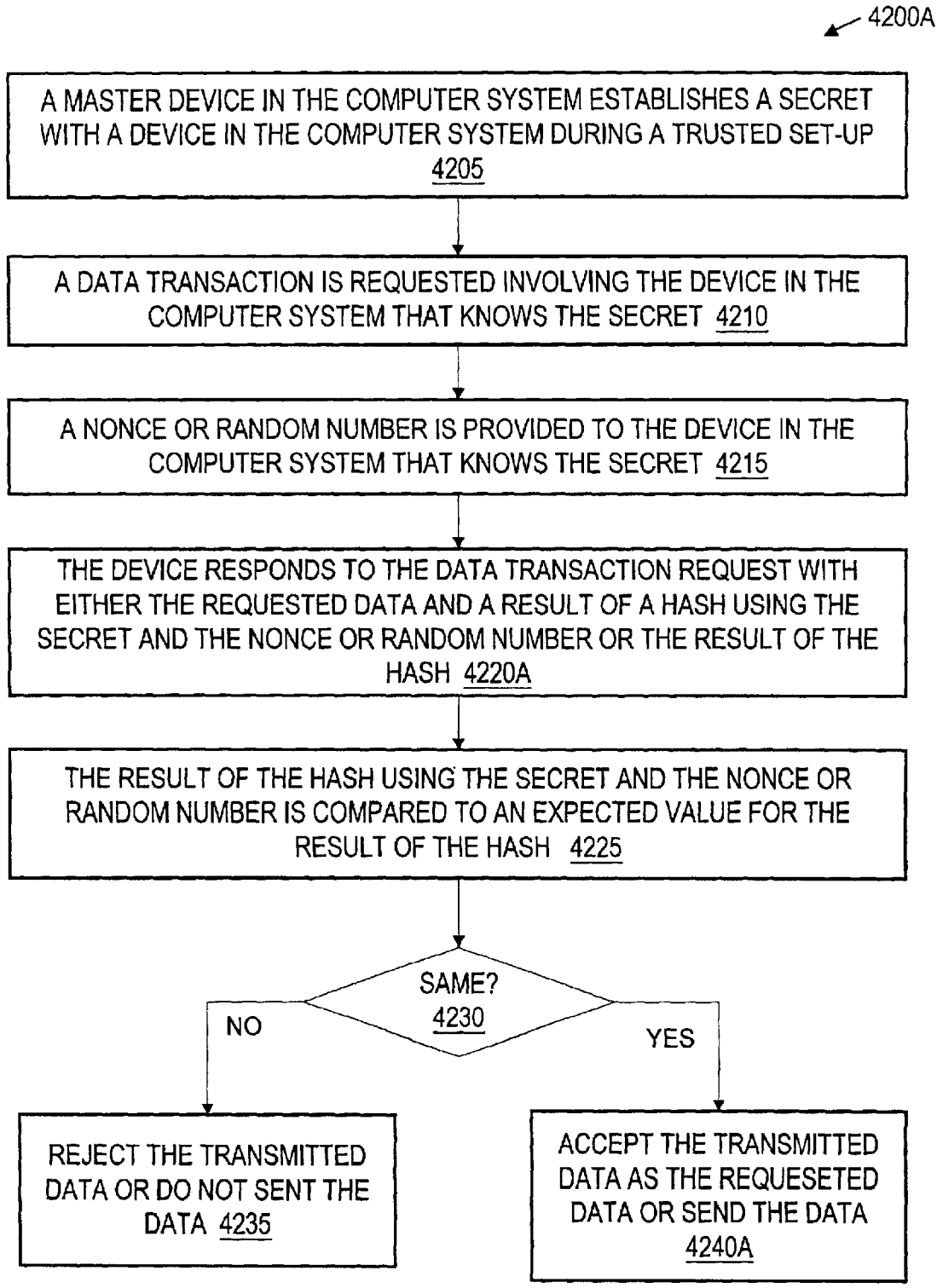
FIGS. 31A, 31B, 32A, 32B, 32C, and 33 illustrate flowcharts of embodiments of methods for authenticating a device in a computer system, such as computer systems including the computer subsystems of FIGS. 29A, 29D, and 29E, according to various aspects of the present invention.
Figure 31B:
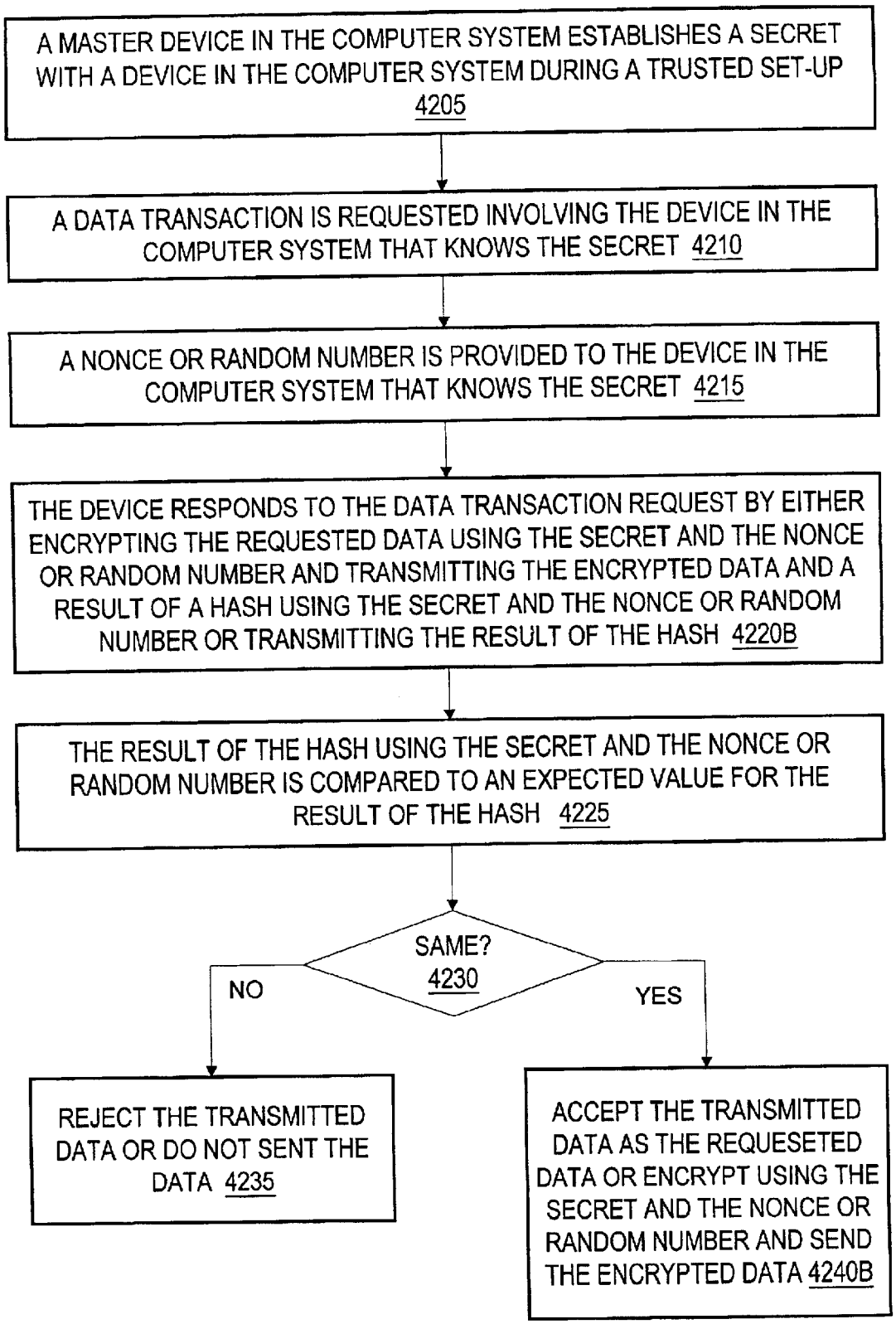
Figure 32A:
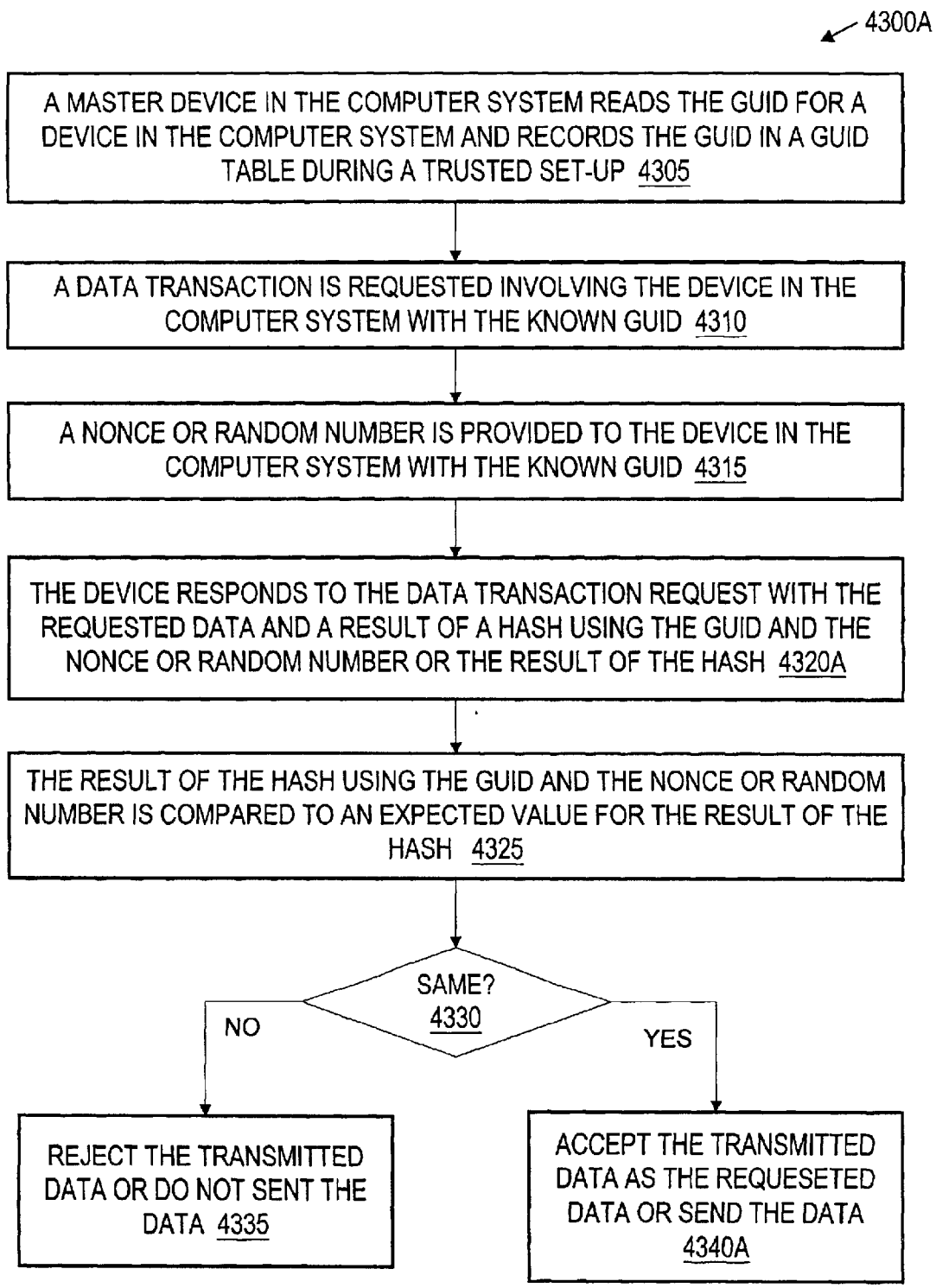
Figure 32B:
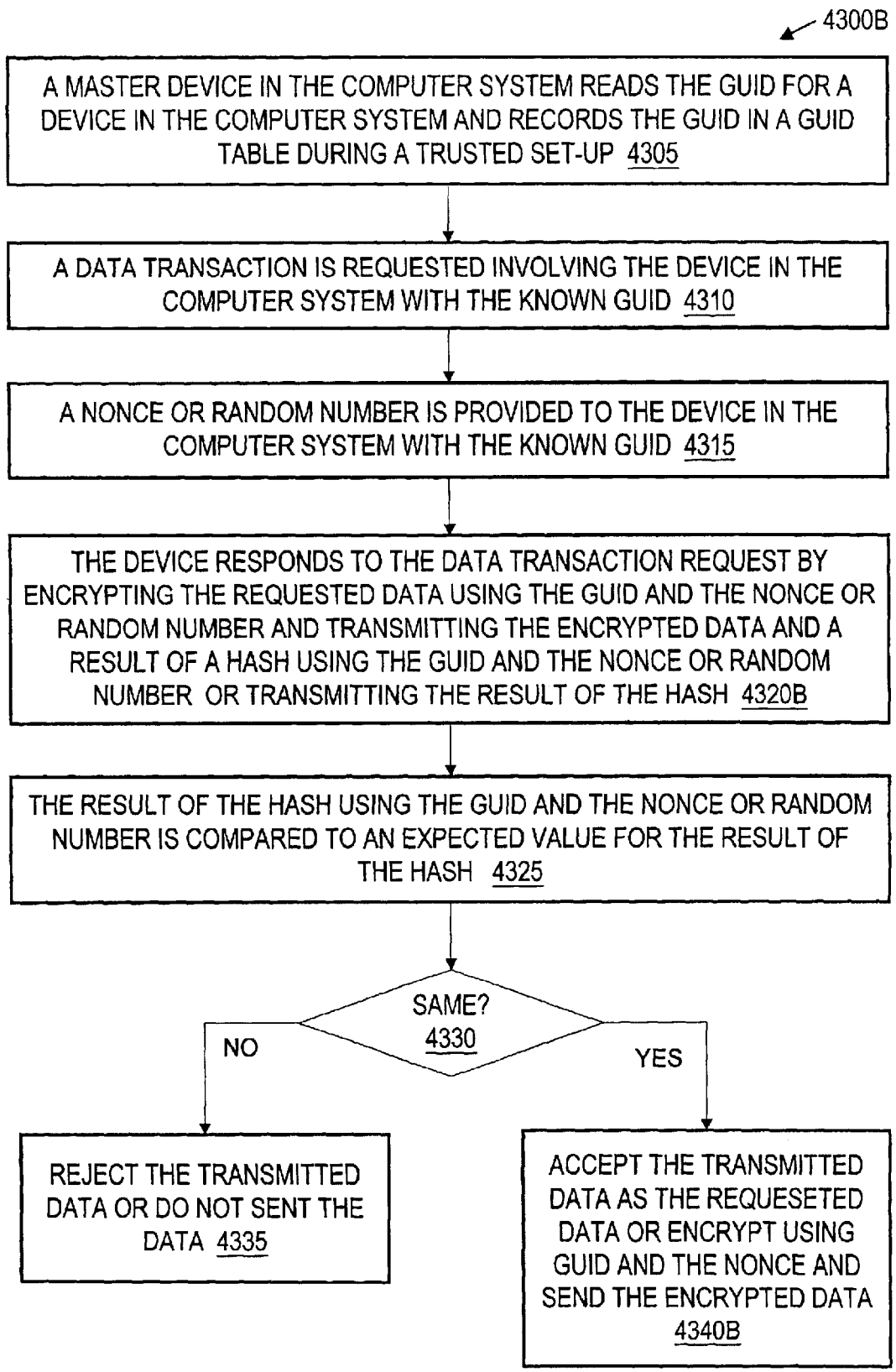
Figure 32C:
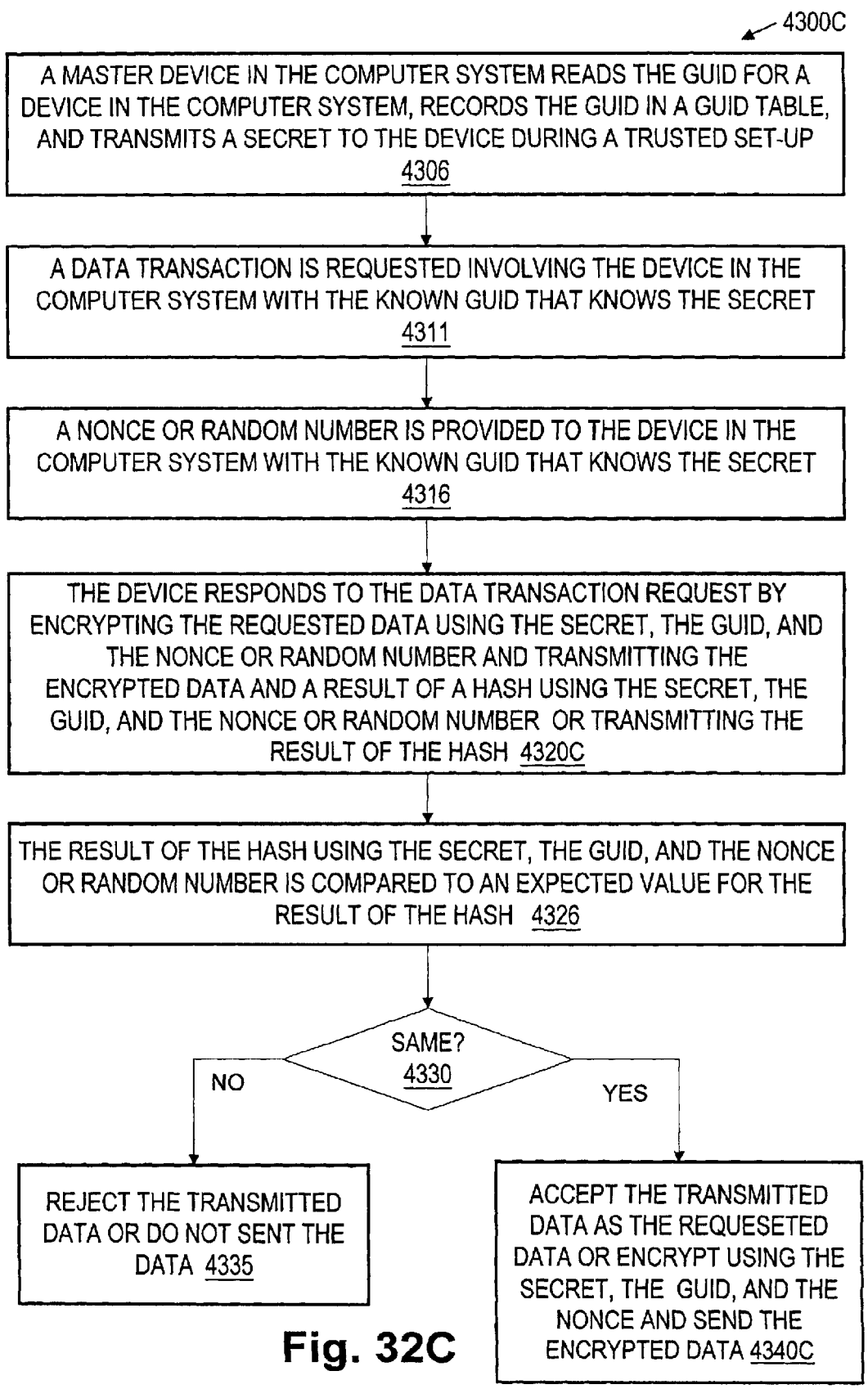
Figure 33:
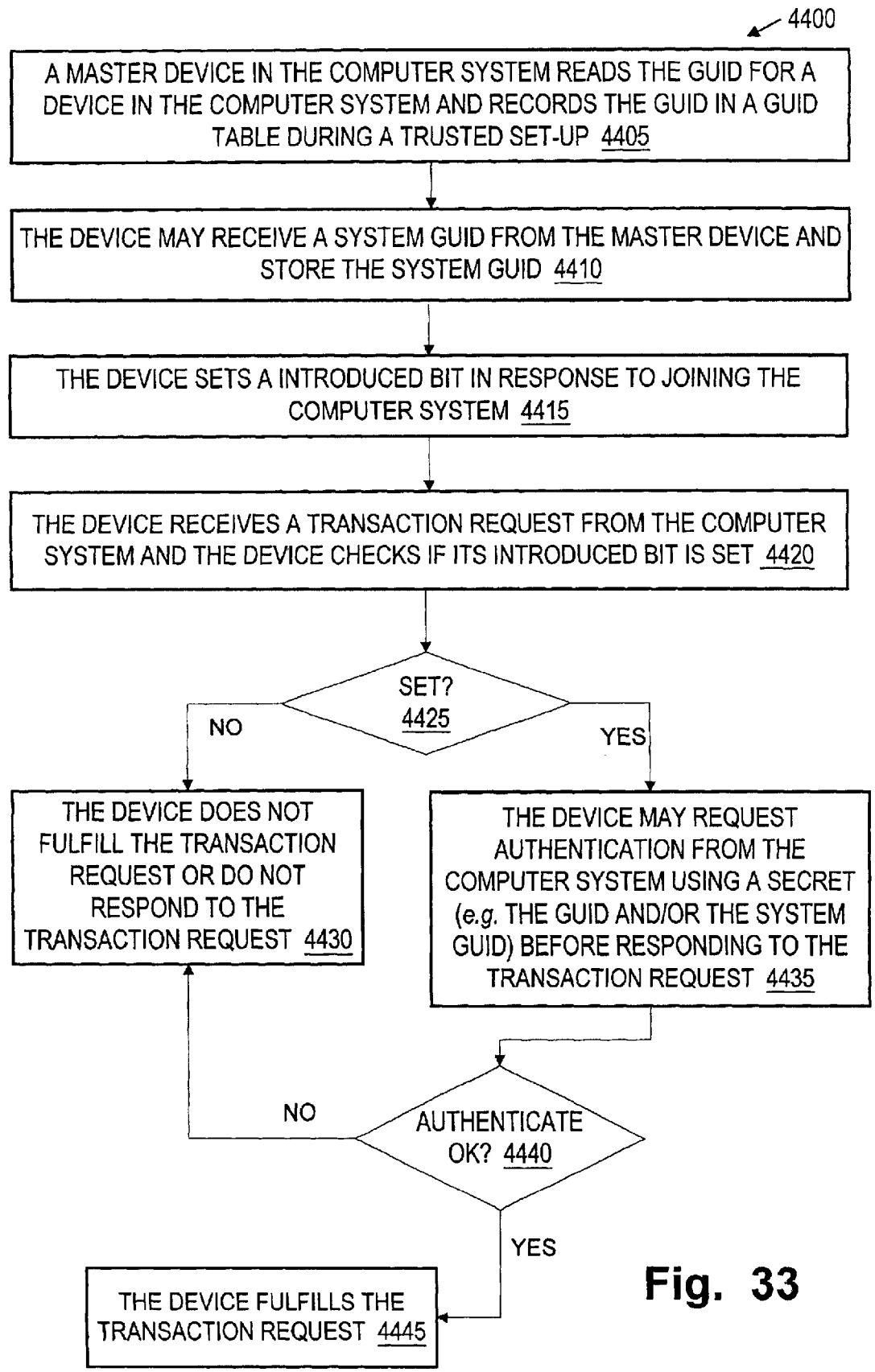

Turning now to FIGS. 31A, 31B, 32A, 32B, 32C, and 33, flowcharts of embodiments of methods 4200A, 4200B, 4300A, 4300B, 4300C, and 4400 for authenticating a device in a computer system, such as computer systems including computer subsystems 4000A, 4200B, and 4000C of FIGS. 29A, 29D, and 29E, are illustrated. In the method of FIG. 31A, a secret is passed in encrypted form for authentication, but the data are transmitted in the clear. In the method of FIG. 31B, the secret and data are both passed in encrypted form. In the method of FIG. 32A, a device GUID is passed in encrypted form for authentication, but the data are transmitted in the clear. In the method of FIG. 32B, the device GUID and data are both passed in encrypted form. In the method of FIG. 32C, the secret, the device GUID, and the data are passed in encrypted form. In the method of FIG. 33, the device and the computer system are authenticated to each other as the device is united to the computer system using the introduced bit 4090 shown in FIG. 29E.

In the method 4200A of FIG. 31A, a master device in the computer system transmits a secret to a device in the computer system during a trusted set-up, in block 4205. As noted elsewhere, the trusted set-up may occur, as examples, when the device is first introduced to iii the computer system or during a boot sequence of the computer system. A data transaction is requested involving the device in the computer system that knows the secret, in block 4210. It is contemplated that one or more or all of the devices in the computer system will follow the method 4200A and know the secret. A nonce or random number is provided to the device in the computer system that knows the secret, in block 4215.

If the data transaction request is a read of data from the device, in block 4220A, the device responds to the data transaction request with the requested data and a result of a hash using the secret and the nonce or random number. If the data transaction request is a write of data to or through the device, in block 4220A, the device responds to the data transaction request with the result of the hash using the secret and the nonce or random number. Thus, in block 4220A, the device responds to the data transaction request and verifies its authorization to complete the data transaction request.

The method 4200A continues with the result of the hash using the secret and the nonce or random number being compared to an expected value for the result of the hash using the secret and the nonce or random number, in block 4225. If the comparison results are not the same, in decision block 4230, then the method continues by rejecting the transmitted data from the read or by not sending the data for the write, in block 4235. If the comparison results are the same, in decision block 4230, then the method continues by accepting the transmitted data from the read or by sending the data for the write, in block 4240A.

In the method 4200B of FIG. 31B, a master device in the computer system transmits a secret to a device in the computer system during a trusted set-up, in block 4205. A data transaction is requested involving the device in the computer system that knows the secret, in block 4210. It is contemplated that one or more or all of the devices in the computer system will follow the method 4200B and know the secret. A nonce or random number is provided to the device in the computer system that knows the secret, in block 4215.

If the data transaction request is a read of data from the device, in block 4220B, the device responds to the data transaction request by encrypting the requested data using the secret and the nonce or random number and a result of a hash using the secret and the nonce or random number. If the data transaction request is a write of data to or through the device, in block 4220B, the device responds to the data transaction request with the result of the hash using the secret and the nonce or random number. Thus, in block 4220B, the device responds to the data transaction request and verifies its authorization to complete the data transaction request.

The method 4200B continues with the result of the hash using the secret and the nonce or random number being compared to an expected value for the result of the hash using the secret and the nonce or random number, in block 4225. If the comparison results are not the same, in decision block 4230, then the method continues by rejecting the transmitted data from the read or by not sending the data for the write, in block 4235. If the comparison results are the same, in decision block 4230, then the method continues by accepting the transmitted data from the read or by encrypting the data using the secret and the nonce or random number and sending the encrypted data for the write, in block 4240B.

In the method 4300A of FIG. 32A, a master device in the computer system reads the GUID for a device in the computer system during a trusted set-up, in block 4305. A data transaction is requested involving the device in the computer system with the known GUID, in block 4310. It is contemplated that one or more or all of the devices in the computer system will follow the method 4300A and have their GUIDs known to the computer system. A nonce or random number is provided to the device in the computer system with the known GUID, in block 4315.

If the data transaction request is a read of data from the device, in block 4320A, the device responds to the data transaction request with the requested data and a result of a hash using the GUID and the nonce or random number. If the data transaction request is a write of data to or through the device, in block 4320A, the device responds to the data transaction request with the result of the hash using the GUID and the nonce or random number. Thus, in block 4320A, the device responds to the data transaction request and verifies its identity and authorization to complete the data transaction request.

The method 4300A continues with the result of the hash using the GUID and the nonce or random number being compared to an expected value for the result of the hash using the GUID and the nonce or random number, in block 4325. If the comparison results are not the same, in decision block 4330, then the method continues by rejecting the transmitted data from the read or by not sending the data for the write, in block 4335. If the comparison results are the same, in decision block 4330, then the method continues by accepting the transmitted data from the read or by sending the data for the write, in block 4340A.

In the method 4300B of FIG. 32B, a master device in the computer system reads the GUID for a device in the computer system during a trusted set-up, in block 4305. A data transaction is requested involving the device in the computer system with the known GUID, in block 4310. It is contemplated that one, more than one, or all of the devices in the computer system will follow the method 4300B and have their GUIDs known to the computer system. A nonce or random number is provided to the device in the computer system with the known GUID, in block 4315.

If the data transaction request is a read of data from the device, in block 4320B, the device responds to the data transaction request by encrypting the requested data using the GUID and the nonce or random number and a result of a hash using the GUID and the nonce or random number. If the data transaction request is a write of data to or through the device, in block 4320B, the device responds to the data transaction request with the result of the hash using the GUID and the nonce or random number. Thus, in block 4320B, the device responds to the data transaction request and verifies its identity and authorization to complete the data transaction request.

The method 4300B continues with the result of the hash using the GUID and the nonce or random number being compared to an expected value for the result of the hash using the GUID and the nonce or random number, in block 4325. If the comparison results are not the same, in decision block 4330, then the method 4300B continues by rejecting the transmitted data from the read or by not sending the data for the write, in block 4335. If the comparison results are the same, in decision block 4330, then the method 4300B continues by accepting the transmitted data from the read or by encrypting the data using the GUID and the nonce or random number and sending the encrypted data for the write, in block 4340B.

In the method 4300C of FIG. 32C, a master device in the computer system reads the GUID for a device in the computer system and transmits a secret to the device during a trusted set-up, in block 4306. A data transaction is requested involving the device in the computer system with the known GUID that knows the secret, in block 4311. It is contemplated that one or more or all of the devices in the computer system will follow the method 4300C and have their GUIDs known to the computer system and know the secret. A nonce or random number is provided to the device in the computer system with the known GUID that knows the secret, in block 4316.

If the data transaction request is a read of data from the device, in block 4320C, the device responds to the data transaction request by encrypting the requested data using the secret, the GUID, and the nonce or random number and a result of a hash using the secret, the GUID, and the nonce or random number. If the data transaction request is a write of data to or through the device, in block 4320C, the device responds to the data transaction request with the result of the hash using the secret, the GUID, and the nonce or random number. Thus, in block 4320C, the device responds to the data transaction request and verifies its identity and authorization to complete the data transaction request.

The method 4300C continues with the result of the hash using the secret, the GUID, and the nonce or random number being compared to an expected value for the result of the hash using the secret, the GUID, and the nonce or random number, in block 4326. If the comparison results are not the same, in decision block 4330, then the method 4300C continues by rejecting the transmitted data from the read or by not sending the data for the write, in block 4335. If the comparison results are the same, in decision block 4330, then the method 4300C continues by accepting the transmitted data from the read or by encrypting the data using the secret, the GUID, and the nonce or random number and sending the encrypted data for the write, in block 4340C.

In the method 4400 of FIG. 33, a master device in the computer system reads the GUID for a device in the computer system and records the GUID in a GUID table during a trusted set-up where the device joins the computer system, in block 4405. The device may receive a system GUID from the master device and store the system GUID, in block 4410. The device sets an introduced bit in response to joining the computer system, in block 4415. The device is now considered to be "married" to the computer system. It is contemplated that one, more than one, or all of the devices in the computer system will follow the method 4400 and be "married" to the computer system.

The device receives a transaction request from the computer system, and the device checks if the introduced bit is set, in block 4420. If the introduced bit is not set, in decision block 4425, then the method 4400 continues by not fulfilling the transaction request or by not responding to the transaction request, in block 4430. If the introduced bit is set, in decision block 4425, then the method 4400 may continue with the device requesting authentication from the computer system using the GUID before responding to the transaction request, in block 4435.

If the device requests authorization, or if the computer system authenticates directly, a nonce or random number may be provided to the device. If the transaction request is a read of data from the device, the device may respond to the transaction request by encrypting the requested data using the GUID and the nonce or random number and a result of a hash using the GUID and the nonce or random number. If the data transaction request is a write of data to or through the device, the device may respond to the data transaction request with the result of the hash using the GUID and the nonce or random number.

The method 4400 continues with the result of the authentication, in decision block 4440. If the authentication is not successful, in decision block 4440, then the method 4400 continues by not fulfilling the transaction request, in block 4430. If the authentication is successful, in decision block 4440, or if authentication is not used for the transaction request, then the method 4400 continues by fulfilling the transaction request, in block 4445.

In alternative embodiments, the authentication may be performed by different methods. As an example, the master device may authenticate itself to the device by providing at least an indication of the system GUID to the device. Additional authentication methods, known in the art, may also be used other than challenge-response.

Figure 34:
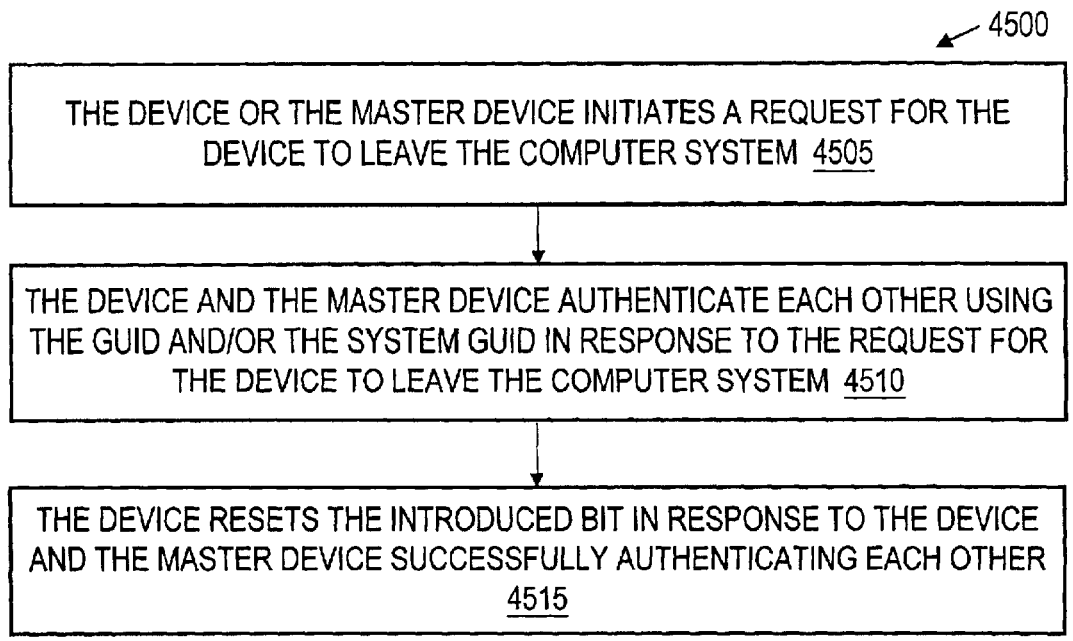
FIGS. 34 and 35 illustrate flowcharts of embodiments of methods for removing a device from a computer system once the device has been united with the computer system using a introduced bit, according to various aspects of the present invention.
Figure 35:
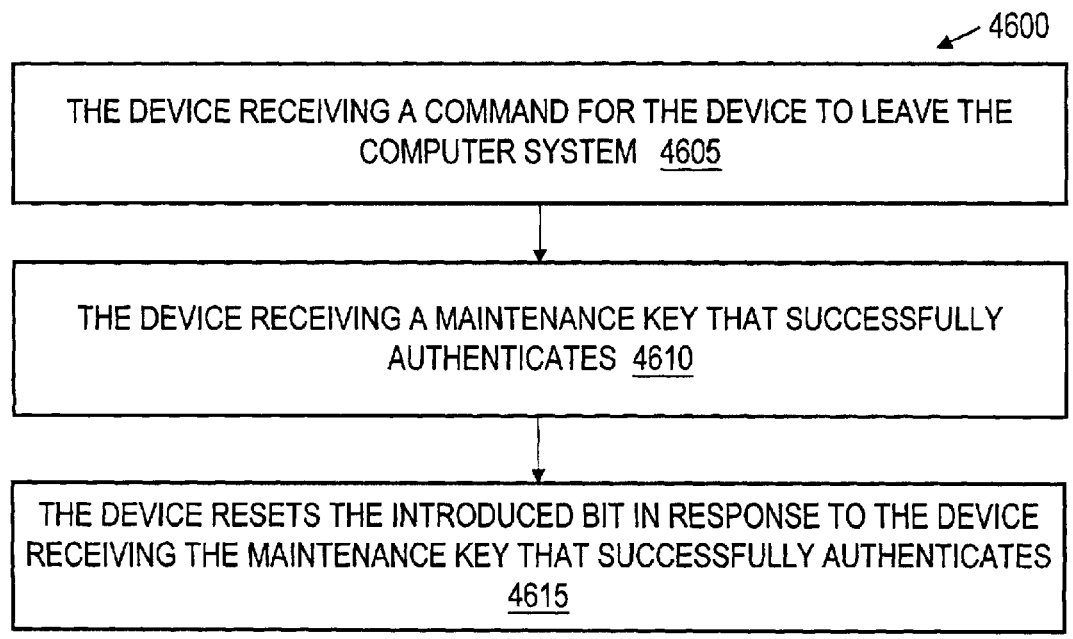

Turning now to FIGS. 34 and 35, flowcharts of embodiments of methods 4500 and 4600 for removing the device from the computer system once the device has been united with ("married to") the computer system using the introduced bit 4090 shown in FIG. 29E are illustrated. In the method 4500 of FIG. 34, the removal of the device from the computer system is by joint consent, a "no-fault divorce." In the method 4600 of FIG. 35, the removal of the device from the computer system is forced in a maintenance mode using a maintenance (backdoor) key, a "court-ordered divorce."

The method 4500 of FIG. 34 includes the device or the master device initiating a request for the device to leave the computer system, in block 4505. The device and the master device authenticate themselves to each other using the GUID and/or the system GUID, in response to the request for the device to leave the computer system, in block 4510. The device resets the introduced bit in response to the device and the master device successfully authenticating each other, in block 4515.

The method 4500 of FIG. 34 may advantageously allow for easy removal of a device married to the computer system while maintaining system security. Authentication between the device and the master device may include any combination of the device providing at least an indication of the GUID to the master device, the device providing at least an indication of the system GUID to the master device, the master device providing at least an indication of the GUID to the device, and the master device providing at least an indication of the system GUID to the device. Any appropriate mechanism may be used for providing at least the indication, including the challenge-response method or other authentication method known in the art.

The method 4600 of FIG. 35 includes the device receiving a command for the device to leave the computer system, in block 4605. The device also receives at least an indication of a maintenance key that the device can successfully authenticate, in block 4610. The device resets the introduced bit in response to the device receiving at least the indication of the maintenance key that the device can successfully authenticate, in block 4615.

The method 4600 of FIG. 35 may advantageously allow for easy removal of a device married to the computer system when the computer system is unresponsive or the device must be removed from the computer system for repair, while maintaining system security. The maintenance key may be programmed by the manufacturer of the device for each device, or for a class of devices. Authorized, trusted repair facilities are preferably the only ones with access to the maintenance key. A purchaser of a large number of similar devices could request a single maintenance key for all devices purchased.

Figure 36:
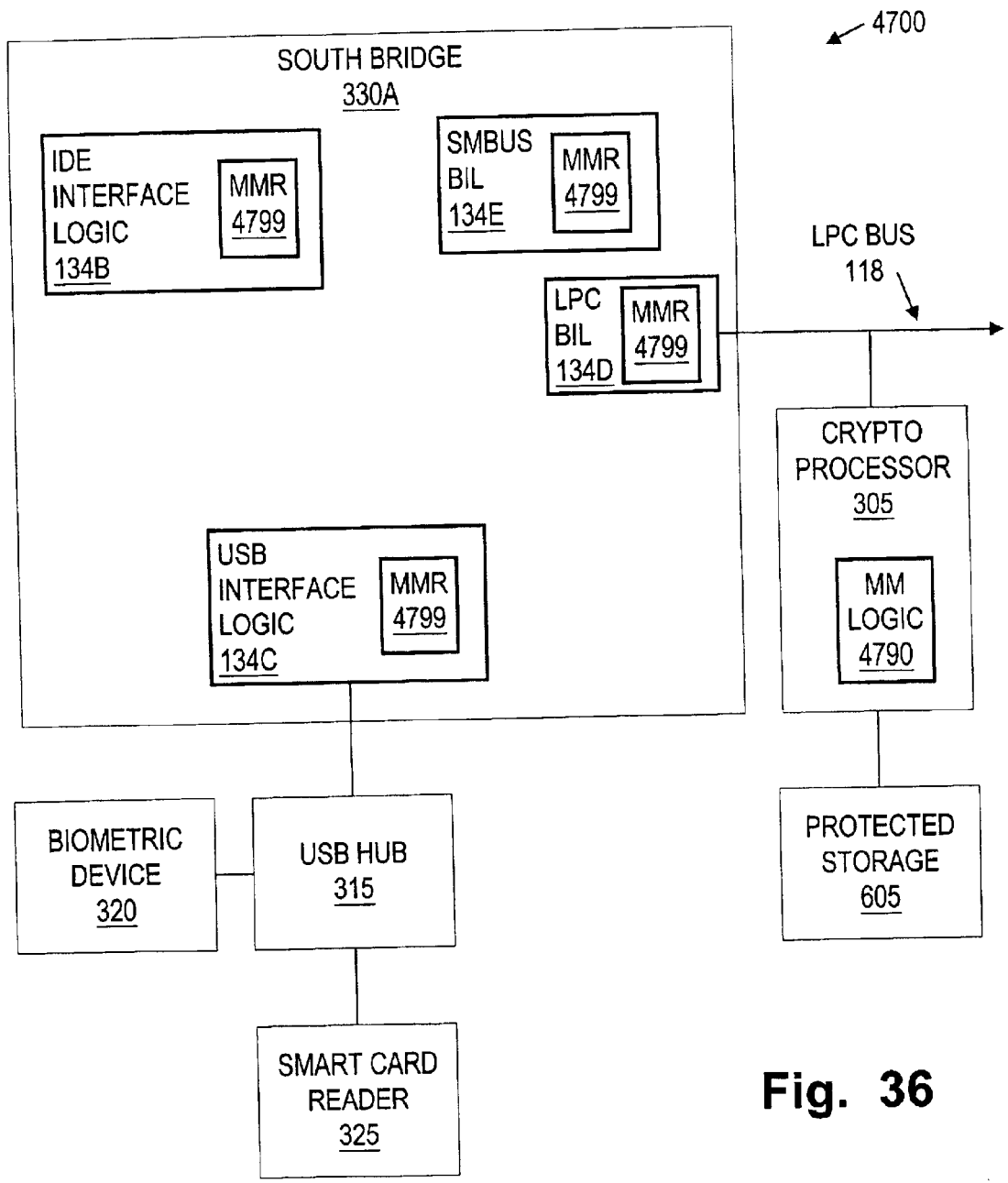
FIG. 36 illustrates a block diagram of an embodiment of a computer subsystem including bus interface logics with master mode capabilities, according to one aspect of the present invention.

Turning now to FIG. 36, a block diagram of an embodiment of a computer subsystem 4700 including bus interface logics 134B, 134C, 134D, and 134E with master mode capabilities in an embodiment of the south bridge 330F, according to one aspect of the present invention, is illustrated. In the embodiment shown, the south bridge 330F is coupled through the LPC bus 118 to an embodiment of a crypto-processor 305, including master mode logic 4790. The crypto-processor 305 is coupled to secure a protected storage 605.

The bus interface logics 134B, 134C, 134D, and 134E of the south bridge 330F include IDE interface logic 134B, USB interface logic 134C, LPC bus interface logic 134D, and SMBus bus interface logic 134E. Each bus interface logic 134B, 134C, 134D, and 134E include a master mode register 4799 including a master mode bit. Coupled to the USB interface logic 134C are the USB hub 315, the biometric device 320, and the smart card reader 325.

Master mode operations of the computer subsystem 4700 may advantageously allow for secure input of data, such as biometric data or smart card data, without the unencrypted data being accessible to the operating system. Master mode creates a secure communications channel between the master mode logic 4790 and the data input device.

Although the illustrated embodiment of FIG. 36 shows the master mode logic 4790 in the crypto-processor 305, it is contemplated that the master mode logic 4790 may also be incorporated into other devices in the computer system, such as in the security hardware 370 shown above. It is also contemplated that other devices, such as the USB hub 315, that pass-through data may also include the master mode register 4799. In various embodiments, secure data input devices; such as the biometric device 320, the smart card reader 325, or a keyboard, also include the master mode register 4799.

Note that the storage location or locations for storing the master mode bit may also include space for storing one or more addresses in an appropriate format for the bus interface logic. The one or more addresses may be used by the bus interface logics to provide data to and from only those addresses, only within the address range defined by those addresses, or to exclude data from or to those addresses or the address range the addresses define. The crypto-processor or security hardware may store the one or more addresses or the crypto-processor or security hardware may indicate to the bus interface logic or logics to store the addresses themselves.

Figure 37:
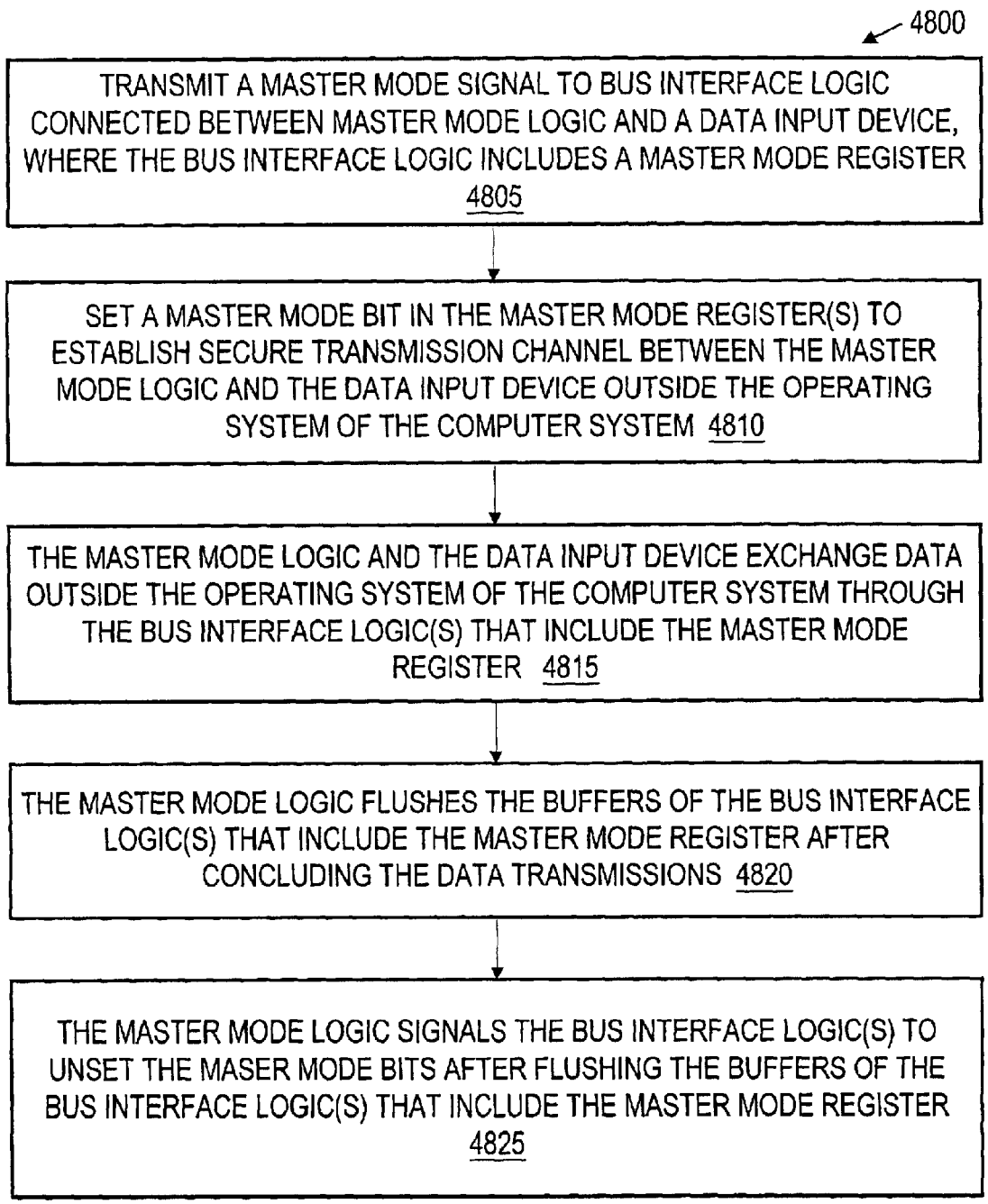
FIG. 37 illustrates a flowchart of an embodiment of a method for operating in a master mode outside the operating system, according to one aspect of the present invention.

Turning now to FIG. 37, a flowchart of an embodiment of a method 4800 for operating in a master mode outside the operating system is illustrated. The master mode operation may advantageously allow for user authentication, such as via a biometric device or a smart card reader, without the operating system or a program running under the operating system from snooping on the authentication data stream.

The method 4800 shown in FIG. 37 includes transmitting a master mode signal to one or more bus interface logics or other devices that include a master mode register, in block 4805. The method 4800 also includes setting a master mode bit in the master mode register of each of the one or more bus interface logics or other devices that include the master mode register to establish a secure transmission channel between the master mode logic and the data input device, in block 4810. The master mode logic and the data input device exchange data outside the operating system of the computer system through the bus interface logics or other devices that include the master mode register, in block 4815.

The master mode logic flushes, or signals the bus interface logics or other devices that include the master mode register to flush, the buffers of the bus interface logics or other devices that include the master mode register after concluding the data transmissions, in block 4820. The master mode logic finally signals the bus interface logics or other devices that include the master mode register to reset the master mode bits after flushing the buffers of the bus interface logics or other devices that include the master mode register so that the operating system can again access the bus interface logics or other devices that include the master mode register, in block 4825.

As used herein, operating outside the operating system means that programs running under the operating system are unable to access the bus interface logics or other devices including a master mode register when the master mode bit is set. This may advantageously allow for a program running under the operating system to request the crypto-processor or other master device including the master mode logic to perform a secure data read. The master mode logic is configured to read secure data from an input device such as a biometric device; a smart card reader, a signature verification reader, or a keyboard. As described herein, the biometric device may measure any one or more of any number of physiological and/or behavioral features, including but not limited to fingerprints, hand geometry, voice prints, retinal scans, facial scans, body odor, ear shape, DNA profile, keystroke dynamics, and vein checking.

Figure 38A:
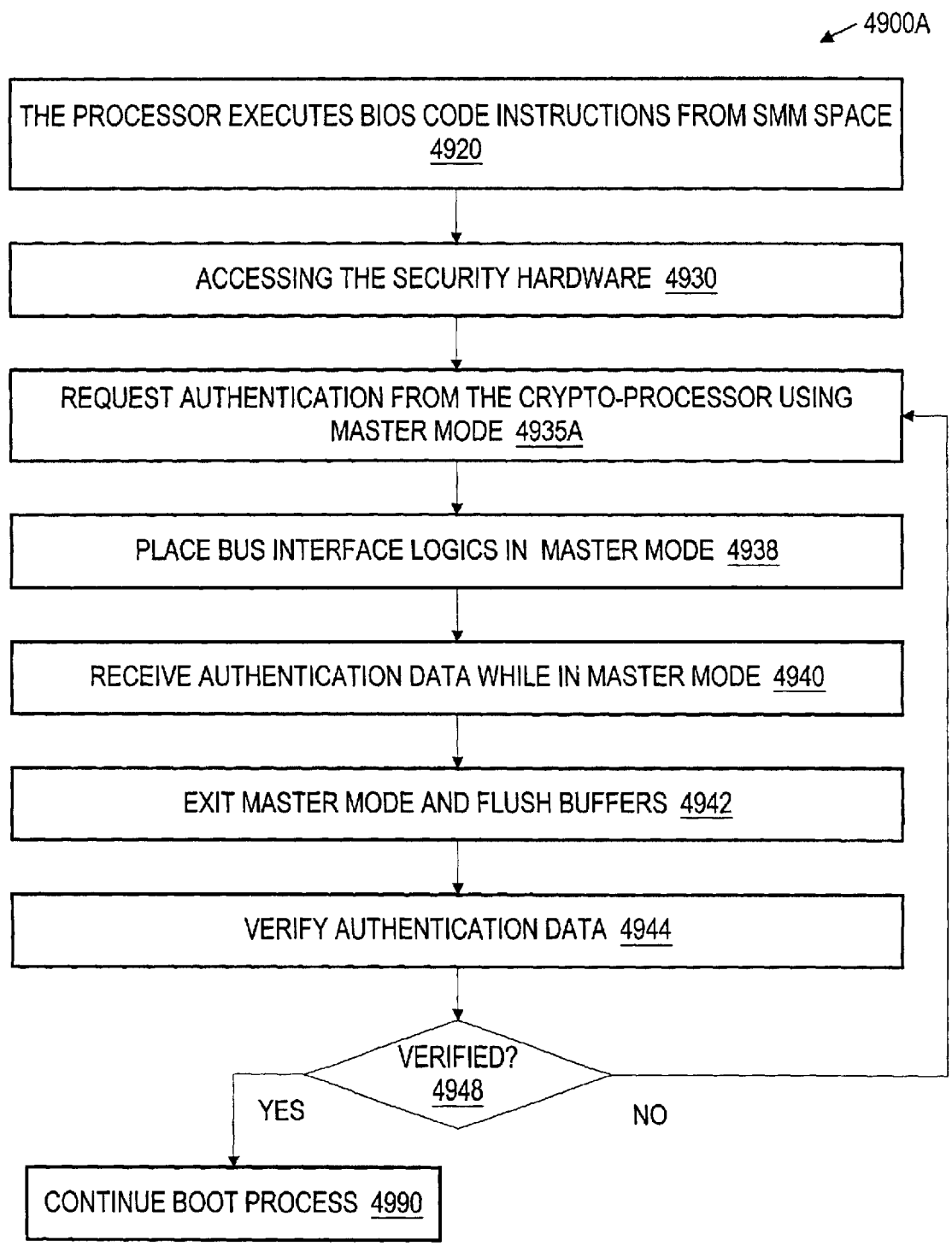
Figure 38B:
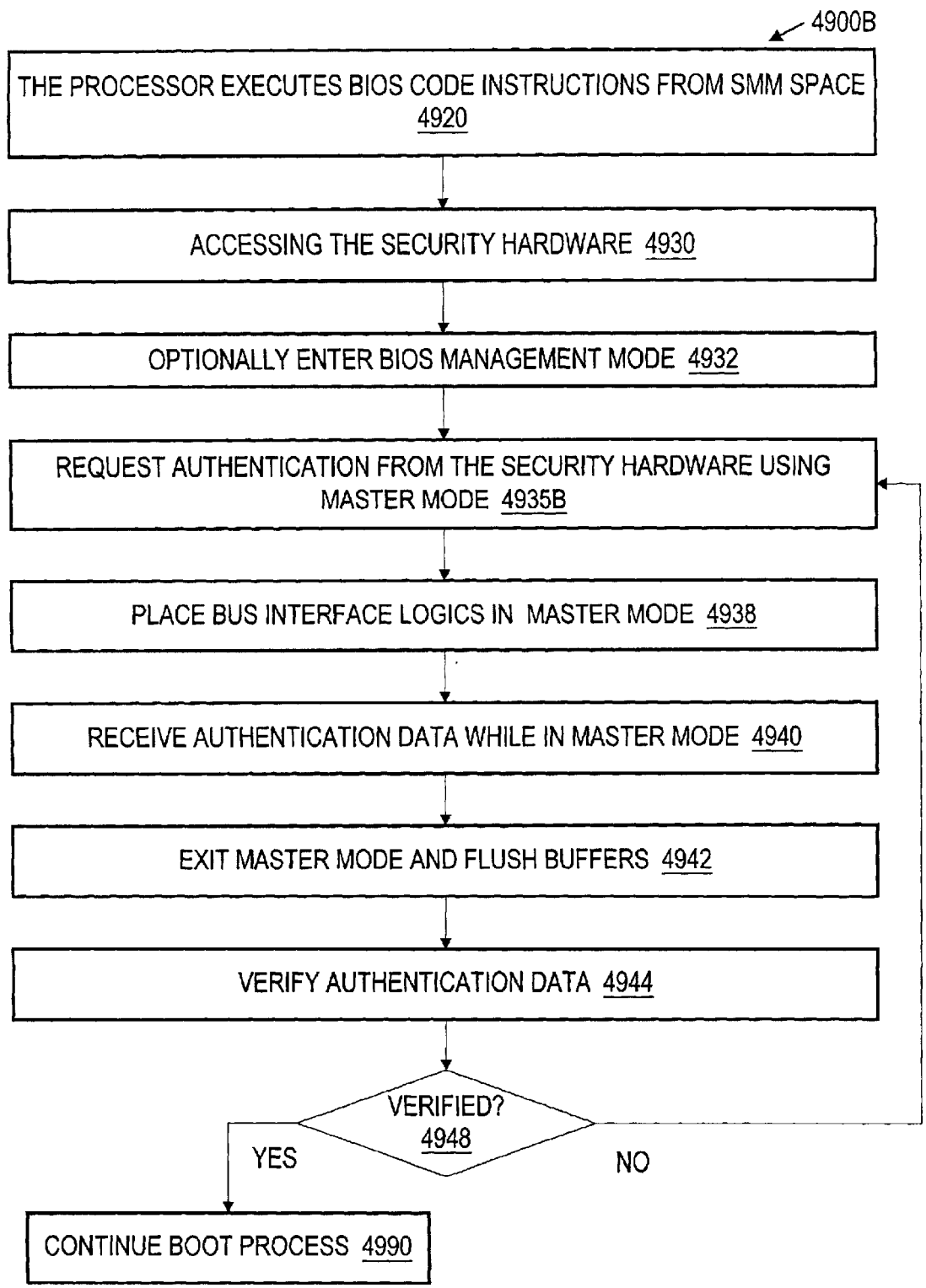
FIG. 38B illustrates a flowchart of an embodiment of a method for booting a computer system including authentication via the security hardware using the master mode logic, according to various aspects of the present invention.

Turning now to FIGS. 38A and 38B, flowcharts of embodiments of methods 4900A and 4900B for booting a computer system including authentication via the master mode logic are shown. In FIG. 38A, the crypto-processor is used to control the master mode logic, while in FIG. 38B, the security hardware is used to control the master mode logic.

In FIG. 38A, the processor executes BIOS code instructions from SMM space, in 4920. After optionally accessing the security hardware, in 4930, the method 4900A requests authentication from the crypto-processor, preferably using the master mode logic, in 4835A. The method 4900A places the bus interface logics in master mode, in 4938. The bus interface logics would typically be between the crypto-processor and the authentication device. The method 4900A receives the authentication data while the bus interface logics are in master mode, in 4940. The method 4900A exits master mode and flushes the buffers of the bus interface logics, in 4942. The method 4900A next verifies the authentication data, in 4944. Verifying the authentication data may include the crypto-processor providing an indication of the authentication data to a remote security device. If the authentication data are verified in 4948, then the method 4900A continues the boot process, in 4990. If the authentication data are not verified in 4948, then the method 4900A returns to 4935A and again requests authentication.

In FIG. 38B, the processor executes BIOS code instructions from SMM space, in 4920. After optionally accessing the security hardware, in 4930, and optionally entering a BIOS management mode, in 4932, the method 4900B requests authentication from the security hardware, using the master mode logic, in 4935B. The method 4900B places the bus interface logics in master mode, in 4938. The bus interface logics would typically be between the security hardware, e.g. the south bridge, and the authentication device. The method 4900B receives the authentication data while the bus interface logics are in master mode, in 4940. The method 4900B exits master mode and flushes the buffers of the bus interface logics, in 4942. The method 4900B next verifies the authentication data, in 4944. Verifying the authentication data may include the security hardware providing an indication of the authentication data to a remote security device. If the authentication data are verified in 4948, then the method 4900B continues the boot process, in 4990. If the authentication data are not verified in 4948, then the method 4900B returns to 4935A and again requests authentication.

Note that the relative position of steps of the methods 4900A and 4900B in the boot process (or sequence), such as shown in FIG. 1A would typically be prior to step 152. The relative position of various steps of the methods 4900A and 4900B in the boot process may also be between steps 1632 and 1650 of FIGS. 16A and 16B. Various BIOS code segments may be necessary for correct response of various devices in the computer system, such as the south bridge and authentication devices coupled thereto.

Figure 39A:
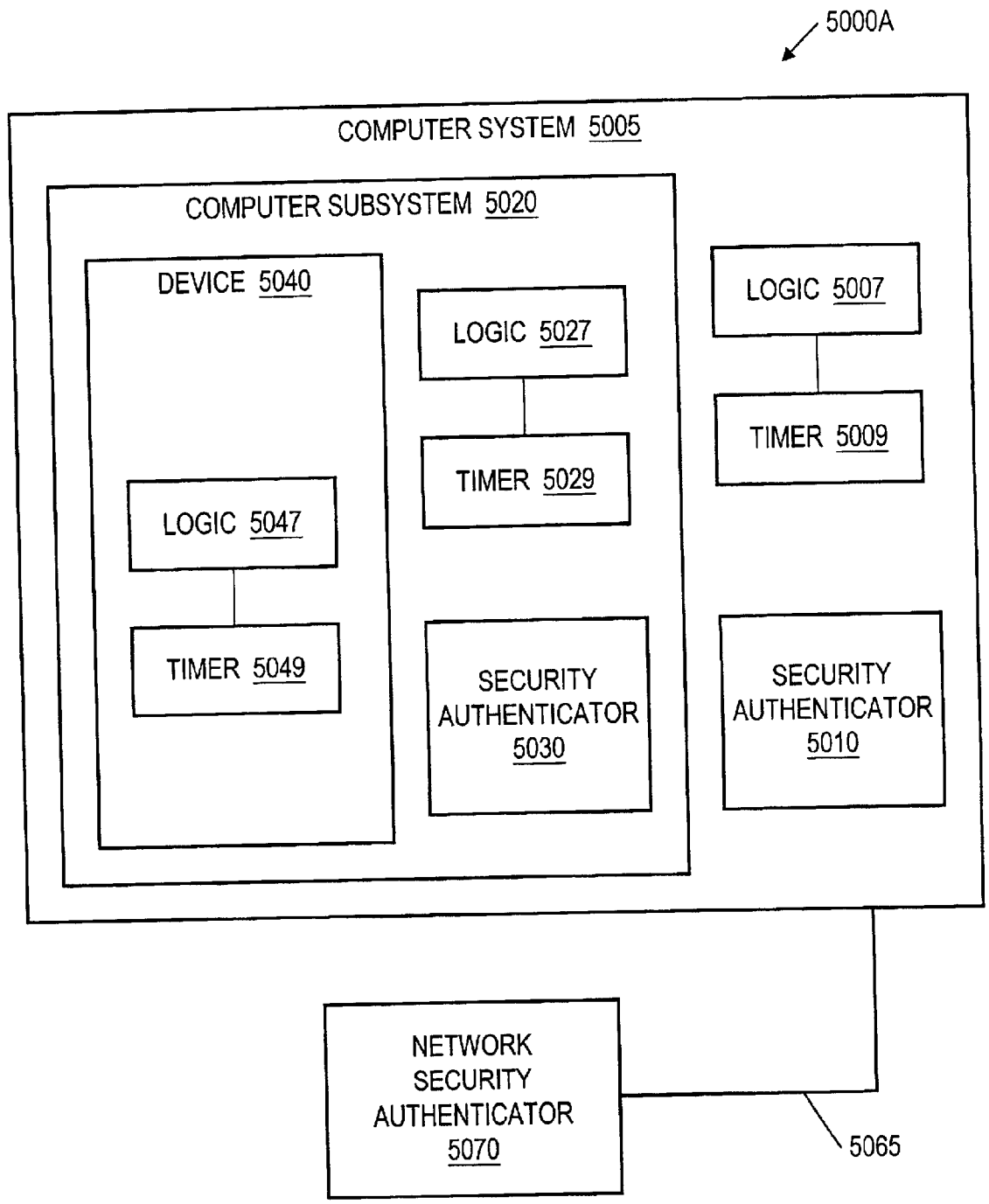
FIGS. 39A, 39B, and 39C illustrate block diagrams of embodiments of computer systems 5000 for securing a device, a computer subsystem, or a computer system using timers to enforce periodic authentication, according to various aspects of the present invention.
Figure 39B:
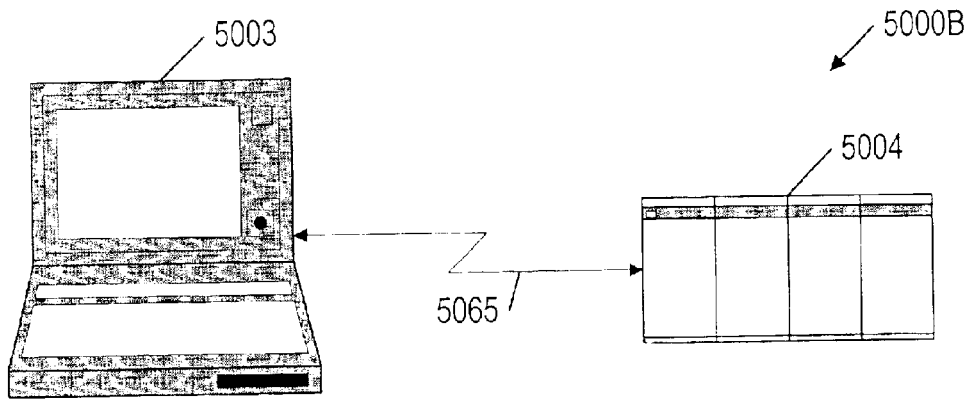
Figure 39C:
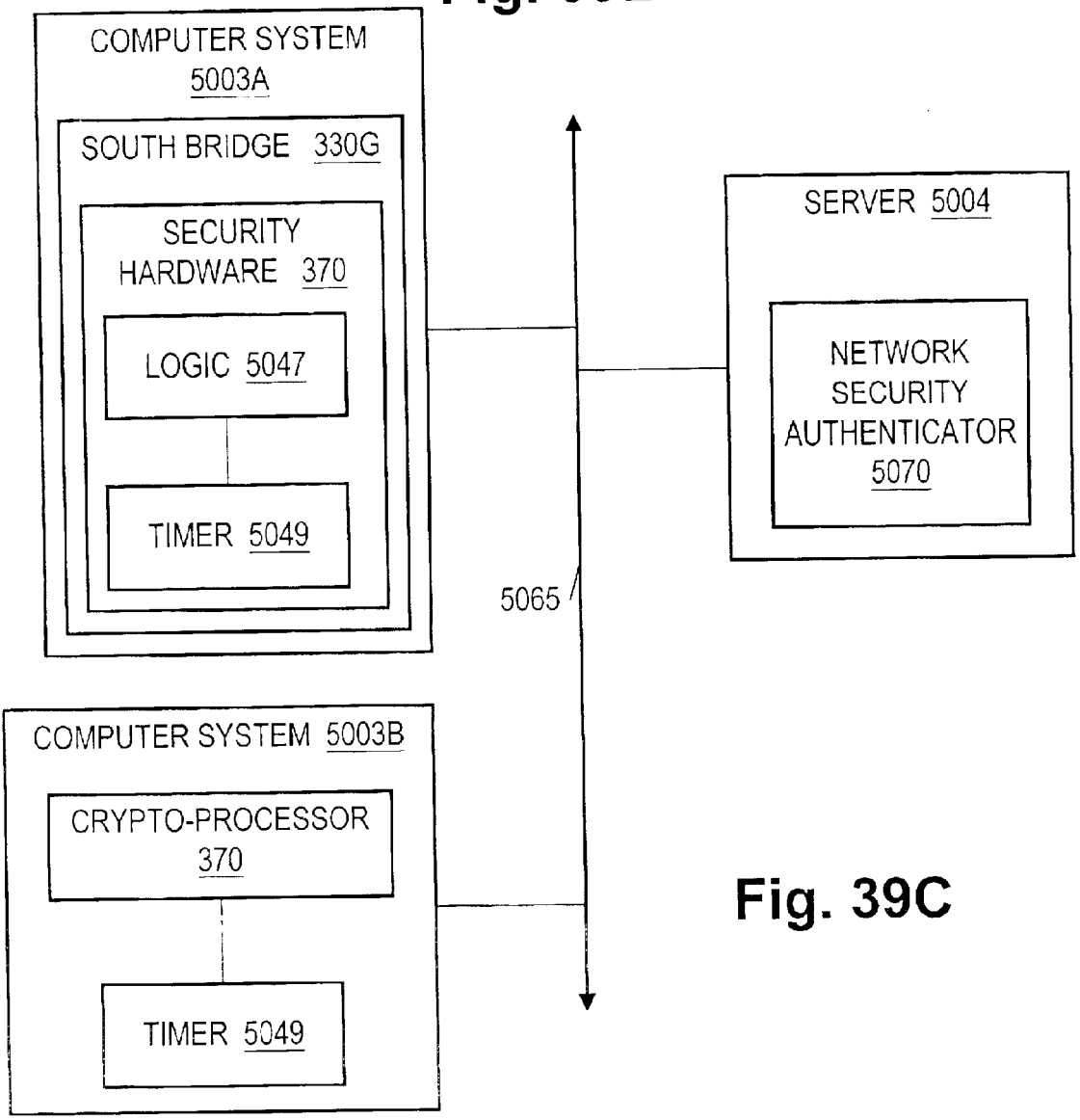

Turning now to FIGS. 39A, 39B, and 39C, block diagram of embodiments of systems 5000A, 5000B, and 5000C for securing a device, a computer subsystem, and/or a computer system using timers to enforce periodic authentication. In FIG. 39A, the system 5000A includes each of a computer system 5005, a computer subsystem 5020, and a device 5040 as well as a network security authenticator 5070. In FIG. 39B, the system 5000B includes a portable computer 5003 coupled to a server 5004 for authentication. In FIG. 39C, the system 500C includes two computer systems 5003A and 5003B coupled to the server 5004 including the network security authenticator 5070.

In FIG. 39A, the system 5000A, as shown, includes the computer system 5005 coupled to the network security authenticator 5070 through a network 5065. The computer system 5005 includes logic 5007, a timer 5009, a security authenticator 5010, and the computer system 5020. The computer subsystem 5020 includes logic 5027, a timer 5029, a security authenticator 5030, and the device 5040. The device 5040 includes logic 5047 and a timer 5049.

In one embodiment, the device 5040 authenticates to the computer subsystem 5020, using the security authenticator 5030, and the logic 5047 sets and monitors the timer 5049. In another embodiment, the device 5040 authenticates to the computer system 5005, using the security authenticator 5010, and the logic 5047 sets and monitors the timer 5049. In still another embodiment, the device 5040 authenticates to the network security authenticator 5070 over the network 5065, and the logic 5047 sets and monitors the timer 5049.

In one embodiment, the computer subsystem 5020 authenticates to the computer system, using the security authenticator 5010, and the logic 5027 sets and monitors the timer 5029. In another embodiment, the computer subsystem 5020 authenticates to the network security authenticator 5070 over the network 5065, and the logic 5027 sets and monitors the timer 5029. In another embodiment, the computer system 5005 authenticates to the network security authenticator 5070 over the network 5065, and the logic 5007 sets and monitors the timer 5009. Note that not all of these embodiments are mutually exclusive.

In FIG. 39B, the system 5000B includes the portable computer coupled over a remote connection to the server 5004. The operations of the system 5000B may be given in FIG. 40B below. The portable computer 5003 may include the logic 5007 and the timer 5009 shown in FIG. 39A. The server 5004 may include the network security authenticator 5070.

In FIG. 39C, the system 500C includes two computer systems 5003A and 5003B coupled over the network 5065 to the server 5004 including the network security authenticator 5070. The computer system 5003A includes a south bridge 330G that includes security hardware 370. The security hardware 370, as shown, includes the logic 5047 and the timer 5049. The computer system 5003B includes a crypto-processor 370, in place of the logic 5047, coupled to the timer 5049. FIG. 39C illustrates that the security hardware 370 or the crypto-processor 370 may control the timer 5049 and the interactions with the network security authenticator 5070.

Figure 40A:
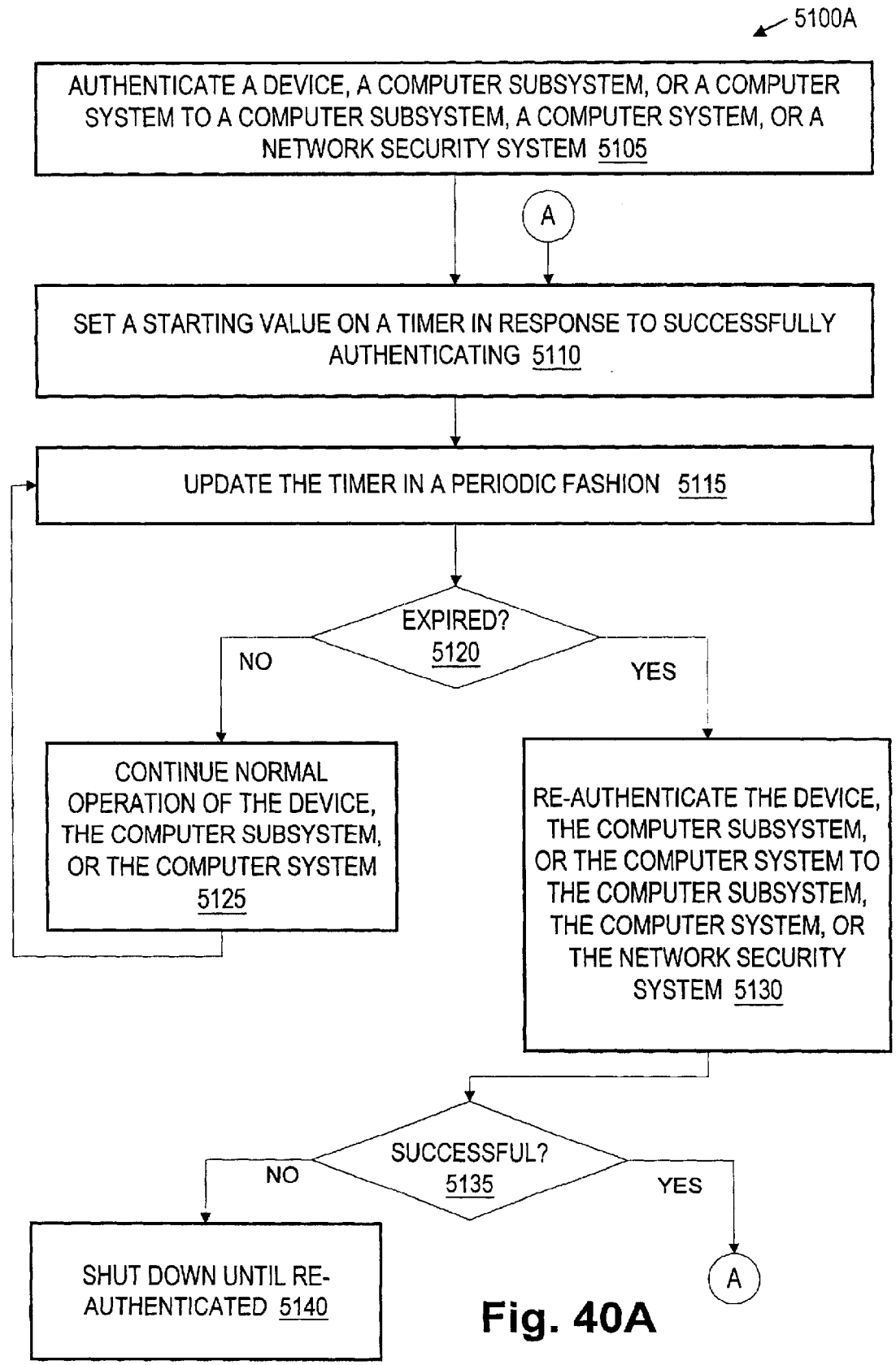
FIGS. 40A and 40B illustrate flowcharts of embodiments of a method for securing a device, a computer subsystem, or a computer system, such as a portable computer, by limiting use to finite periods of time between successive authorizations, according to various aspects of the present invention.
Figure 40B:
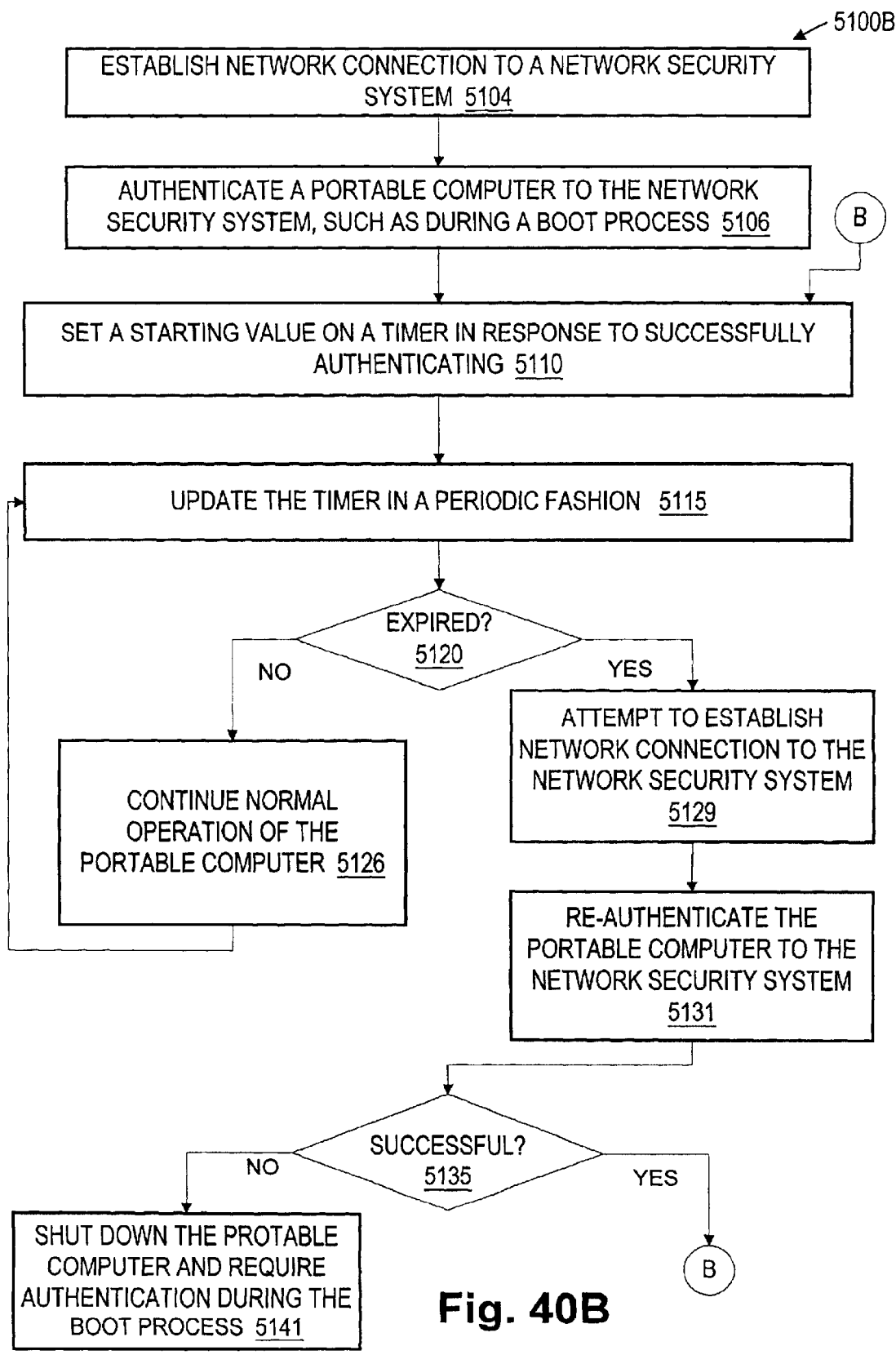

Turning now to FIGS. 40A and 4013, flowcharts of embodiments of methods 5100A and 5100B for securing a device, a computer subsystem, or a computer system, such as a portable computer, by limiting use to finite periods of time between successive authorizations are illustrated. The methods 5100A and 510013 may advantageously discourage theft of the device, the computer subsystem, or the computer system as its usefulness is limited outside of or without its authorizing computer subsystem, computer system, or network security connections. While the method 5100A of FIG. 40A is a general method applicable to any of device, computer subsystem, or computer system, the method 5100B of FIG. 40B is an example of a specific method applicable to a portable computer adapted to communicate over a computer network.

In FIG. 40A, the method 5100A authenticates the device, the computer subsystem, or the computer system to the computer subsystem, the computer system, or the network security device, in 5105. Typically, the device will authenticate to the computer subsystem or the computer system, while the computer subsystem will authenticate to the computer system or the network security device, and the computer system will authenticate to the network security device. Deviations from this typical behavior may include a device authenticating to the network security device, or the computer system authenticating to another computer system.

The method 5100A sets a starting value on a timer in response to successfully authenticating the device, the computer subsystem, or the computer system, in 5110. The timer is updated in a periodic fashion, in 5115. The method 5100A checks in 5120 if the timer has expired. If the timer has not expired, in 5120, then the method 5100A continues the normal operation of the device, the computer subsystem, or the computer system in 5125, and returns to 5115. If the timer has expired, in 5120, then the method 5100A attempts to re-authenticate the device, the computer subsystem, or the computer system to the appropriate master, in 5130. If the re-authentication in 5130 is successful, in 5135, then the method 5100A returns to 5110 and resets the starting value on the timer. If the re-authentication in 5130 is not successful, in 5135, then the method 5100A shuts down the device, the computer subsystem, or the computer system until the device, the computer subsystem, or the computer system can be re-authenticated, such as during the boot process.

Note that the timer may be implemented as a count down timer running from a set value down to the expired value of zero or a counting timer running from zero up to a predetermined value as the expired value. The set value or the predetermined value may be a constant or may be randomly selected. The set value or the predetermined value may also vary according to a predetermined algorithm, if desired. Updating the timer may occur with each increment of the system clock or a local clock, or only while the device, the computer subsystem or the computer system is operating.

The method 5100B established a network connection to the network security device (or system) in 5104. The method 5100B authenticates a portable computer to the network security system, in 5106. The authentication may occur during the boot process. The method 5100B sets a starting value on a timer in response to successfully authenticating the portable computer, in 5110. The timer is updated in a periodic fashion, in 5115. The method 5100B checks in 5120 if the timer has expired. If the timer has not expired, in 5120, then the method 5100B continues the normal operation of the device, the computer subsystem, or the computer system in 5126, and returns to 5115. If the timer has expired, in 5120, then the method 5100B attempts to establish network connection to the network security system, in 5129, and to re-authenticate the portable computer to the network security system, in 5131. If the re-authentication, in 5131, is successful, in 5135, then the method 5100B returns to 5110 and resets the starting value on the timer. If the re-authentication, in 5131, is not successful, in 5135, then the method 5100B shuts down the portable computer and requires authentication during the boot process, in 5141, before normal operations of the portable computer are allowed to resume.

Note that the device 5040 may represent any device 5040 in the computer system 5003 or 5005. The computer subsystem 5020 may represent any computer subsystem 5020 in the computer system 5003 or 5005. Also note that code for the authentication and timer settings may be stored in the security hardware 370 or the secure storage shown elsewhere in this disclosure, such as the BIOS ROM 365, the SMM ROM 520, the extended BIOS 555, or the protected storage 605.

Figure 41:
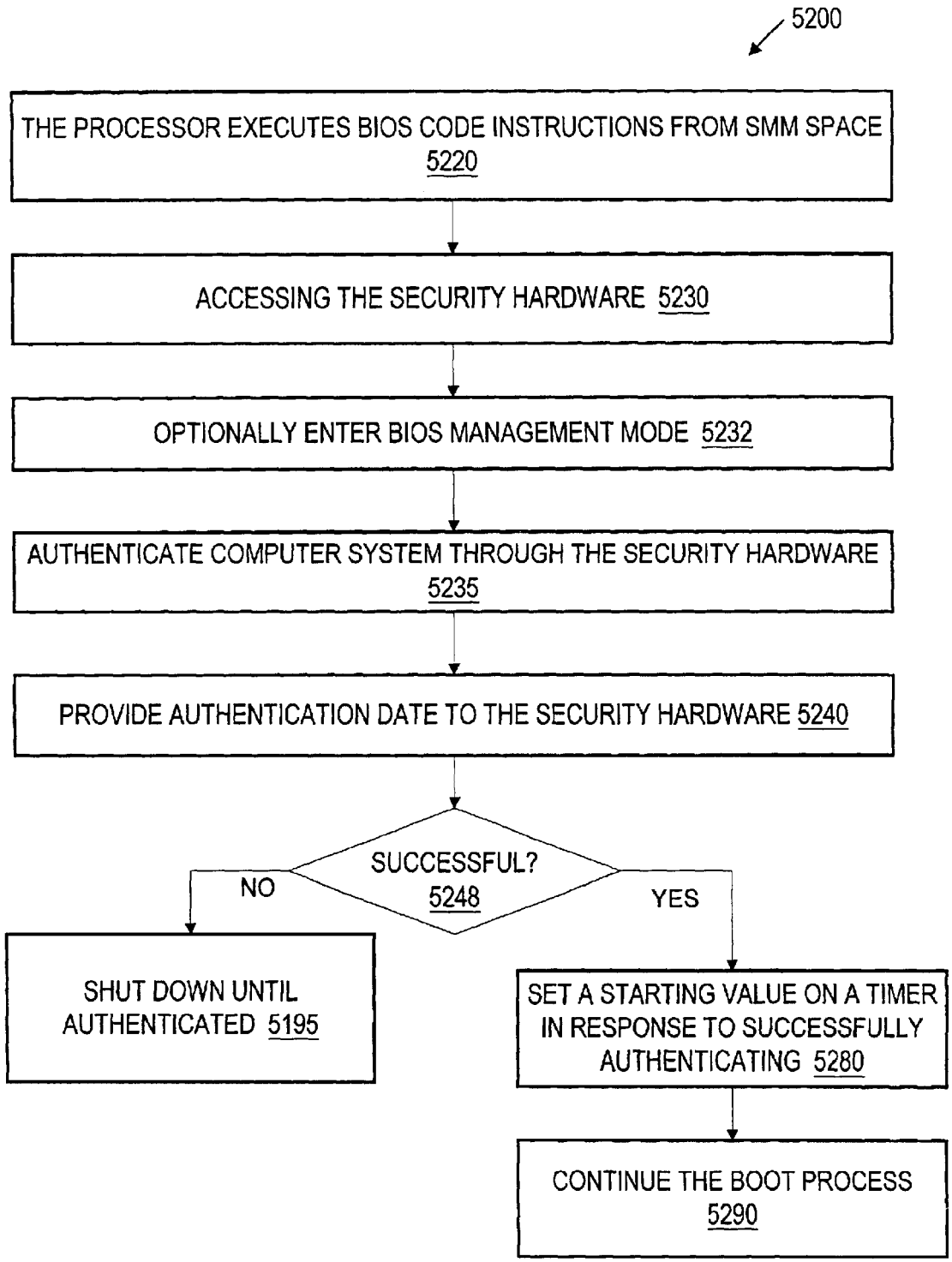
FIG. 41 illustrates a flowchart of an embodiment of a method for booting a computer system including initializing a timer to enforce periodic authentication and authorization, according to one aspect of the present invention.

Turning now to FIG. 41, a flowchart of an embodiment of a method 5200 for booting a computer system including initializing a timer to enforce periodic authentication and authorization is shown. The method includes the processor executing BIOS code instructions from SMM space, in 5220. The method 5200 may also access the security hardware, in 5230. The method 5200 may also optionally enter BIOS management mode, in 5232. The method 5200 authenticates the computer system through the security hardware, in 5235. Authentication data are provided to the security hardware, in 5240. If the authentication is not successful, in 5248, then the method 5200 shuts down the computer system until successful authentication is provided, in 5195. If the authentication is successful, in 5248, then the method 5200 sets a starting value on the timer, in response to successfully authenticating, in 5280. The method 5200 then continues the boot process, in 5290.

Figure 42A:
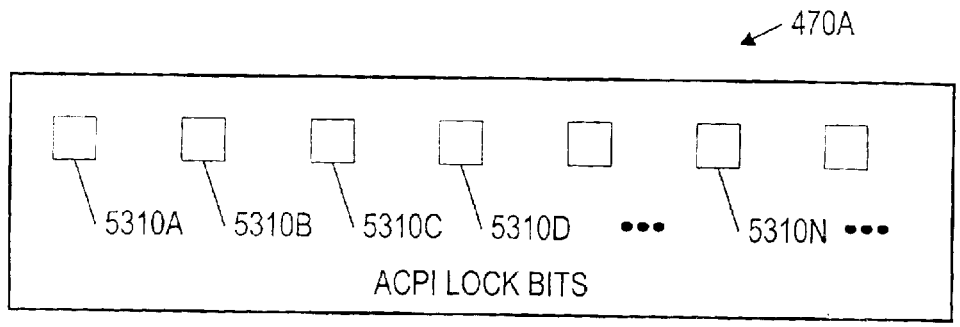
FIGS. 42A and 42B illustrate block diagrams of embodiments of the system management registers, according to various aspects of the present invention.
Figure 42B:
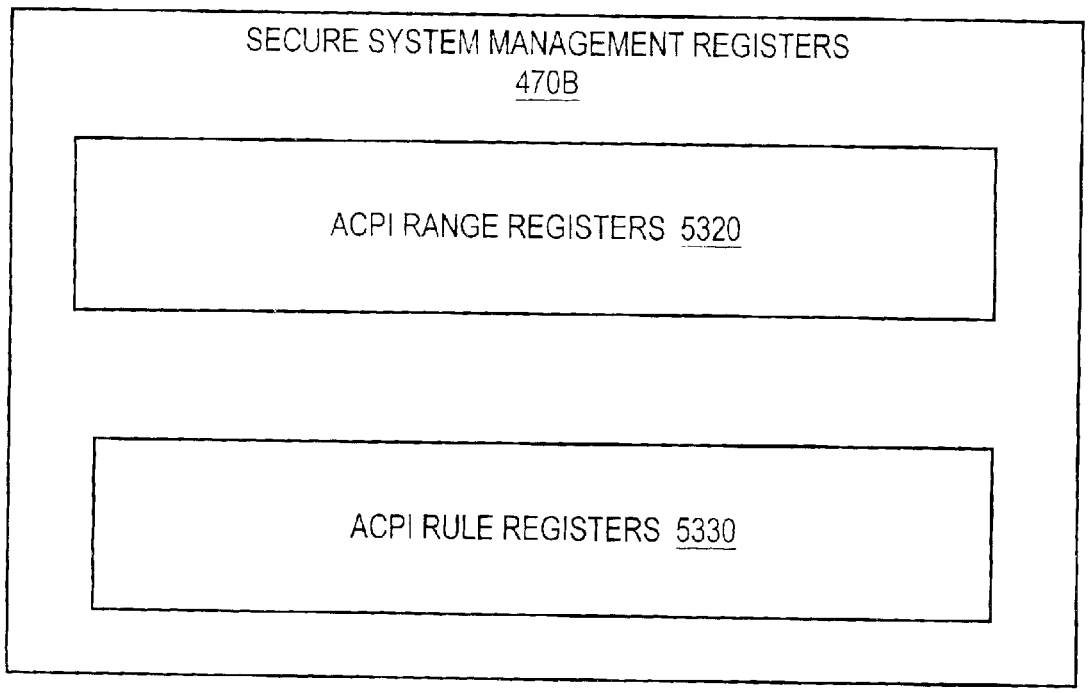

Turning now to FIGS. 42A and 42B, block diagrams of embodiments of the system management registers 470A and 470B are illustrated. In the embodiment shown in FIG. 42A, the secure system management registers 470A include one or more ACPI lock bits 5310A through 5310N to secure various ACPI or related functions against unauthorized changes. The ACPI lock bits 5310, once set, prevent changes to the ACPI or related functions. A request to change one of the ACPI or related functions requires that a respective ACPI lock bit 5310N be released before the respective one of the ACPI or related functions is changed.

In the embodiment shown in FIG. 42B, the secure system management registers 470 include one or more ACPI range registers 5320 and/or one or more ACPI rule registers 5330. Each of the one or more ACPI range registers 5120 may be configured to store a value or values that define allowable or preferred values for a specific ACPI or related function. Each of the one or more ACPI rule registers 5330 may be configured to store part or all of a rule for determining if a change to one of the ACPI or related functions should be allowed. Each of the one or more ACPI rule registers 5330 may also be configured to store code for evaluating the rules for determining if a change to one of the ACPI or related functions should be allowed or comparing a requested value or change to the value or values that define allowable or preferred values for a specific ACPI or related function stored in one of the ACPI range registers 5320.

Examples of ACPI or related functions include changing a voltage, changing a frequency, turning on or off a cooling fan, and a remote reset of the computer system. It is contemplated that other ACPI or related functions may also be used. It is noted that the voltage may be a processor voltage, the frequency may be a processor operating frequency or a bus or interface frequency, the cooling fan may be operable or intended to cool any component in the computer system, including devices or subsystems not described herein, such as a power supply. It is noted that in various embodiments, the SMM access filters 410, such as shown in FIG. 5A, may include address range traps for directing access requests to evaluate the contents of the ACPI management registers 470A or 470B.

For the purposes of this disclosure, references to ROM are to be construed as also applying to flash memory and other substantially non-volatile memory types. Note that while the methods of the present invention disclosed herein have been illustrated as flowcharts, various elements of the flowcharts may be omitted or performed in different order in various embodiments. Note also that the methods of the present invention disclosed herein admit to variations in implementation.

Some aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A device, comprising:
   a port configured to receive at least one operating mode signal, wherein the at least one operating mode signal is indicative of a first operating mode;
   one or more secured assets; and
   security hardware coupled to receive the at least one operating mode signal, wherein the security hardware is further coupled to control access to the secured assets dependant upon the at least one operating mode signal.

2. The device of claim 1, further comprising:
   at least one bus interface logic for coupling to a first external bus, wherein the one or more secured assets are coupled to the at least one bus interface logic.

3. The device of claim 2, wherein the at least one operating mode signal is received by the security hardware through the at least one bus interface logic.

4. The device of claim 1, wherein the one or more secured assets includes one or more of the group consisting of:
   a random number generator,
   a secure management register,
   a monotonic counter, and
   a secure memory.

5. The device of claim 1, wherein the first operating mode comprises system management mode.

6. The device of claim 1, wherein the security hardware includes:
   an initiation register coupled to receive a request to change to the first operating mode; and
   control logic coupled to the initiation register, wherein the control logic is configured to assert a control signal indicative of the request to change to the first operating mode, wherein the control signal initiates the change to the first operating mode.

7. The device of claim 6, wherein the control signal indicative of the request to change to the first operating mode comprises a system management interrupt.

8. The device of claim 1, wherein the security hardware includes:
   a kick-out timer coupled to receive the at least one operating mode signal, wherein the kick-out timer is configured to output a signal indicating when the at least one operating mode signal is continuously active for at least a predetermined period of time.

9. The device of claim 8, wherein the kick-out timer is reset in response to a change in the at least one operating mode signal.

10. The device of claim 8, wherein the security hardware further includes:
    a re-initiation timer coupled to receive the signal indicating when the at least one operating mode signal is active for the predetermined period of time, wherein the re-initiation timer is configured to output a signal indicating that another predetermined period of time has elapsed since the kick-out timer output the signal indicating when the at least one operating mode signal is continuously active for at least the predetermined period of time.

11. The device of claim 1, wherein the security hardware includes:
    a duration timer coupled to receive the at least one operating mode signal, wherein the duration timer is configured to provide an indication of how long the at least one operating mode signal is active.

12. The device of claim 11, wherein the duration timer is reset in response to a change in the at least one operating mode signal.

13. The device of claim 1, wherein the security hardware further includes:
    a kick-out timer coupled to the duration timer, wherein the kick-out timer is configured to output a signal indicating when at least one operating mode signal is continuously active for at least a predetermined period of time.

14. The device of claim 13, wherein the kick-out timer and the duration timer comprise a single timer.

15. The device of claim 13, wherein the security hardware further includes:
a re-initiation timer coupled to receive the signal indicating when the at least one operating mode signal is active for a predetermined period of time, wherein the re-initiation timer is configured to output a signal indicating that another predetermined period of time has elapsed since the kick-out timer output the indicating when the at least one operating mode signal is continuously active for at least the predetermined period of time.

16. The device of claim 1, wherein the security hardware includes:
access filters coupled to receive an indication when the at least one operating mode signal is active, wherein the access filters are configured to provide access requests to each of the one or more secured assets while the at least one operating mode signal is active, wherein the access filters are further configured to provide a predetermined response in lieu of data when the at least one operating mode signal is not active.

17. The device of claim 16, wherein the security hardware further includes:
access locks coupled to the access filters, wherein the access locks are further coupled to receive a mode signal, wherein the access locks are configured to disable the access filters in response to the mode signal indicating an unlocked mode.

18. The device of claim 1, wherein the security hardware includes:
mailbox RAM configured to store input and output data, wherein the mailbox RAM includes an inbox for storing input data for the one or more secured assets and an outbox for storing output data from the one or more secured assets.

19. The device of claim 18, wherein the input data for the one or more secured assets is addressed to the inbox of the mailbox RAM.

20. The device of claim 18, wherein the output data from the one or more secured assets is retrieved from an address at the outbox of the mailbox RAM.

21. The device of claim 18, wherein the security hardware further includes:
access filters configured to provide input data or access requests to the inbox of the mailbox RAM while the at least one operating mode signal is active, wherein the access filters are further configured not to provide input data to the inbox of the mailbox RAM when the at least one operating mode signal is not active, and wherein the access filters are further configured to provide a predetermined response in lieu of data upon receipt of said access requests when the at least one operating mode signal is not active.

22. The device of claim 21, wherein the security hardware further includes:
access locks coupled to the access filters, wherein the access locks are further coupled to receive a mode signal, wherein the access locks are configured to disable the access filters in response to the mode signal indicating an unlocked mode.

23. The device of claim 1, wherein the security hardware further includes:
scratchpad RAM, wherein each of the one or more secured assets is configured to access the scratchpad RAM for the storage of data.

24. The device of claim 1, further comprising:
a power port configured to receive at a reserve power signal, wherein the reserve power signal provides reserve power to the one or more secured assets.

25. The device of claim 1, further comprising:
a power port configured to receive a reserve power signal, wherein the reserve power signal provides reserve power to the security hardware.

26. The device of claim 1, wherein the device comprises a bridge, wherein the bridge further comprises:
first bus interface logic for coupling to a first external bus, wherein the one or more secured assets are coupled to the first bus interface logic; and
second bus logic for coupling to a second external bus, wherein the one or more secured assets are further coupled to the second bus interface logic.

27. The device of claim 26, wherein the bridge comprises a south bridge, wherein the first external bus is configurable as a first I/O bus, and wherein the second external bus is configurable as a second I/O bus.

28. The device of claim 26, wherein the first I/O bus is a PCI bus, and wherein the second I/O bus is an LPC bus.

29. The device of claim 1, wherein the device is comprised on a single integrated circuit.

30. A device, comprising:
first bus interface logic for coupling to a first external bus;
a port configured to receive at least one operating mode signal, wherein the at least one operating mode signal is indicative of a first operating mode;
one or more secured assets, wherein the one or more secured assets are coupled to the first bus interface logic; and
security hardware coupled to control the one or more secured assets, wherein the security hardware includes:
an initiation register coupled to receive a request to change to the first operating mode;
control logic coupled to the initiation register, wherein the control logic is configured to assert a control signal indicative of the request to change to the first operating mode, wherein the control signal initiates the change to the first operating mode;
a kick-out timer coupled to receive the at least one operating mode signal, wherein the kick-out timer is configured to output a signal indicating when the at least one operating mode signal is continuously active for at least a predetermined period of time;
a re-initiation timer coupled to receive the signal indicating when the at least one operating mode signal is active for a predetermined period of time, wherein the re-initiation timer is configured to output a signal indicating that another predetermined period of time has elapsed since the kick-out timer output the signal indicating when the at least one operating mode signal is continuously active for at least the predetermined period of time; and
access filters coupled to receive an indication when the at least one operating mode signal is active, wherein the access filters are configured to provide access requests to each of the one or more secured assets when the at least one operating mode signal is active, wherein the access filters are further configured to provide a predetermined response in lieu of data when the at least one operating mode signal is not active.

31. The device of claim 30, wherein the at least one operating mode signal is received by the security hardware through the at least one bus interface logic.

32. The device of claim 30, wherein the one or more secured assets include one or more of the group consisting of:
  a random number generator,
  a secure management register,
  a monotonic counter, and
  a secure memory.

33. The device of claim 30, wherein the first operating mode comprises system management mode.

34. The device of claim 30, wherein the control signal indicative of the request to change to the first operating mode comprises a system management interrupt.

35. The device of claim 30, wherein the security hardware includes:
  a duration timer coupled to receive the at least one operating mode signal, wherein the duration timer is configured to provide an indication of how long the at least one operating mode signal is active.

36. The device of claim 35, wherein the kick-out timer and the duration timer comprise a single timer.

37. The device of claim 30, wherein the security hardware further includes:
  access locks coupled to the access filters, wherein the access locks are further coupled to receive a mode signal, wherein the access locks are configured to disable the access filters in response to the mode signal indicating an unlocked mode.

38. The device of claim 30, wherein the security hardware further includes:
  mailbox RAM configured to store input and output data, wherein the mailbox RAM includes an inbox for storing input data for the one or more secured assets and an outbox for storing out put data from the one or more secured assets.

39. The device of claim 38, wherein the input data for the one or more secured assets is addressed to the inbox of the mailbox RAM.

40. The device of claim 38, wherein the output data from the one or more secured assets is retrieved from an address at the outbox of the mailbox RAM.

41. The device of claim 38, wherein the access filters are further configured to provide input data or access requests to the inbox of the mailbox RAM if the processor is operating in the secure operating mode, wherein the access filters are further configured not to provide input data to the inbox of the mailbox RAM if the processor is not operating in the secure operating mode, and wherein the access filters are further configured to provide a predetermined response in lieu of data upon receipt of said access requests if the processor is not operating in the secure operating mode.

42. The device of claim 30, wherein the security hardware further includes:
  scratchpad RAM, wherein each of the one or more secured assets is configured to access the scratchpad RAM for the storage of data.

43. The device of claim 30, further comprising:
  a power port configured to receive a reserve power signal, wherein the reserve power signal provides reserve power to the one or more secured assets and to one or more of the security hardware.

44. The device of claim 30, wherein the device comprises a bridge, wherein the bridge further comprises:
  second bus logic for coupling to a second external bus, wherein the one or more secured assets are further coupled to the second bus interface logic.

45. The device of claim 44, wherein the bridge comprises a south bridge, wherein the first external bus is configurable as a first I/O bus, and wherein the second external bus is configurable as a second I/O bus.

46. The device of claim 45, wherein the first I/O bus is a PCI bus, and wherein the second I/O bus is an LPC bus.

47. A device, comprising:
  means for interfacing with a first external bus;
  means for receiving at least one operating mode signal, wherein the at least one operating mode signal is indicative of a first operating mode;
  one or more secured means, wherein the one or more secured means are coupled to the means for interfacing with the first external bus; and
  security means coupled to control the one or more secured means, wherein the security means include:
    means for receiving a request to change to the first operating mode;
    means for asserting a control signal indicative of the request to change to the first operating mode, wherein the means for asserting a control signal indicative of the request to change to the first operating mode initiates the change to the first operating mode;
    means for receiving the at least one operating mode signal coupled to means for outputting a signal indicating when the at least one operating mode signal is continuously active for at least a predetermined period of time;
    means for receive the signal indicating when the at least one operating mode signal is active for a predetermined period of time coupled to means for outputting a signal indicating that another predetermined period of time has elapsed since the means for outputting a signal indicating when the at least one operating mode signal is continuously active for at least a predetermined period of time output the signal indicating when the at least one operating mode signal is continuously active for at least the predetermined period of time; and
    means for filtering coupled to receive an indication when the at least one operating mode signal is active, wherein the means for filtering provide access requests to each of the one or more secured means when the at least one operating mode signal is active, wherein the means for filtering provide a predetermined response in lieu of data when the at least one operating mode signal is not active.

48. The device of claim 47, wherein the at least one operating mode signal is received by the security means through the means for interfacing with the first external bus.

49. The device of claim 47, wherein the one or more secured means include one or more of the group consisting of:
  means for generating a random number generator,
  means for providing a monotonic value, and
  means for storing data.

50. The device of claim 47, wherein the security means further includes:
  means for receiving the at least one operating mode signal coupled to means for providing an indication of how long the at least one operating mode signal is active.

51. The device of claim 47, wherein the security means further include:

means for locking the means for filtering, wherein the means for locking are coupled to receive a mode signal, wherein the means for locking disable the access filters in response to the mode signal indicating an unlocked mode.

52. The device of claim 47, wherein the security means further include:

means for storing input and output data, wherein the means for storing input and output data include a means for storing input data for the one or more secured means and a means for storing output data from the one or more secured means.

53. The device of claim 52, wherein the input data for the one or more secured means are addressed to the means for storing input data for the one or more secured means.

54. The device of claim 52, wherein the output data from the one or more secured means is retrieved from an address at the means for storing output data from the one or more secured means.

55. The device of claim 52, wherein the means for filtering comprise means for providing input data or access requests to the means for storing input data for the one or more secured means if the at least one operating mode signal is indicative of the first operating mode;

means for blocking the input data from the means for storing input data for the one or more secured means if the at least one operating mode signal is not indicative of the first operating mode, and means for providing a predetermined response in lieu of data upon receipt of said access requests if the at least one operating mode signal is not indicative of the first operating mode.

56. The device of claim 30, further comprising:

means for providing reserve power to the one or more secured means and to one or more of the security means.

* * * * *